(12) United States Patent
Kim et al.

(10) Patent No.: US 12,477,617 B2
(45) Date of Patent: Nov. 18, 2025

(54) METHOD AND APPARATUS FOR CONTROLLING ACTIVATION OF RLC LAYERS IN WIRELESS COMMUNICATION SYSTEM

(71) Applicant: Samsung Electronics Co., Ltd., Suwon-si (KR)

(72) Inventors: Donggun Kim, Suwon-si (KR); Sangkyu Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/586,271

(22) Filed: Feb. 23, 2024

(65) Prior Publication Data

US 2024/0251471 A1   Jul. 25, 2024

Related U.S. Application Data

(63) Continuation of application No. 17/817,300, filed on Aug. 3, 2022, now Pat. No. 11,917,710, which is a
(Continued)

(30) Foreign Application Priority Data

Mar. 25, 2019   (KR) .................. 10-2019-0033738
Apr. 29, 2019   (KR) .................. 10-2019-0050054
(Continued)

(51) Int. Cl.
*H04W 76/27*   (2018.01)
*H04W 76/22*   (2018.01)

(52) U.S. Cl.
CPC ........... *H04W 76/27* (2018.02); *H04W 76/22* (2018.02)

(58) Field of Classification Search
CPC ..... H04W 76/27; H04W 76/22; H04W 80/02; H04W 76/11
See application file for complete search history.

(56) References Cited

U.S. PATENT DOCUMENTS 10,149,175 B2   12/2018 Kim et al.
10,716,156 B2   7/2020 Yi et al.
(Continued)

FOREIGN PATENT DOCUMENTS

KR   10-2015-0050313 A   5/2015
KR   10-2019-0000401 A   1/2019
(Continued)

OTHER PUBLICATIONS

Hearing Notice dated Mar. 11, 2024, in connection with Indian Application No. 202137037402, 2 pages.
(Continued)

*Primary Examiner* — Will W Lin

(57) ABSTRACT

Provided is a method of performing communication by using a plurality of Radio Link Control (RLC) entities in a wireless communication system, the method including: receiving a packet duplication configuration for a radio bearer from a base station (BS) via a Radio Resource Control (RRC) message; configuring a plurality of RLC entities including one primary RLC entity and one or more secondary RLC entities which correspond to a preset Packet Data Convergence Protocol (PDCP) entity, based on the packet duplication configuration; and receiving a Medium Access Control Control Element (MAC CE) for controlling activation or deactivation of the one or more secondary RLC entities from among the plurality of configured RLC entities.

10 Claims, 20 Drawing Sheets

Related U.S. Application Data continuation of application No. 16/969,534, filed as application No. PCT/KR2020/004058 on Mar. 25, 2020, now Pat. No. 11,432,363.

(30) Foreign Application Priority Data

| May 22, 2019 | (KR) | 10-2019-0060225 |
| Jul. 30, 2019 | (KR) | 10-2019-0092664 |

(56) References Cited

U.S. PATENT DOCUMENTS

| 12,096,292 | B2* | 9/2024 | Wang | H04L 5/0055 |
|---|---|---|---|---|
| 2018/0324642 | A1* | 11/2018 | Yu | H04W 36/0055 |
| 2018/0367288 | A1 | 12/2018 | Vrzic et al. | |
| 2018/0368200 | A1 | 12/2018 | Jin et al. | |
| 2020/0119864 | A1* | 4/2020 | Xu | H04L 1/1858 |
| 2020/0119883 | A1* | 4/2020 | Skarve | H04L 5/0032 |
| 2020/0252330 | A1* | 8/2020 | Wei | H04W 76/15 |
| 2020/0267793 | A1* | 8/2020 | Sharma | H04W 28/02 |
| 2020/0274654 | A1* | 8/2020 | Loehr | H04W 72/23 |
| 2020/0374752 | A1* | 11/2020 | Xiao | H04W 76/15 |
| 2021/0058932 | A1* | 2/2021 | Takeda | H04B 7/088 |
| 2021/0168650 | A1* | 6/2021 | Mok | H04L 1/1812 |
| 2021/0352762 | A1* | 11/2021 | Dong | H04W 28/18 |
| 2023/0074851 | A1 | 3/2023 | Baek et al. | |

FOREIGN PATENT DOCUMENTS

| WO | 2018200584 A1 | 11/2018 |
| WO | 2018/228557 A1 | 12/2018 |
| WO | 2020027599 A1 | 2/2020 |

OTHER PUBLICATIONS

LG Electronics Inc., "Dynamic control of PDCP duplication leg", 3GPP TSG-RAN WG2 #105, Feb. 25 - Mar. 1, 2019, R2-1902174, 3 pages.
Spreadtrum Communications, "Enhancements for PDCP duplication", 3GPP TSG-RAN WG2 Meeting #105, Feb. 25-Mar. 1, 2019, R2-1900928, 2 pages.
International Search Report dated Jun. 26, 2020 in connection with International Patent Application No. PCT/KR2020/004058, 2 pages.
Written Opinion of the International Searching Authority dated Jun. 26, 2020 in connection with International Patent Application No. PCT/KR2020/004058, 5 pages.
Supplementary European Search Report dated Jan. 14, 2022, in connection with European Application No. 20779500.6, 13 pages.
3GPP TR 38.825 V0.2.0 (Mar. 2019), Technical Report, 3rd Generation Partnership Project; Technical Specification Group Radio Access Network; Study on NR Industrial Internet of Things (IoT); Release 16, Mar. 2019, 32 pages.
Ericsson, "Leg selection for UL transmission when multiple legs are configured," R2-1901303, 3GPP TSG-RAN WG2 #105, Athens, Greece, Feb. 25-Mar. 1, 2019, 3 pages.
Ericsson, "104_40NR_IIOT PDCP duplication report of email discussion, TP," Draft R2-1902362, D3GPP TSG-RAN WG2 #105, Athens, Greece, Feb. 25-Mar. 1, 2019, 29 pages.
Office Action dated Jan. 6, 2023 in connection with Indian Patent Application No. 202137037402, 5 pages.
The First Office Action dated Dec. 8, 2023, in connection with Chinese Patent Application No. 202080020309.0, 14 pages.
Notification of Communication pursuant to Article 94(3) EPC dated Jan. 9, 2024, in connection with European Application No. 20779500.6, 8 pages.
Notification of Fulfilling of Registration Formality dated Aug. 21, 2024, in connection with Chinese Application No. 202080020309.0, 7 pages.
Communication under Rule 71(3) EPC dated Jan. 27, 2025, in connection with European Patent Application No. 20779500.6, 104 pages.
Office Action dated Jun. 18, 2025, in connection with Korean Application No. 10-2019-0092664, 12 pages.
Extended European Search Report dated Aug. 20, 2025, in connection with European Application No. 25186601.8, 16 pages.
CATT, "Consideration on PDCP duplication status at network side", 3GPP TSG-RAN WG3 #103, R3-190371, Mar. 2019, 3 pages.
Huawei, et al., "RLC behaviors upon duplicate deactivation", 3GPP TSG RAN WG2 #100 Meeting, R2-1712735, Nov. 2017, 2 pages.

* cited by examiner

FIG. 1G
CA duplication bearer (1g-01)
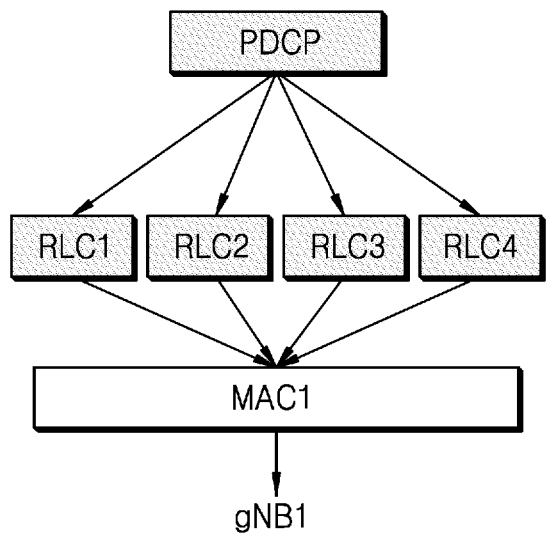
DC duplication bearer (1g-02)
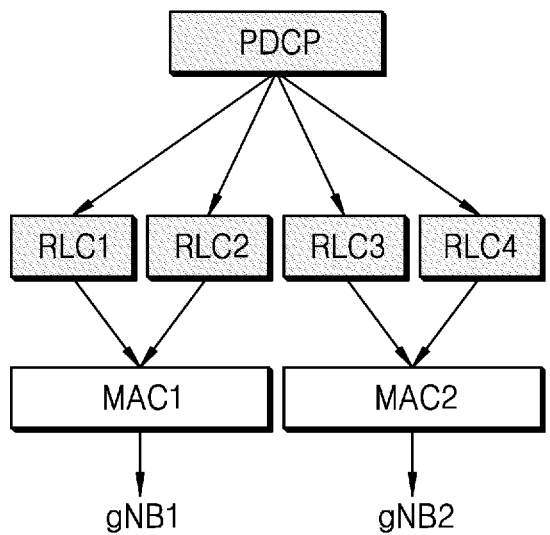

FIG. 1I
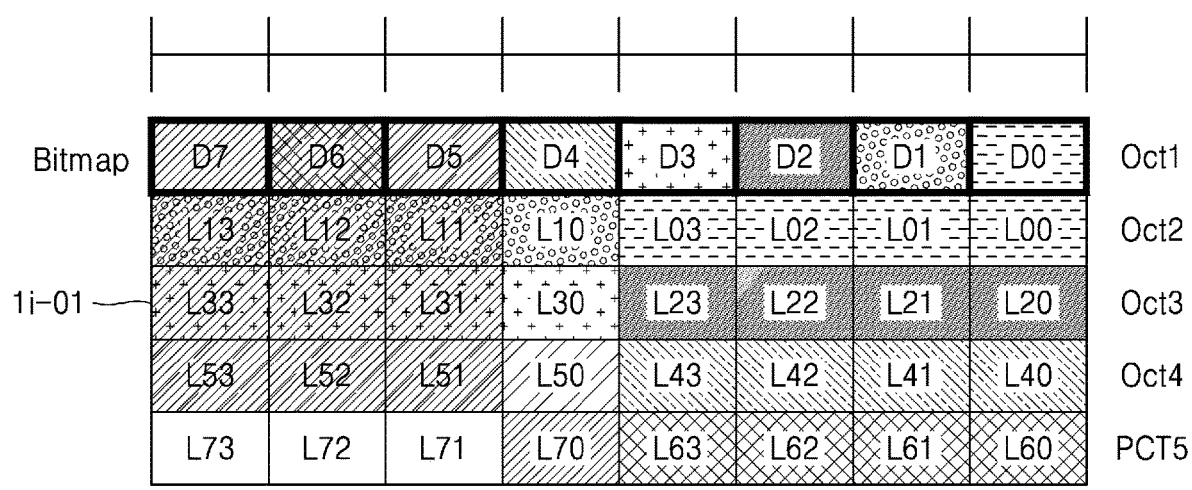
Example – flexible size or padding
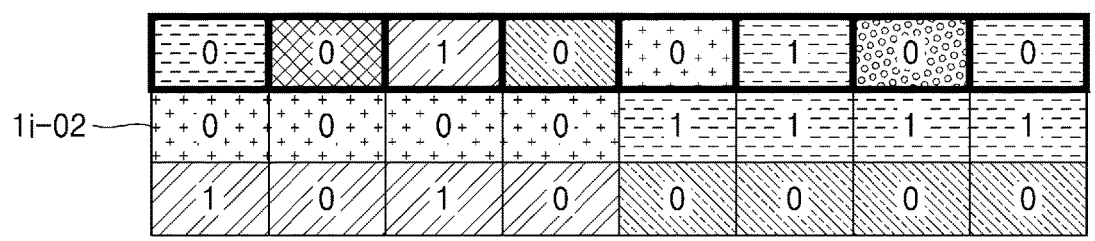

FIG. 1J
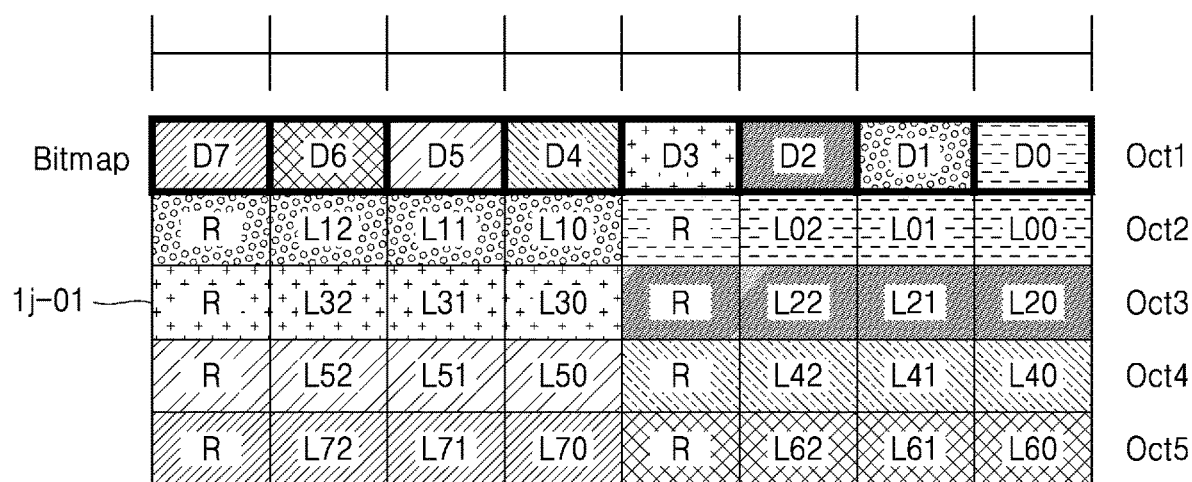
Example – flexible size or padding
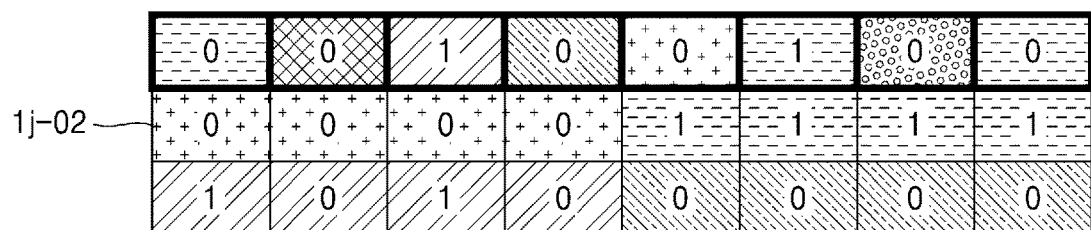

FIG. 1K
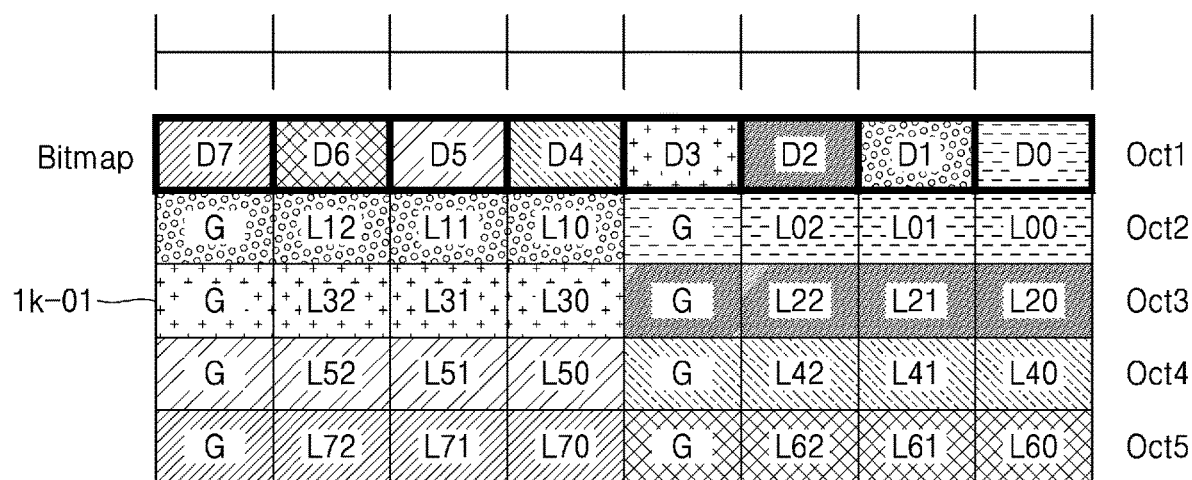
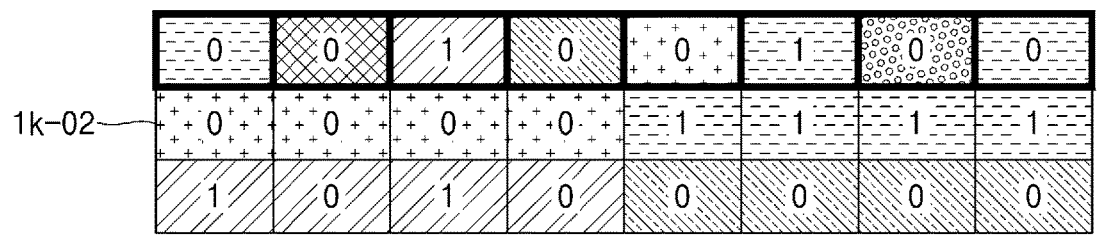
Example - flexible size or padding

FIG. 10

| L7 | L6 | L5 | L4 | L3 | L2 | L1 | L0 |
|---|---|---|---|---|---|---|---|
| L16 | L15 | L13 | L12 | L11 | L10 | L9 | L8 |

1o-01

| G | L6 | L5 | L4 | L3 | L2 | L1 | L0 |
|---|---|---|---|---|---|---|---|
| L16 | L15 | L13 | L12 | L11 | L10 | L9 | L8 |

1o-02

| P | L6 | L5 | L4 | L3 | L2 | L1 | L0 |
|---|---|---|---|---|---|---|---|
| L16 | L15 | L13 | L12 | L11 | L10 | L9 | L8 |

1o-03

METHOD AND APPARATUS FOR CONTROLLING ACTIVATION OF RLC LAYERS IN WIRELESS COMMUNICATION SYSTEM

CROSS-REFERENCE TO RELATED APPLICATIONS

This application is a continuation of application Ser. No. 17/817,300, filed Aug. 3, 2022, now U.S. Pat. No. 11,917,710, which is a continuation of application Ser. No. 16/969,534, filed Aug. 12, 2020, now U.S. Pat. No. 11,432,363, which is the 371 National Stage of International Application No. PCT/KR2020/004058, filed Mar. 25, 2020, which claims priority Korean Patent Application No. 10-2019-0033738, filed Mar. 25, 2019, Korean Patent Application No. 10-2019-0050054, filed Apr. 29, 2019, Korean Patent Application No. 10-2019-0060225, filed May 22, 2019, and Korean Patent Application No. 10-2019-0092664, filed Jul. 30, 2019, to the disclosures of which are herein incorporated by reference in their entirety.

BACKGROUND

1. Field

The disclosure relates to a method and apparatus for controlling activation of a plurality of Radio Link Control (RLC) layers in a wireless communication system.

2. Description of Related Art

To meet increasing demand with respect to wireless data traffic after the commercialization of $4^{th}$ generation (4G) communication systems, efforts have been made to develop evolved $5^{th}$ generation (5G) system or pre-5G communication system. For this reason, 5G or pre-5G communication systems are called 'beyond 4G network' communication systems or 'post long term evolution (post-LTE)' systems. The 5G communication system defined in the $3^{rd}$ generation partnership project long term evolution (3GPP LTE) is called a New Radio (NR) system. To achieve high data rates, implementation of 5G communication systems in an ultra-high frequency or millimeter-wave (mmWave) band (e.g., a 60 GHz band) is being considered. To reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied and applied to the NR system. To improve system networks for 5G communication systems, various technologies such as evolved small cells, advanced small cells, cloud Radio Access Networks (Cloud-RAN), ultra-dense networks, Device-To-Device communication (D2D), wireless backhaul, moving networks, cooperative communication, Coordinated Multi-Points (CoMP), interference cancellation, or the like have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), sparse code multiple access (SCMA), or the like have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required, such that, in recent years, technologies related to sensor networks for connecting objects, Machine-To-Machine (M2M) communication, and Machine-Type Communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, the 5G communication such as sensor networks, M2M communication, MTC, or the like is being implemented by using techniques including beamforming, MIMO, array antennas, or the like. Application of Cloud-RAN as the above-described big data processing technology may be an example of convergence of 5G communication technology and IoT technology.

Due to developments in wireless communication systems, there is a demand for a method of controlling activation of a plurality of Radio Link Control (RLC) layers in a system that supports a high reliability and low latency service.

SUMMARY

Embodiments disclosed herein provide a method and apparatus for controlling activation of a plurality of Radio Link Control (RLC) layers in a wireless communication system.

Embodiments disclosed herein may provide a method and apparatus for controlling activation of a plurality of Radio Link Control (RLC) layers in a wireless communication system.

According to embodiments disclosed herein, it is possible to efficiently control activation of a plurality of Radio Link Control (RLC) layers of a user equipment (UE) in a wireless communication system.

BRIEF DESCRIPTION OF THE DRAWINGS

FIG. 1G illustrates a protocol entity for which the packet duplication technology is configured, according to an embodiment of the disclosure.

FIG. 1I illustrates Embodiment 1 of, when a plurality of Radio Link Control (RLC) entities are configured for the UE for which the packet duplication transmission technology is configured, dynamically activating or deactivating some RLC entities from among the plurality of configured RLC entities, according to an embodiment of the disclosure.

FIG. 1J illustrates Embodiment 2 of, when a plurality of RLC entities are configured for the UE for which the packet duplication transmission technology is configured, dynamically activating or deactivating some RLC entities from among the plurality of configured RLC entities, according to an embodiment of the disclosure.

FIG. 1K illustrates Embodiment 3 of, when a plurality of RLC entities are configured for the UE for which the packet duplication transmission technology is configured, dynamically activating or deactivating some RLC entities from among the plurality of configured RLC entities, according to an embodiment of the disclosure.

FIG. 1O illustrates Embodiment 7 of, when a plurality of RLC entities (or logical channel identifiers) are configured for the UE for which the packet duplication transmission technology is configured, dynamically activating or deactivating some RLC entities from among the plurality of configured RLC entities, according to an embodiment of the disclosure.

DETAILED DESCRIPTION

Figure 1A:
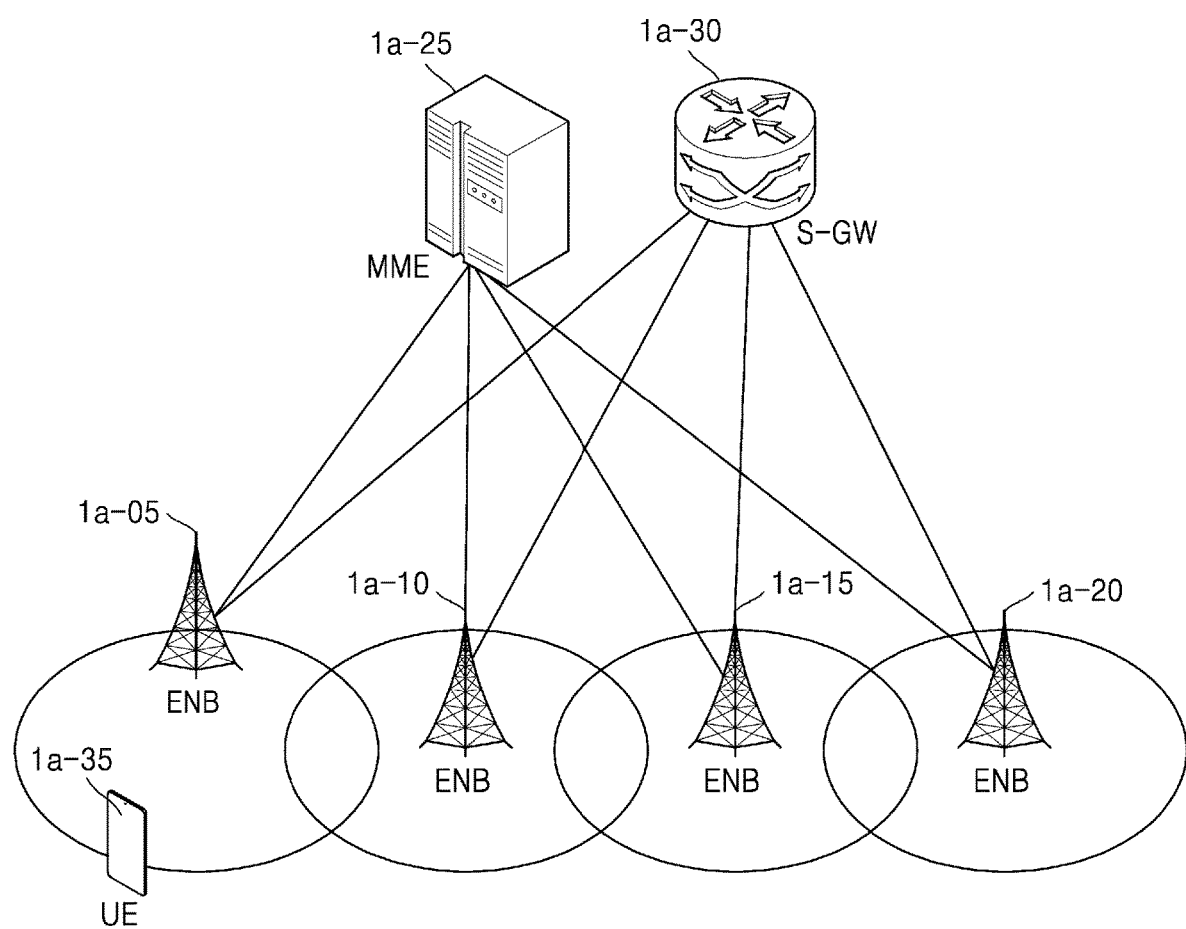
FIG. 1A is a diagram illustrating a configuration of a long term evolution (LTE) system, according to an embodiment of the disclosure.

According to an embodiment of the disclosure, a method, performed by a user equipment (UE), of performing communication by using a plurality of Radio Link Control (RLC) entities in a wireless communication system includes: receiving a packet duplication configuration for a radio bearer from a base station (BS) via a Radio Resource Control (RRC) message; configuring a plurality of RLC entities including one primary RLC entity and one or more secondary RLC entities which correspond to a preset Packet Data Convergence Protocol (PDCP) entity, based on the packet duplication configuration; and receiving a Medium Access Control Control Element (MAC CE) for controlling activation or deactivation of the one or more secondary RLC entities from among the plurality of configured RLC entities.

The MAC CE may include a bearer identifier field to which the packet duplication configuration is applied, and one or more RLC fields corresponding to the one or more secondary RLC entities.

The MAC CE may have a fixed size, and may be identified due to a logical channel identifier indicating that the MAC CE is a MAC CE for controlling activation or deactivation of the one or more secondary RLC entities.

The one or more RLC fields may be mapped to the one or more secondary RLC entities, respectively, and the one or more RLC fields may include information for controlling activation or deactivation of the one or more secondary RLC entities corresponding to the one or more RLC fields, respectively.

The one or more RLC fields may be ordered in an ascending order, based on logical channel identifiers of the one or more secondary RLC entities corresponding to the one or more RLC fields, respectively.

The receiving of the MAC CE may include receiving a MAC CE for indicating deactivation of all of the one or more secondary RLC entities, and the method may further include deactivating the packet duplication configuration.

The method may further include operating in a mode of a split bearer that transmits different data by using the primary RLC entity and a preset secondary RLC entity from among the one or more secondary RLC entities of the radio bearer.

According to an embodiment of the disclosure, a method, performed by a BS, of controlling activation of a plurality of RLC entities configured for a UE in a wireless communication system includes: transmitting a packet duplication configuration for a radio bearer via an RRC message; and transmitting a MAC CE for controlling activation or deactivation of one or more secondary RLC entities from among a plurality of RLC entities including one primary RLC entity and the one or more secondary RLC entities which correspond to a preset PDCP entity configured for the UE.

The MAC CE may include an identifier field with respect to the radio bearer for which the packet duplication configuration is configured, and one or more RLC fields corresponding to the one or more secondary RLC entities.

The MAC CE may have a fixed size, and may be identified due to a logical channel identifier indicating that the MAC CE is a MAC CE for controlling activation or deactivation of the one or more secondary RLC entities.

The one or more RLC fields may be mapped to the one or more secondary RLC entities, respectively, and the one or more RLC fields may include information for controlling activation or deactivation of the one or more secondary RLC entities corresponding to the one or more RLC fields, respectively.

The one or more RLC fields may be ordered in an ascending order, based on logical channel identifiers of the one or more secondary RLC entities corresponding to the one or more RLC fields, respectively.

The transmitting of the MAC CE may include indicating deactivation of the packet duplication configuration by indicating deactivation of all of the one or more secondary RLC entities of the UE.

According to an embodiment of the disclosure, a UE performing communication by using a plurality of RLC entities in a wireless communication system includes: a transceiver; and a processor combined with the transceiver and configured to receive a packet duplication configuration for a radio bearer from a BS via an RRC message, configure a plurality of RLC entities including one primary RLC entity and one or more secondary RLC entities which correspond to a preset PDCP entity, based on the packet duplication configuration, and receive a MAC CE for controlling activation or deactivation of the one or more secondary RLC entities from among the plurality of configured RLC entities.

According to an embodiment of the disclosure, a BS controlling activation of a plurality of RLC entities configured for a UE in a wireless communication system includes: a transceiver; and a processor combined with the transceiver and configured to transmit a packet duplication configuration for a radio bearer via an RRC message, and transmit a MAC CE for controlling activation or deactivation of one or more secondary RLC entities from among a plurality of RLC entities including one primary RLC entity and the one or more secondary RLC entities which correspond to a preset PDCP entity configured for the UE.

Embodiments of the disclosure will now be described more fully with reference to the accompanying drawings. In the following description of embodiments, descriptions of techniques that are well known in the art and not directly related to the disclosure are omitted. This is to clearly convey the gist of the disclosure by omitting an unnecessary explanation.

For the same reason, some elements in the drawings are exaggerated, omitted, or schematically illustrated. Also, the size of each element does not entirely reflect the actual size. In the drawings, the same or corresponding elements are denoted by the same reference numerals.

The advantages and features of the disclosure and methods of achieving them will become apparent with reference to embodiments described in detail below with reference to the accompanying drawings. The disclosure may however, be embodied in many different forms and should not be construed as limited to embodiments set forth herein; rather these embodiments of the disclosure are provided so that this disclosure will be thorough and complete, and will fully convey the scope of the disclosure only defined by the claims to one of ordinary skill in the art. Throughout the specification, the same elements are denoted by the same reference numerals.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block or blocks. The computer program instructions may also be stored in a computer usable or computer-readable memory that may direct the computer or other programmable data processing apparatus to function in a particular manner, such that the instructions stored in the computer usable or computer-readable memory produce an article of manufacture including instruction means that perform the functions specified in the flowchart block or blocks. The computer program instructions may also be loaded onto the computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used in the present embodiment of the disclosure refers to a software or hardware component, such as field-programmable gate array (FPGA) or application-specific integrated circuit (ASIC), which performs certain tasks. However, the term "unit" does not mean to be limited to software or hardware. A "unit" may be configured to be in an addressable storage medium or configured to operate one or more processors. Thus, a "unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or may be further separated into additional components and "units". Further, the components and "units" may be implemented to operate one or more central processing units (CPUs) in a device or a secure multimedia card. Also, a "unit" may include one or more processors in an embodiment of the disclosure.

Hereinafter, terms identifying access nodes, terms indicating network entities, terms indicating messages, terms indicating an interface between network entities, and terms indicating various pieces of identification information, as used in the following descriptions, are exemplified for convenience of explanations. Accordingly, the disclosure is not limited to terms to be described below, and other terms indicating objects having equal technical meanings may be used.

For convenience of descriptions, the disclosure uses terms and names defined in the 3$^{rd}$ Generation Partnership Project (3GPP) long term evolution (LTE) standards. However, the disclosure is not limited to the terms and names, and may be equally applied to communication systems conforming to other standards. In the disclosure, an evolved node B (eNB) may be interchangeably used with a next-generation node B (gNB) for convenience of explanation. That is, a base station (BS) described by an eNB may represent a gNB. That is, a base station (BS) described by an eNB may represent a gNB. In the disclosure, the term "user equipment (UE)" may represent not only a handphone, Narrowband Internet of Things (NB-IoT) devices, and sensors but may also represent various wireless communication devices.

To support a service of a high data rate and low transmission latency in a next-generation mobile communication system, it is necessary for a BS to rapidly configure a Carrier Aggregation (CA) technology or a Dual-Connectivity (DC) technology for a UE. Also, to support a service (e.g., Industrial IoT (IIoT)) of a higher reliability and lower transmission latency, a packet duplication technology may be configured and used, or the CA technology and the DC technology may be configured with the packet duplication technology and used together. Also, it may be necessary to provide a method of additionally transmitting two or more pieces of duplicate data with respect to one piece of data by extending a principle by which one piece of duplicate data with respect to one piece of data is additionally transmitted to improve reliability in the packet duplication technology. Also, it may be necessary to provide dynamically-controllable signaling for dynamically transmitting zero, one, two, or three pieces of duplicate data when required.

In the disclosure, provided is a method of additionally transmitting three pieces of duplicate data with respect to one piece of data by extending a principle by which one piece of duplicate data with respect to one piece of data is additionally transmitted to improve reliability in the packet duplication technology. Also, provided is dynamically-controllable signaling for dynamically transmitting zero, one, two, or three pieces of duplicate data when required, not one or three pieces of duplicate data.

Therefore, in the disclosure, a UE for which the CA technology, the DC technology, or the packet duplication technology is configured is being considered, and the provided method is implemented using terms below.

Primary Cell (Pcell): The PCell refers to a serving cell used when the UE first configures connection with a BS, and the UE transmits or receives some or all of Radio Resource Control (RRC) messages by using the PCell and thus configures connection. Also, the PCell always has a Physical Uplink Control Channel (PUCCH) transmit resource and thus may indicate Hybrid Automatic Repeat Request (HARQ) Acknowledgement (ACK) or Negative Acknowledgement (NACK), may be always configured with an uplink (UL) and a downlink (DL), and may be used as a reference cell for timing advance, Primary Timing Advance Group (pTAG). For example, in a case where, after the PCell is configured, the CA technology is configured and thus a SCell is added, the SCell may perform UL data transmission by referring to a timing advance value of the PCell. In a case where the DC technology is configured, the PCell refers to a PCell of a Master Cell Group (MCG).

Master Cell Group (MCG): The MCG refers to a group of cells supported by the serving cell or the BS, the serving cell used when the UE first configures connection with the BS, and in a case where the DC technology is configured, some or all of RRC messages may be transmitted or received via the MCG.

Secondary Cell Group (SCG): When the UE configures connection with the BS and then adds cells of another BS other than the MCG, the SCG refers to a group of cells supported by the other BS. In a case where the DC technology is configured, the SCG may be added to additionally increase a data rate or to efficiently support mobility of the UE.

Primary Secondary Cell (PScell): In a case where the UE configures connection with the BS and then the DC technology is configured and thus the group of cells of the other BS is added, a cell corresponding to a PCell in the SCG is called a PScell.

Secondary Cell (SCell): After the UE first configures connection with the BS, the BS additionally configures cells to configure the CA technology, and in this regard, the cells are each called a SCell. The SCell may have a PUCCH transmit resource according to BS configuration, may be configured with a UL or a DL according to BS configuration, or may be used as a reference cell for timing advance, Secondary Timing Advance Group (sTAG) according to BS configuration. For example, in a case where, after the PCell is configured, the CA technology is configured and thus SCells are added and a sTAG is configured, other SCells of the sTAG may perform UL data transmission by referring to a timing advance value of a designated SCell. In a case where the DC technology is configured for the UE, SCells refers to SCells of the MCG excluding the PCell or SCells of the SCG excluding the PScell.

Primary Radio Link Control (RLC) entity: In a case where a packet duplication technology is configured, a plurality of RLC entities may be configured for one Packet Data Convergence Protocol (PDCP) entity, and one RLC entity that is not deactivated but is always used from among the plurality of RLC entities is called a primary RLC entity. The PDCP entity is characterized in that the PDCP entity does not duplicately transmit a PDCP control Protocol Data Unit (PDU) and always transmits the PDCP control PDU to the primary RLC entity.

Secondary RLC entity: In a case where the packet duplication technology is configured, a plurality of RLC entities may be configured for one PDCP entity, and remaining RLC entities except for a primary RLC entity from among the plurality of RLC entities are each called a secondary RLC entity.

In the disclosure, provided is a method of dynamically transmitting zero, one, two, or three packet duplications so as to further increase reliability and to further decrease transmit latency with respect to the UE for which the CA technology, the DC technology, or the packet duplication technology is configured. That is, provided is a method of transmitting original data and maximal three pieces of duplicate data, when certain data is transmitted.

In the disclosure, the BS may configure the packet duplication technology for the UE by applying the DC technology or the CA technology via an RRC message. In detail, the BS may configure a plurality of RLC entities connected to one Medium Access Control (MAC) entity, and may configure the plurality of RLC entities to be connected to one PDCP entity and to perform packet duplication. As another method, the BS may configure a plurality of RLC entities connected to one MCG MAC entity, may configure a plurality of RLC entities connected to one SCG MAC entity, or may configure a plurality of RLC entities connected to different MAC entities to be connected to one PDCP entity, and by doing so, packet duplication may be performed.

Also, the BS may indicate which RLC entity from among a plurality of RLC entities is a primary RLC entity or a secondary RLC entity, by using a logical channel identifier and a bearer identifier in an RRC message. For example, cell group configuration information may indicate configuration information of each RLC entity, and may indicate a bearer identifier and a logical channel identifier corresponding to each RLC entity. Also, bearer configuration information may indicate configuration information of each PDCP entity, and may indicate a bearer identifier corresponding to each PDCP entity, and in a case where a plurality of RLC entities are configured with respect to a PDCP entity or the bearer identifier, the BS may indicate a primary RLC entity by indicating a logical channel identifier corresponding to the primary RLC entity. Therefore, when the UE receives an RRC message, the UE may configure a PDCP entity according to a bearer identifier, may configure a plurality of RLC entities to be connected to the PDCP entity, the plurality of RLC entities corresponding to the bearer identifier, and may designate the primary RLC entity and a plurality of secondary RLC entities.

As another method, when the BS configures, by using an RRC message, a plurality of RLC entities connected to one PDCP entity for the UE, the BS may indicate, by using a logical channel identifier (or a SCell identifier) and a bearer identifier, which RLC entity from among the plurality of RLC entities is a primary RLC entity or a secondary RLC entity. For example, cell group configuration information may indicate configuration information of each RLC entity, and may indicate a bearer identifier and logical channel identifier (or a SCell identifier) corresponding to each RLC entity. Also, bearer configuration information may indicate configuration information of each PDCP entity, and may indicate a bearer identifier corresponding to each PDCP entity, and in a case where a plurality of RLC entities are configured with respect to a PDCP entity or the bearer identifier, the BS may indicate a primary RLC entity by indicating a logical channel identifier (or a SCell identifier) corresponding to the primary RLC entity. Therefore, when the UE receives an RRC message, the UE may configure a PDCP entity according to a bearer identifier, may configure a plurality of RLC entities to be connected to the PDCP entity, the plurality of RLC entities corresponding to the bearer identifier, and may designate the primary RLC entity and a plurality of secondary RLC entities by using the logical channel identifier or the SCell identifier.

As another method, when the BS configures, by using an RRC message, a plurality of RLC entities connected to one PDCP entity for the UE, the BS may indicate which RLC entity from among the plurality of RLC entities is a primary RLC entity or secondary RLC entities, by using a new identifier (e.g., an identifier such as 0, 1, 2, or 3, which indicates each RLC entity) and a bearer identifier or a logical channel identifier. For example, cell group configuration information may indicate configuration information of each RLC entity, and may indicate a bearer identifier and a logical channel identifier or a new identifier corresponding to each RLC entity. Also, bearer configuration information may indicate configuration information of each PDCP entity, and may indicate a bearer identifier corresponding to each PDCP entity, and in a case where a plurality of RLC entities are configured with respect to a PDCP entity or the bearer identifier, the BS may indicate a primary RLC entity by indicating a logical channel identifier or a new identifier corresponding to the primary RLC entity. A specific value (e.g., an identifier having a lowest value, i.e., 0) of the new identifier may be defined to indicate the primary RLC entity, and RLC entities having different values may be regarded as secondary RLC entities. Therefore, when the UE receives an RRC message, the UE may configure a PDCP entity according to a bearer identifier, may configure a plurality of RLC entities to be connected to the PDCP entity, the plurality of RLC entities corresponding to the bearer identifier, and may designate the primary RLC entity and the plurality of secondary RLC entities by using the logical channel identifier or the new identifier.

As another method, a primary RLC entity is determined from among a plurality of RLC entities connected to one PDCP entity for the packet duplication technology. In this regard, a RLC entity having a lowest identifier value or a highest identifier value (a smallest identifier value or a greatest identifier value) may be configured as the primary RLC entity, and remaining RLC entities may be configured as secondary RLC entities. The lowest identifier value or the highest identifier value (the smallest identifier value or the greatest identifier value) may be determined by using one of methods below. The PDCP entity is characterized in that the PDCP entity does not apply packet duplication on a PDCP control PDU and always transmits the PDCP control PDU to the primary RLC entity. In a case where packet duplication is configured for a PDCP data PDU, the PDCP entity duplicately transmits data to secondary RLC entities different from the primary RLC entity. Methods below of determining a primary RLC entity may be applied to both the UE and the BS.

Method 1: When new identifiers (e.g., 0, 1, 2, and 3) are configured, via an RRC message, for respective RLC entities connected to one PDCP entity, a lowest value or a highest value of a new identifier may be configured (or regarded) as a primary RLC entity, and remaining RLC entities may be configured as secondary RLC entities. Alternatively, when packet duplication is configured, a lowest value or a highest value of a new identifier may be configured as a primary RLC entity from among RLC entities to which activation is indicated by an RRC message or a MAC Control Element (CE), the RLC entities being from among a plurality of RLC entities connected to a PDCP entity for which packet duplication is configured, and remaining RLC entities may be configured as secondary RLC entities. Accordingly, when the RLC entities that are activated by the MAC CE are changed, a primary RLC entity may be re-determined based on new identifier values of the changed and activated RLC entities.

Method 2: When logical channel identifiers or SCell identifiers are configured, via an RRC message, for respective RLC entities connected to one PDCP entity, a lowest value or a highest value of a logical channel identifier or a SCell identifier may be configured as a primary RLC entity, and remaining RLC entities may be configured as secondary RLC entities. Alternatively, when packet duplication is configured, a lowest value or a highest value of a logical channel identifier or a SCell identifier may be configured as a primary RLC entity from among RLC entities to which activation is indicated by an RRC message or a MAC CE, the RLC entities being from among a plurality of RLC entities connected to a PDCP entity for which packet duplication is configured, and remaining RLC entities may be configured as secondary RLC entities. Accordingly, when the RLC entities that are activated by the MAC CE are changed, a primary RLC entity may be re-determined based on logical channel identifier values or SCell identifier values of the changed and activated RLC entities.

Method 3: When bearer identifiers and logical channel identifiers (or SCell identifiers) are configured, via an RRC message, for respective RLC entities connected to one PDCP entity, a lowest value or a highest value of combination values (e.g., [bearer identifier+logical channel identifier] or a binary combination [bearer identifier, logical channel identifier]) of bearer identifiers and logical channel identifiers (or SCell identifiers) may be configured as a primary RLC entity, and remaining RLC entities may be configured as secondary RLC entities. Alternatively, when packet duplication is configured, a lowest value or a highest value of a combination value of a bearer identifier and a logical channel identifier (or a SCell identifier) may be configured as a primary RLC entity from among RLC entities to which activation is indicated by an RRC message or a MAC CE, the RLC entities being from among a plurality of RLC entities connected to a PDCP entity for which packet duplication is configured, and remaining RLC entities may be configured as secondary RLC entities. Accordingly, when the RLC entities that are activated by the MAC CE are changed, a primary RLC entity may be re-determined based on combination values of bearer identifiers and logical channel identifiers (or SCell identifiers) of the changed and activated RLC entities.

As another method, according to a method of dynamically determining a primary RLC entity from among RLC entities that are activated from among a plurality of RLC entities connected to one PDCP entity for the packet duplication technology, a RLC entity having a lowest identifier value or a highest identifier value (a smallest identifier value or a greatest identifier value) from among the activated RLC entities may be always configured as a primary RLC entity, and remaining RLC entities may be configured as secondary RLC entities. The lowest identifier value or the highest identifier value (the smallest identifier value or the greatest identifier value) may be determined by using one of methods below. The PDCP entity does not apply packet duplication on a PDCP control PDU and may always transmit the PDCP control PDU to the primary RLC entity. In a case where packet duplication is configured for a PDCP data PDU, the PDCP entity may duplicately transmit data to secondary RLC entities different from the primary RLC entity. Methods below of determining a primary RLC entity may be applied to both the UE and the BS.

Method 1: When new identifiers (e.g., 0, 1, 2, and 3) are configured, via an RRC message, for respective RLC entities connected to one PDCP entity, a lowest value or a highest value of a new identifier may be configured as a primary RLC entity, and remaining RLC entities may be configured as secondary RLC entities. Alternatively, when packet duplication is configured, a lowest value or a highest value of a new identifier may be configured as a primary RLC entity from among RLC entities to which activation is indicated by an RRC message or a MAC CE, the RLC entities being from among a plurality of RLC entities connected to a PDCP entity for which packet duplication is configured, and remaining RLC entities may be configured as secondary RLC entities. Accordingly, when the RLC entities that are activated by the MAC CE are changed, a primary RLC entity may be re-determined based on new identifier values of the changed and activated RLC entities.

Method 2: When logical channel identifiers or SCell identifiers are configured, via an RRC message, for respective RLC entities connected to one PDCP entity, a lowest value or a highest value of a logical channel identifier or a SCell identifier may be configured as a primary RLC entity, and remaining RLC entities may be configured as secondary RLC entities. Alternatively, when packet duplication is configured, a lowest value or a highest value of a logical channel identifier or a SCell identifier may be configured as a primary RLC entity from among RLC entities to which activation is indicated by an RRC message or a MAC CE, the RLC entities being from among a plurality of RLC entities connected to a PDCP entity for which packet duplication is configured, and remaining RLC entities may be configured as secondary RLC entities. Accordingly, when the RLC entities that are activated by the MAC CE are changed, a primary RLC entity may be re-determined based on logical channel identifier values or SCell identifier values of the changed and activated RLC entities.

Method 3: When bearer identifiers and logical channel identifiers (or SCell identifiers) are configured, via an RRC message, for respective RLC entities connected to one PDCP entity, a lowest value or a highest value of combination values (e.g., [bearer identifier+logical channel identifier] or a binary combination [bearer identifier, logical channel identifier]) of bearer identifiers and logical channel identifiers (or SCell identifiers) may be configured as a primary RLC entity, and remaining RLC entities may be configured as secondary RLC entities. Alternatively, when packet duplication is configured, a lowest value or a highest value of a combination value of a bearer identifier and a logical channel identifier (or a SCell identifier) may be configured as a primary RLC entity from among RLC entities to which activation is indicated by an RRC message or a MAC CE, the RLC entities being from among a plurality of RLC entities connected to a PDCP entity for which packet duplication is configured, and remaining RLC entities may be configured as secondary RLC entities. Accordingly, when the RLC entities that are activated by the MAC CE are changed, a primary RLC entity may be re-determined based on combination values of bearer identifiers and logical channel identifiers (or SCell identifiers) of the changed and activated RLC entities.

The aforementioned methods of identifying a primary RLC entity may also be applied to identify secondary RLC entities. When a packet duplication procedure proposed in the disclosure is applied, one PDCP entity can duplicately transmit data by using a structure where one primary RLC entity and one or more (e.g., one, two, or three) secondary RLC entities are connected, it is necessary to identify each of a plurality of secondary RLC entities. Only when a plurality of secondary RLC entities configured for each of bearers are identified therebetween, the BS may activate or deactivate each of the plurality of secondary RLC entities by using a MAC control information (e.g., MAC CE). Therefore, hereinafter, provided are methods of identifying each of a plurality of secondary RLC entities configured for a bearer for which packet duplication is configured.

Method 4: When new identifiers (e.g., 0, 1, 2, and 3) are configured, via an RRC message, for respective RLC entities connected to one PDCP entity, the BS or the UE may configure (or regard) a lowest value of values of new identifiers as a primary RLC entity, may configure remaining RLC entities as secondary RLC entities, and may identify each of the secondary RLC entities based on the new identifiers. Alternatively, when packet duplication is configured, the BS (or the UE) may configure a lowest value of values of new identifiers as a primary RLC entity from among RLC entities to which activation is indicated by an RRC message or a MAC CE, the RLC entities being from among a plurality of RLC entities connected to a PDCP entity for which packet duplication is configured, may configure remaining RLC entities as secondary RLC entities, and may identify each of the secondary RLC entities by mapping respective bits of a MAC CE to the secondary RLC entities in an ascending order of the new identifiers. Accordingly, the BS may indicate activation or deactivation with respect to the primary RLC entity or the secondary RLC entity by using the MAC CE, and when the UE receives the MAC CE, the UE may activate or deactivate the primary RLC entity or the secondary RLC entity which corresponds to the MAC CE. As another method, new identifiers may be allocated only to secondary RLC entities, and a primary RLC entity may be indicated using a bearer identifier, a logical channel identifier, or a cell group identifier in PDCP entity configuration information.

Method 5: When logical channel identifiers or SCell identifiers are configured, via an RRC message, for respective RLC entities connected to one PDCP entity, the BS (or the UE) may configure a lowest value of values of logical channel identifiers or SCell identifiers as a primary RLC entity, may configure remaining RLC entities as secondary RLC entities, and may identify each of the secondary RLC entities by using the logical channel identifiers or the SCell identifiers. Alternatively, when packet duplication is configured, the BS (or the UE) may configure a lowest value of values of logical channel identifiers or SCell identifiers as a primary RLC entity from among RLC entities to which activation is indicated by an RRC message or a MAC CE, the RLC entities being from among a plurality of RLC entities connected to a PDCP entity for which packet duplication is configured, and with respect to remaining RLC entities, the BS (or the UE) may identify each of the secondary RLC entities by mapping respective bits of a MAC CE to the secondary RLC entities in an ascending order of logical channel identifiers or SCell identifiers (e.g., when a plurality of SCell identifiers are mapped to RLC entities (logical channel identifiers), a lowest SCell identifier or a highest SCell identifier is a reference identifier). Accordingly, the BS may indicate activation or deactivation with respect to the primary RLC entity or the secondary RLC entity by using the MAC CE, and when the UE receives the MAC CE, the UE may activate or deactivate the primary RLC entity or the secondary RLC entity which corresponds to the MAC CE. As another method, the logical channel identifiers or the SCell identifiers may be used only to identify the secondary RLC entities, and the primary RLC entity may be indicated using a bearer identifier, a logical channel identifier, or a cell group identifier in PDCP entity configuration information.

Method 6: When bearer identifiers and logical channel identifiers (or SCell identifiers (e.g., when a plurality of SCell identifiers are mapped to RLC entities (logical channel identifiers), a lowest SCell identifier or a highest SCell identifier is a reference identifier) are configured, via an RRC message, for respective RLC entities connected to one PDCP entity, the BS (or the UE) may configure (or regard) a lowest value of combination values (e.g., [bearer identifier+logical channel identifier] or a binary combination [bearer identifier, logical channel identifier]) of bearer identifiers and logical channel identifiers (or SCell identifiers) as a primary RLC entity, and may configure remaining RLC entities as secondary RLC entities. The BS (or the UE) may identify each of the secondary RLC entities, based on the combination values of the bearer identifiers and the logical channel identifiers (or the SCell identifiers). Alternatively, when packet duplication is configured, the BS (or the UE) may configure a lowest value of combination values of bearer identifiers and logical channel identifiers (Scell identifiers) as a primary RLC entity from among RLC entities to which activation is indicated by an RRC message or a MAC CE, the RLC entities being from among a plurality of RLC entities connected to a PDCP entity for which packet duplication is configured, and with respect to remaining RLC entities, the BS (or the UE) may identify each of the secondary RLC entities by mapping respective bits of a MAC CE to the secondary RLC entities in an ascending order of the combination values (e.g., [bearer identifier+logical channel identifier] or a binary combination [bearer identifier, logical channel identifier]) of the bearer identifiers and the logical channel identifiers (or the SCell identifiers). Accordingly, the BS may indicate activation or deactivation with respect to the primary RLC entity or the secondary RLC entity by using the MAC CE, and when the UE receives the MAC CE, the UE may activate or deactivate the primary RLC entity or the secondary RLC entity which corresponds to the MAC CE. As another method, the bearer identifiers and the logical channel identifiers (or the SCell identifiers) may be used only to identify the secondary RLC entities, and the primary RLC entity may be indicated using a bearer identifier, a logical channel identifier, or a cell group identifier in PDCP entity configuration information.

Method 7: When cell group identifiers and logical channel identifiers (or SCell identifiers (e.g., when a plurality of SCell identifiers are mapped to RLC entities (logical channel identifiers), a lowest SCell identifier or a highest SCell identifier is a reference identifier) are configured, via an RRC message, for respective RLC entities connected to one PDCP entity, the BS (or the UE) may configure (or regard) a lowest value of combination values (e.g., [cell group identifier+logical channel identifier (or SCell identifier)] or a binary combination [cell group identifier, logical channel identifier]) of cell group identifiers and logical channel identifiers (or SCell identifiers) as a primary RLC entity, and may configure remaining RLC entities as secondary RLC entities. The BS (or the UE) may identify each of the secondary RLC entities, based on the combination values of the cell group identifiers and the logical channel identifiers (or the SCell identifiers). Alternatively, when packet duplication is configured, the BS (or the UE) may configure a lowest value of combination values of cell group identifiers and logical channel identifiers (Scell identifiers) as a primary RLC entity from among RLC entities to which activation is indicated by an RRC message or a MAC CE, the RLC entities being from among a plurality of RLC entities connected to a PDCP entity for which packet duplication is configured, and with respect to remaining RLC entities, the BS (or the UE) may identify each of the secondary RLC entities by mapping respective bits of a MAC CE to the secondary RLC entities in an ascending order of the combination values (e.g., [cell group identifier+logical channel identifier] or a binary combination [cell group identifier, logical channel identifier]) of the cell group identifiers and the logical channel identifiers (or the SCell identifiers). Accordingly, the BS may indicate activation or deactivation with respect to the primary RLC entity or the secondary RLC entity by using the MAC CE, and when the UE receives the MAC CE, the UE may activate or deactivate the primary RLC entity or the secondary RLC entity which corresponds to the MAC CE. As another method, the cell group identifiers and the logical channel identifiers (or the SCell identifiers) may be used only to identify the secondary RLC entities, and the primary RLC entity may be indicated using a bearer identifier, a logical channel identifier, or a cell group identifier in PDCP entity configuration information. As another method, when a packet duplication transmission technology is applied to the DC technology, the BS (or the UE) may first map RLC entities of a MCG (or a SCG) to bits in an ascending order of logical channel identifiers, and then may map RLC entities of the SCG (or the MCG) to bits in an ascending order of logical channel identifiers.

Method 8: When cell group identifiers, bearer identifiers, or logical channel identifiers are configured, via an RRC message, for respective RLC entities connected to one PDCP entity, the BS (or the UE) may configure a lowest value of combination values of the cell group identifiers, the bearer identifiers, or the logical channel identifiers as a primary RLC entity, and may configure remaining RLC entities as secondary RLC entities. The BS (or the UE) may identify each of the secondary RLC entities, based on the combination values of the cell group identifiers, the bearer identifiers, or the logical channel identifiers. Alternatively, when packet duplication is configured, the BS (or the UE) may configure a lowest value of combination values of cell group identifiers, bearer identifiers, or logical channel identifiers as a primary RLC entity from among RLC entities to which activation is indicated by an RRC message or a MAC CE, the RLC entities being from among a plurality of RLC entities connected to a PDCP entity for which packet duplication is configured, and with respect to remaining RLC entities, the BS (or the UE) may identify each of the secondary RLC entities by mapping respective bits of a MAC CE to the secondary RLC entities in an ascending order of the combination values of the cell group identifiers, the bearer identifiers, or the logical channel identifiers. Accordingly, the BS may indicate activation or deactivation with respect to the primary RLC entity or the secondary RLC entity by using the MAC CE, and when the UE receives the MAC CE, the UE may activate or deactivate the primary RLC entity or the secondary RLC entity which corresponds to the MAC CE. As another method, the cell group identifiers and the logical channel identifiers (or the SCell identifiers) may be used only to identify the secondary RLC entities, and the primary RLC entity may be indicated using a bearer identifier, a logical channel identifier, or a cell group identifier in PDCP entity configuration information.

The reason why the method of identifying secondary RLC entities is required is because logical channel identifiers allocated to respective RLC entities are identifiers that are unique only in one MAC entity. Therefore, in a case where, as in 1g-02 of FIG. 1G of the disclosure, the DC technology is configured and the packet duplication transmission technology is configured, RLC entity 1 and RLC entity 2 are connected to one MAC entity and thus have different logical channel identifiers, and RLC entity 3 and RLC entity 4 are connected to one MAC entity and thus have different logical channel identifiers. However, RLC entity 1 may have the same logical channel identifier as RLC entity 3 or RLC entity 4 which is connected to another MAC entity, and RLC entity 2 may have the same logical channel identifier as RLC entity 3 or RLC entity 4 which is connected to the other MAC entity. Therefore, secondary RLC entities may not be distinguished therebetween by using only logical channel identifiers.

Therefore, according to an embodiment of the disclosure, the BS (or the UE) may identify each of the secondary RLC entities, in consideration of bearer identifiers, SCell identifiers, or cell group identifiers as in Method 4, Method 5, Method 6, Method 7, or Method 8, and may allow bits of a MAC CE and respective RLC entities (a primary RLC entity or secondary RLC entities) to be one-to-one mapped based on identification information (e.g., bearer identifiers, SCell identifiers, or cell group identifiers) so as to indicate activation or deactivation by indicating 0 or 1 by using each bit. Also, as in Method 4, Method 5, Method 6, Method 7, or Method 8, new RLC identifiers may be newly defined, applied, and used to identify respective RLC entities, based on bearer identifiers, SCell identifiers, or cell group identifiers.

With respect to a plurality of RLC entities connected to a PDCP entity of a bearer for which packet duplication is configured using an RRC message, in a case where the UE receives an indication of a change in a primary RLC entity due to the indication by a MAC CE or the primary RLC entity is changed due to indication of activation or deactivation of each RLC entity with respect to the plurality of RLC entities, a MAC entity received the MAC CE indicates, to the PDCP entity, which RLC entity from among the plurality of RLC entities is a primary RLC entity or a secondary RLC entity such that PDCP control data may be correctly transmitted only to the primary RLC entity in a packet duplication procedure.

With respect to a plurality of RLC entities connected to a PDCP entity of a bearer for which packet duplication is configured using an RRC message, in a case where the UE activates only one RLC entity and deactivates all remaining RLC entities (e.g., secondary RLC entities) due to indication by a MAC CE, i.e., the indication of activation or deactivation of each RLC entity with respect to the plurality of RLC entities, the UE may regard this as deactivation of packet duplication, and a MAC entity received the MAC CE indicates, to a PDCP entity, that the packet duplication technology is deactivated, thereby controlling the PDCP entity to stop application of the packet duplication technology. In a case where only one RLC entity is activated with respect to a plurality of RLC entities, when two or more RLC entities are activated (activation of a primary RLC entity and at least one secondary RLC entity) due to reception of a MAC CE, a MAC entity received the MAC CE indicates activation of packet duplication and activated RLC entities (e.g., identifiers) to a PDCP entity, thereby controlling the PDCP entity to apply packet duplication to the activated RLC entities.

In a case where a plurality of RLC entities connected to a PDCP entity of a bearer for which packet duplication is configured using an RRC message are configured, when the UE autonomously determines which RLC entities are to be activated (or are to be used in transmission of duplicate data) or are to be deactivated (or are not to be used in transmission of duplicate data), based on channel measurement information of a SCell mapped to the RLC entities, the UE may determine a primary RLC entity from among determined activated RLC entities, and may indicate which RLC entity is the primary RLC entity or a secondary RLC entity (or which RLC entities can be used in transmission of duplicate data) to a PDCP entity, such that the PDCP entity may correctly process PDCP control data. In a case where only one RLC entity is activated (or is used in transmission of duplicate data) from among the determined activated RLC entities (or RLC entities to be used in transmission of duplicate data), the UE may indicate deactivation of packet duplication to the PDCP entity, and in a case where two or more RLC entities are to be activated (or are to be used in transmission of duplicate data), the UE may indicate activation of packet duplication and the activated RLC entities (or the RLC entities to be used in transmission of duplicate data) to the PDCP entity, such that the PDCP entity may perform a packet duplication procedure. When the UE autonomously determines which RLC entities are to be activated (or are to be used in transmission of duplicate data) or are to be deactivated (or are not to be used in transmission of duplicate data), based on channel measurement information of a SCell mapped to the RLC entities, the UE may indicate information about activated RLC entities (or RLC entities determined to be used in transmission of duplicate data) or information about a primary RLC entity or a secondary RLC entity to the BS by using a MAC CE, a RLC control PDU, or a PDCP control PDU, thereby informing information about application by the UE with respect to the packet duplication technology. Accordingly, the BS may be informed about which RLC entity receives PDCP control data or whether the packet duplication technology is to be applied.

Hereinafter, provided are various embodiments of designing the MAC CE for applying the packet duplication technology to the plurality of RLC entities.

As proposed in the disclosure, in a case where a plurality of RLC entities connected to a PDCP entity for which the packet duplication technology is configured are configured for a same MAC entity and then the packet duplication technology is applied based on the CA technology, the RLC entities may have a cell mapping limit by which the RLC entities are mapped to different PCells, PSCells, or SCells, respectively, and transmit duplicate data. As proposed in the disclosure, in a case where a plurality of RLC entities connected to a PDCP entity for which the packet duplication technology is configured are configured for different MAC entities and then the packet duplication technology is applied based on the DC technology, the RLC entities may have a cell mapping limit by which the RLC entities are mapped to different PCells, PSCells, or SCells, respectively, and transmit duplicate data. As proposed in the disclosure, some of a plurality of RLC entities connected to a PDCP entity for which the packet duplication technology is configured are configured for a same MAC entity and thus the packet duplication technology based on the CA technology may be applied thereto, and some of the RLC entities are configured for different MAC entities and thus the packet duplication technology based on the DC technology may be applied thereto, and the RLC entities may have a cell mapping limit by which the RLC entities are mapped to different PCells, PSCells, or SCells, respectively, in one MAC entity and transmit duplicate data.

As proposed in the disclosure, in a case where all or some of a plurality of RLC entities connected to a PDCP entity for which the packet duplication technology is configured are configured for one MAC entity and the packet duplication technology based on the CA technology is applied thereto, the RLC entities may have a cell mapping limit by which the RLC entities configured for one MAC entity are mapped to different PCells, PSCells, or SCells, respectively, and transmit duplicate data. In a case where the packet duplication technology based on the CA technology configured for one MAC entity is deactivated, a cell mapping limit may not be applied, in data transmission, to the plurality of RLC entities connected to the PDCP entity for which the packet duplication technology is configured, and in a case where the packet duplication technology based on the CA technology configured for one MAC entity is activated, the cell mapping limit may be applied again in data transmission. As proposed in the disclosure, in a case where all or some of a plurality of RLC entities connected to a PDCP entity for which the packet duplication technology is configured are configured for different MAC entities and the packet duplication technology based on the DC technology is applied thereto, the RLC entities configured for different MAC entities may have a cell mapping limit by which the RLC entities are mapped to different PCells, PSCells, or SCells, respectively, and transmit duplicate data. Even when the packet duplication technology based on the DC technology configured for different MAC entities is deactivated, the cell mapping limit with respect to the RLC entities that are connected to the PDCP entity for which the packet duplication technology is configured and that are connected to different MAC entities may be continuously applied in data transmission.

For example, it may be assumed that RLC entity 1 and RLC entity 2 from among RLC entity 1, RLC entity 2, RLC entity 3, and RLC entity 4 that are connected to a PDCP entity for which the packet duplication technology is configured are connected to MAC entity 1, and RLC entity 3 and RLC entity 4 are connected to MAC entity 2. The RLC entities may be configured with a cell mapping limit with respect to each MAC entity. In a case where packet duplication is performed based on the CA technology via MAC entity 1 by using RLC entity 1 and RLC entity 2, a cell mapping limit with respect to RLC entity 1 and RLC entity 2 may be applied. However, when packet duplication based on the CA technology is deactivated, the cell mapping limit may not be applied to RLC entity 1 and RLC entity 2. In a case where packet duplication is performed based on the DC technology via MAC entity 2 by using RLC entity 1 and RLC entity 3, a cell mapping limit with respect to RLC entity 1 and RLC entity 3 may be applied. However, even when packet duplication based on the CA technology is deactivated, the cell mapping limit may be continuously applied to RLC entity 1 and RLC entity 2. Because different MAC entities already have multiplexing gain when the different MAC entities are configured with different frequencies. Accordingly, in a case where packet duplication is performed based on the CA technology via MAC entity 1 by using RLC entity 1 and RLC entity 2, and simultaneously, packet duplication is performed based on the DC technology via MAC entity 2 by using RLC entity 3, the cell mapping limit may be applied to the RLC entity 1, the RLC entity 2, and the RLC entity 3. However, when packet duplication based on the CA technology and the DC technology is deactivated, the cell mapping limit is not applied to the RLC entity 1 and the RLC entity 2, and the cell mapping limit is continuously applied to the RLC entity 3.

In the disclosure, an embodiment in which one primary RLC entity is configured and maximal three secondary RLC entities are configured is considered, and embodiments provided in the disclosure may be extensively applied to embodiments in which one or more primary RLC entities or one or more secondary RLC entities are configured.

FIG. 1A is a diagram illustrating a configuration of an LTE system, according to an embodiment of the disclosure.

Referring to FIG. 1A, a radio access network (RAN) of the LTE system includes a plurality of evolved nodes B (eNBs) (or nodes B or base stations) 1a-05, 1a-10, 1a-15, and 1a-20, a mobility management entity (MME) 1a-25, and a serving-gateway (S-GW) 1a-30. A UE (or a terminal) 1a-35 may access an external network via the eNB 1a-05, 1a-10, 1a-15, or 1a-20 and the S-GW 1a-30.

In FIG. 1A, the eNB 1a-05, 1a-10, 1a-15, or 1a-20 may correspond to an existing node B of a universal mobile telecommunications system (UMTS). The eNB is connected to the UE 1a-35 through wireless channels and performs complex functions compared to the existing node B. All user traffic data including real-time services such as voice over Internet protocol (VoIP) may be serviced through shared channels in the LTE system, and thus an entity for collating status information, e.g., buffer status information, available transmission power status information, and channel state information, of UEs and performing scheduling may be required and the eNB 1a-05, 1a-10, 1a-15, or 1a-20 may operate as such an entity. One eNB generally controls a plurality of cells. For example, the LTE system may use radio access technology such as OFDM at a bandwidth of 20 MHz to achieve a data rate of 100 Mbps. Also, adaptive modulation & coding (AMC) may be used to determine a modulation scheme and a channel coding rate in accordance with a channel state of the UE. The S-GW 1a-30 is an entity for providing data bearers and may establish and release the data bearers by the control of the MME 1a-25. The MME 1a-25 is an entity for performing a mobility management function and various control functions on the UE and is connected to the plurality of eNBs.

Figure 1B:
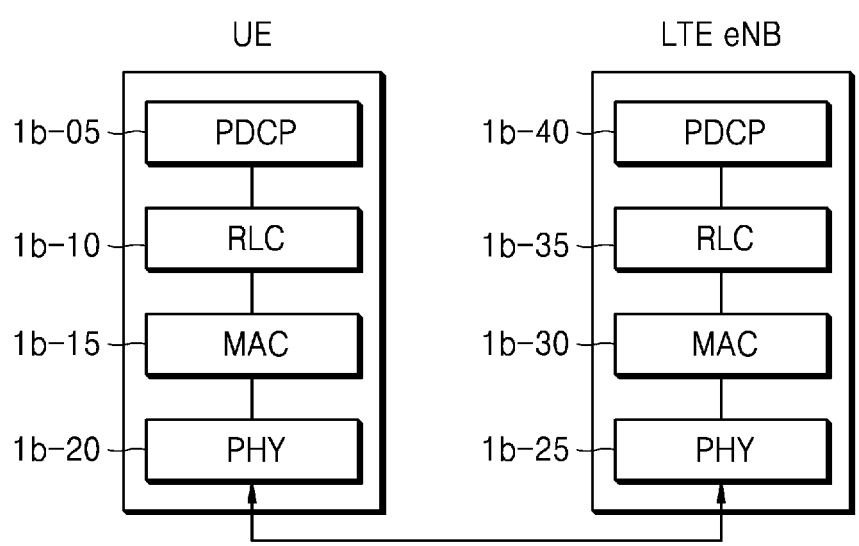
FIG. 1B is a diagram illustrating a radio protocol architecture of an LTE system, according to an embodiment of the disclosure.

FIG. 1B is a diagram illustrating a radio protocol architecture of an LTE system, according to an embodiment of the disclosure.

Referring to FIG. 1B, the radio protocol architecture of the LTE system may include PDCP entities 1b-05 and 1b-40, RLC entities 1b-10 and 1b-35, and MAC entities 1b-15 and 1b-30 respectively for a UE and an eNB. The PDCP entity 1b-05 or 1b-40 may perform, for example, IP header compression/decompression. Main functions of the PDCP entity are summarized as shown below. However, the functions thereof are not limited thereto.

Header compression and decompression: robust header compression (ROHC) only
 Transfer of user data
 In-sequence delivery of upper layer packet data units (PDUs) at PDCP re-establishment procedure for RLC acknowledged mode (AM)
 For split bearers in DC (only support for RLC AM): PDCP PDU routing for transmission and PDCP PDU reordering for reception
 Duplicate detection of lower layer service data units (SDUs) at PDCP re-establishment procedure for RLC AM
 Retransmission of PDCP SDUs at handover and, for split bearers in DC, of PDCP PDUs at PDCP data-recovery procedure, for RLC AM
 Ciphering and deciphering
 Timer-based SDU discard in uplink The RLC entity 1b-10 or 1b-35 may perform an automatic repeat request (ARQ) operation by reconfiguring PDCP PDUs to appropriate sizes. Main functions of the RLC entity may be summarized as shown below. However, the functions thereof are not limited thereto.

Transfer of upper layer PDUs
 Error correction through ARQ (only for AM data transfer)
 Concatenation, segmentation and reassembly of RLC SDUs (only for unacknowledged mode (UM) and AM data transfer)
 Re-segmentation of RLC data PDUs (only for AM data transfer)
 Reordering of RLC data PDUs (only for UM and AM data transfer)
 Duplicate detection (only for UM and AM data transfer)
 Protocol error detection (only for AM data transfer)
 RLC SDU discard (only for UM and AM data transfer)
 RLC re-establishment The MAC entity 1b-15 or 1b-30 may be connected to a plurality of RLC entities configured for one UE and may multiplex RLC PDUs into a MAC PDU and may demultiplex the RLC PDUs from the MAC PDU. Main functions of the MAC entity may be summarized as shown below. However, the functions thereof are not limited thereto.

Mapping between logical channels and transport channels
 Multiplexing/demultiplexing of MAC SDUs belonging to one or different logical channels into/from transport blocks (TBs) delivered to/from the physical layer on transport channels
 Scheduling information reporting
 Error correction through hybrid ARQ (HARQ)
 Priority handling between logical channels of one UE
 Priority handling between UEs by means of dynamic scheduling
 Multimedia broadcast/multicast service (MBMS) service identification
 Transport format selection
 Padding A PHY entity 1b-20 or 1b-25 may channel-code and modulate upper layer data into OFDM symbols and transmit the OFDM symbols through a wireless channel, or may demodulate OFDM symbols received through a wireless channel and channel-decode and deliver the OFDM symbols to an upper layer. However, the functions thereof are not limited thereto.

Figure 1C:
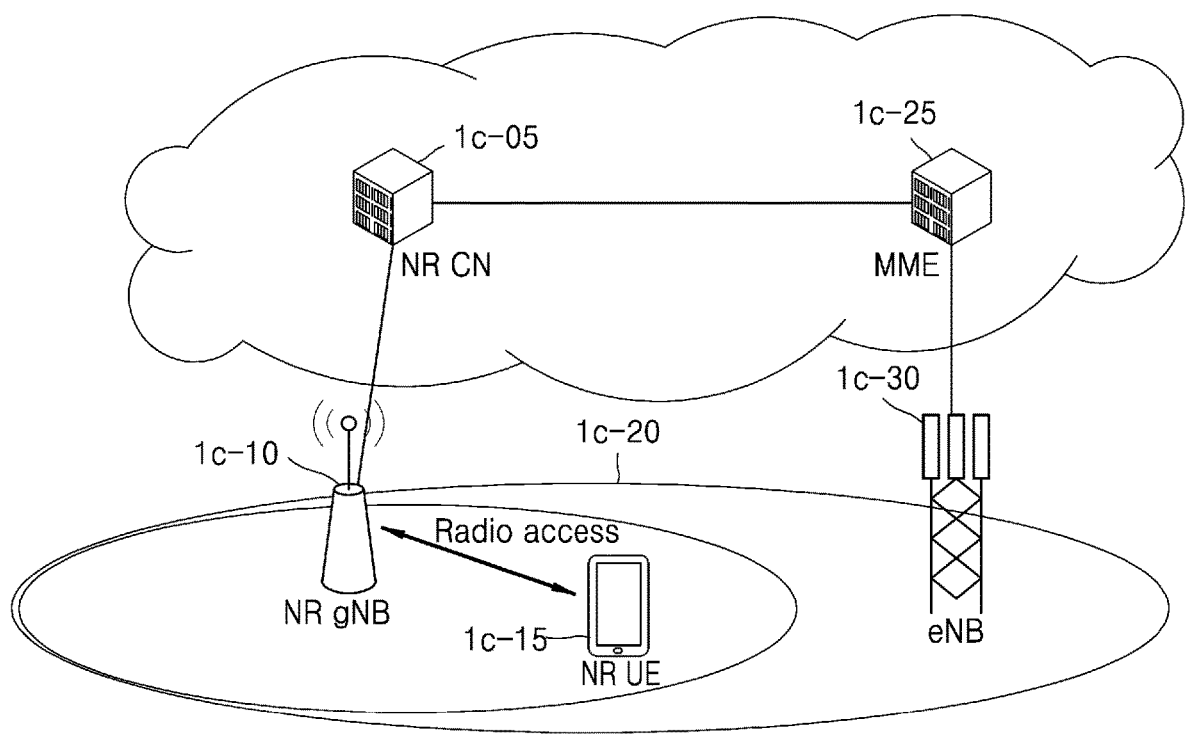
FIG. 1C is a diagram illustrating a next-generation mobile communication system, according to an embodiment of the disclosure.

FIG. 1C is a diagram illustrating a next-generation mobile communication system, according to an embodiment of the disclosure.

Referring to FIG. 1C, as illustrated, a radio access network of the next-generation mobile communication system (hereinafter, referred to as the NR or 5G) communication system) includes a new radio node B (NR gNB, NR NB, or gNB) 1c-10 and a new radio core network (NR CN) 1c-05. A NR UE (or terminal) 1c-15 may access an external network via the NR gNB 1c-10 and the NR CN 1c-05.

In FIG. 1C, the NR gNB 1c-10 may correspond to an existing eNB of an LTE system. The NR gNB 1c-10 may be connected to the NR UE 1c-15 through radio channels and may provide superior services compared to an existing node B. All user traffic data may be serviced through shared channels in the NR or 5G mobile communication system, and thus, an entity for collating buffer status information of UEs, available transmission power status information, and channel state information and performing scheduling may be required and the NR gNB 1c-10 may operate as such an entity. One NR gNB generally controls a plurality of cells. The NR or 5G communication system may have a bandwidth greater than the maximum bandwidth of the existing LTE system so as to achieve an ultra-high data rate, compared to the existing LTE system, and may use OFDM as a radio access technology and may additionally use a beamforming technology. Also, AMC may be used to determine a modulation scheme and a channel coding rate in accordance with a channel state of the UE. The NR CN 1c-05 may perform functions such as mobility support, bearer configuration, and quality of service (QoS) configuration. The NR CN 1c-05 is an entity for performing a mobility management function and various control functions on the NR UE 1c-15 and is connected to a plurality of base stations. The NR or 5G mobile communication system may cooperate with the existing LTE system, and the NR CN 1c-05 may be connected to an MME 1c-25 through a network interface. The MME 1c-25 may be connected to an existing eNB 1c-30.

Figure 1D:
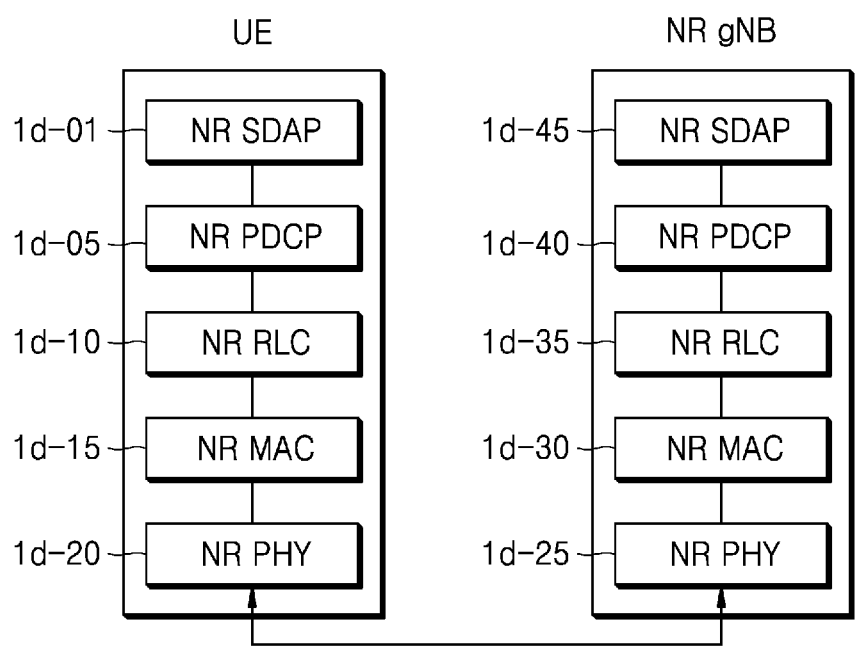
FIG. 1D is a diagram illustrating a radio protocol architecture of a next-generation mobile communication system, according to an embodiment of the disclosure.

FIG. 1D is a diagram illustrating a radio protocol architecture of a NR or 5G mobile communication system, according to an embodiment of the disclosure.

Referring to FIG. 1D, the radio protocol architecture of the NR or 5G mobile communication system may include NR Service Data Adaptation Protocol (SDAP) entities 1d-01 and 1d-45, NR PDCP entities 1d-05 and 1d-40, NR RLC entities 1d-10 and 1d-35, and NR MAC entities 1d-15 and 1d-30 respectively for a UE and an NR gNB.

Main functions of the NR SDAP entity 1d-01 or 1d-45 may include some of the following functions. However, the functions thereof are not limited thereto.
  Transfer of user plane data
  Mapping between a QoS flow and a DRB for both DL and UL
  Marking QoS flow identifier (ID) in both DL and UL packets
  Reflective QoS flow to DRB mapping for the UL SDAP PDUs With regard to a SDAP entity, information about whether to use a header of the SDAP entity or to use functions of the SDAP entity may be configured for the UE by using a RRC message per PDCP entity, per bearer, or per logical channel. When the SDAP header of the SDAP entity is configured, the UE may direct to update or reconfigure UL and DL QoS flow and data bearer mapping information by using a 1-bit non access stratum (NAS) reflective QoS indicator and a 1-bit access stratum (AS) reflective QoS indicator of the SDAP header. The SDAP header may include QoS flow ID information indicating QoS. QoS information may be used as data processing priority information or scheduling information for appropriately supporting a service.

Main functions of the NR PDCP layer 1d-05 or 1d-40 may include some of the following functions. However, the functions thereof are not limited thereto.
  Header compression and decompression: ROHC only
  Transfer of user data
  In-sequence delivery of upper layer PDUs
  Out-of-sequence delivery of upper layer PDUs
  PDCP PDU reordering for reception
  Duplicate detection of lower layer SDUs
  Retransmission of PDCP SDUs
  Ciphering and deciphering
  Timer-based SDU discard in uplink The reordering function of the NR PDCP entity may include at least one of a function of reordering PDCP PDUs received from a lower layer, on a PDCP sequence number (SN) basis, and a function of delivering the reordered data to an upper layer in order. Alternatively, the reordering function of the NR PDCP entity may include at least one of a function of delivering the reordered data to an upper layer out of order, a function of recording missing PDCP PDUs by reordering the received PDCP PDUs, a function of reporting status information of the missing PDCP PDUs to a transmitter, and a function of requesting to retransmit the missing PDCP PDUs.

Main functions of the NR RLC entity 1d-10 or 1d-35 may include some of the following functions. However, the functions thereof are not limited thereto.
  Transfer of upper layer PDUs
  In-sequence delivery of upper layer PDUs
  Out-of-sequence delivery of upper layer PDUs
  Error correction through ARQ
  Concatenation, segmentation and reassembly of RLC SDUs
  Re-segmentation of RLC data PDUs
  Reordering of RLC data PDUs
  Duplicate detection
  Protocol error detection
  RLC SDU discard
  RLC re-establishment The in-sequence delivery function of the NR RLC entity indicates a function of delivering RLC SDUs received from a lower layer to an upper layer in order. The in-sequence delivery function of the NR RLC entity may include at least one of a function of reassembling the RLC SDUs and delivering the reassembled RLC SDU when a plurality of RLC SDUs segmented from one RLC SDU are received, a function of reordering received RLC PDUs on a RLC SN or PDCP SN basis, a function of recording missing RLC PDUs by reordering the received RLC PDUs, a function of reporting status information of the missing RLC PDUs to a transmitter, a function of requesting to retransmit the missing RLC PDUs, a function of delivering only RLC SDUs prior to a missing RLC SDU, to an upper layer in order when the missing RLC SDU exists, or a function of delivering all RLC SDUs received before a timer starts, to an upper layer in order although a missing RLC SDU exists when a certain timer stops.

The out-of-sequence delivery function of the NR RLC entity may process the RLC PDUs in order of reception and deliver the RLC PDUs to the NR PDCP entity regardless of SNs (out-of-sequence delivery), and when a segment is received, the NR RLC entity may reassemble the segment with other segments stored in a buffer or subsequently received, into a whole RLC PDU and may deliver the RLC PDU to the NR PDCP entity. According to some embodiments of the disclosure, the NR RLC entity may not have a concatenation function, and the concatenation function may be performed by the NR MAC entity or be replaced with a multiplexing function of the NR MAC entity.

The out-of-sequence delivery function of the NR RLC may include a function of directly delivering RLC SDUs received from a lower layer to an upper layer out of order. The out-of-sequence delivery function of the NR RLC entity may include at least one of a function of reassembling a plurality of RLC SDUs segmented from one RLC SDU and delivering the reassembled RLC SDU when the segmented RLC SDUs are received, or a function of recording missing RLC PDUs by storing RLC SNs or PDCP SNs of received RLC PDUs and reordering the received RLC PDUs.

The NR MAC entity may be connected to a plurality of NR RLC entities configured for one UE, and main functions of the NR MAC entity may include some of the following functions. However, the functions thereof are not limited thereto.

Mapping between logical channels and transport channels
    Multiplexing/demultiplexing of MAC SDUs
    Scheduling information reporting
    Error correction through HARQ
    Priority handling between logical channels of one UE
    Priority handling between UEs by means of dynamic scheduling
    MBMS service identification
    Transport format selection
    Padding An NR PHY entity 1$d$-20 or 1$d$-25 may channel-code and modulate upper layer data into OFDM symbols and may transmit the OFDM symbols through a wireless channel, or may demodulate OFDM symbols received through a wireless channel and channel-decode and may deliver the OFDM symbols to an upper layer.

In the disclosure, a bearer may include a SRB and a DRB, wherein the SRB represents a Signaling Radio Bearer and the DRB represents a Data Radio Bearer. A UM DRB indicates a DRB configured to use a RLC entity operating in an unacknowledged mode (UM), and an acknowledged mode (AM) DRB indicates a DRB configured to use a RLC entity operating in an AM. An SRB0 refers to an unciphered SRB configured for an MCG for a UE, via which the UE exchanges an RRC message with a BS. An SRB1 refers to a ciphered SRB configured for the MCG for the UE, via which the BS and the UE exchange an RRC message for establishing important connection. An SRB2 refers to a ciphered SRB configured for the MCG for the UE, via which the BS and the UE establish connection and exchange an RRC message related to NAS. An SRB3 refers to a ciphered SRB configured for an SCG for the UE, via which the UE can directly transmit an RRC message to the MCG via an SCG MAC entity. A split SRB refers to an SRB via which one PDCP entity is present in the MCG or the SCG and two RLC entities are connected to one PDCP entity and thus perform data transmission and reception, wherein one RLC entity is connected to an MCG MAC entity and the other RLC entity is connected to SCG MAC entity.

Figure 1E:
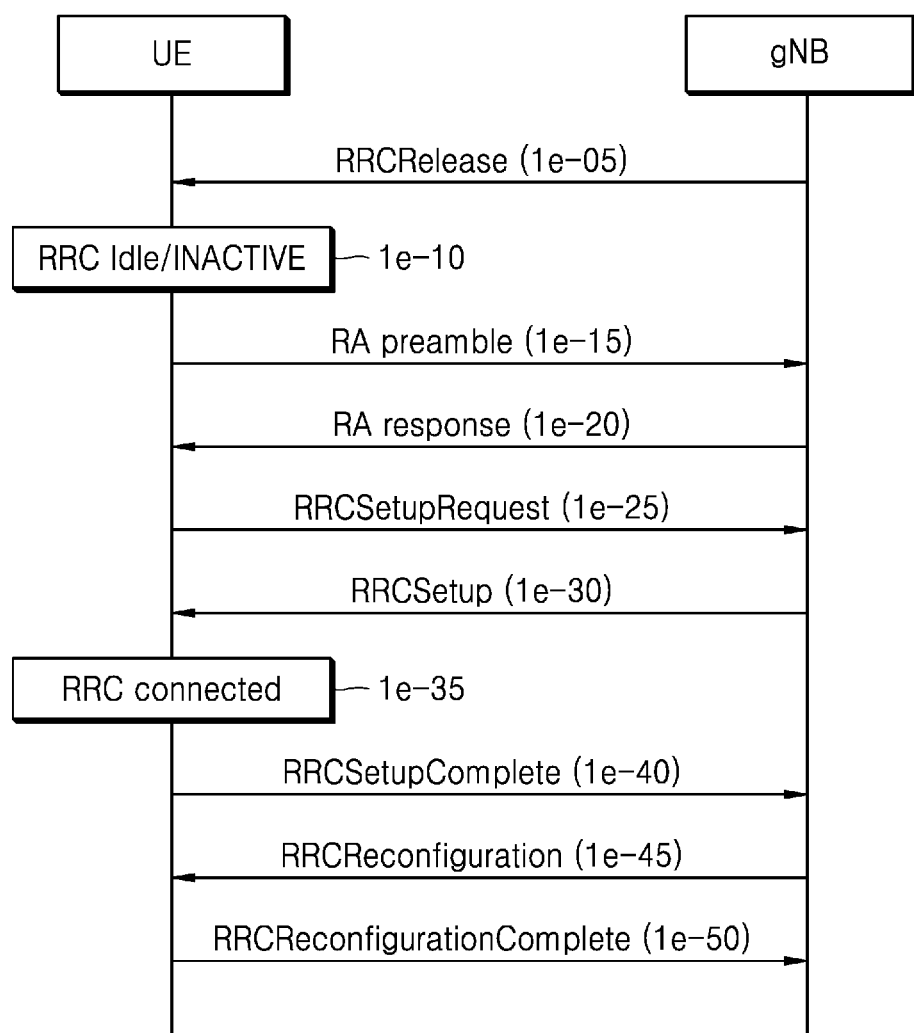
FIG. 1E is a diagram for describing processes of transitioning, by a user equipment (UE), from a Radio Resource Control (RRC) idle mode or an RRC INACTIVE mode to an RRC connected mode, and configuring, by a base station (BS), a Carrier Aggregation (CA) technology, a Dual Connectivity (DC) technology, or a packet duplication technology for the UE, according to an embodiment of the disclosure.

FIG. 1E is a diagram for describing processes of transitioning, by a UE, from an RRC idle mode or an RRC INACTIVE mode to an RRC connected mode, and configuring, by a BS, the CA technology, the DC technology, or the packet duplication technology for the UE in a next-generation mobile communication system, according to an embodiment of the disclosure.

Referring to FIG. 1E, the BS may switch the RRC connected mode of the UE established connection to a network to the RRC idle mode or the RRC INACTIVE mode due to certain reasons. The certain reasons may include a lack of scheduling resources of the BS, a stop of data transmission or reception with the UE for a certain time period, and the like.

The BS may transmit an RRCRelease message to UE, thereby indicating the UE to transition to the RRC idle mode or the RRC INACTIVE mode. The BS may indicate the UE to transition to the RRC INACTIVE mode by using an indicator (suspend-config) included in the RRCRelease message. When the indicator (suspend-config) is not included in the RRCRelease message, the UE may transition to the RRC idle mode (1$e$-05).

When the UE that transition to the RRC idle mode or the RRC INACTIVE mode requests connection to a network due to certain reasons, the UE may perform a random access procedure, may receive a random access response, may request an RRC connection setup, may receive an RRC message, and thus may perform the RRC connection setup (1$e$-10, 1$e$-15, 1$e$-20, 1$e$-25, 1$e$-30, 1$e$-35, and 1$e$-40).

The UE establishes inverse direction transmission synchronization with the BS via the random access procedure, and transmits an RRCSetupRequest message or an RRCResumeRequest message (when the UE is in the RRC INACTIVE mode) to the BS (1$e$-25). The RRCSetupRequest message or the RRCResumeRequest message (when the UE is in the RRC INACTIVE mode) may include an identifier of the UE, an establishment cause, or the like.

The BS transmits an RRCSetup message or an RRCResume message (when the UE is in the RRC INACTIVE mode) to allow the UE to establish RRC connection (1$e$-30). The RRCSetup message or the RRCResume message (when the UE is in the RRC INACTIVE mode) may include at least one of configuration information of each logical channel, configuration information of each bearer, configuration information of a RLC entity, and configuration information of a MAC entity.

The RRCSetup message or the RRCResume message (when the UE is in the RRC INACTIVE mode) may allocate a bearer identifier (e.g., a SRB identifier or a DRB identifier) for each bearer, and may indicate configurations of a PDCP entity, a RLC entity, a MAC entity, and a PHY entity with respect to each bearer. Also, the RRCSetup message or the RRCResume message (when the UE is in the RRC INACTIVE mode) may configure the packet duplication transmission technology.

The BS may configure the packet duplication technology for the UE by applying the DC technology or the DC technology via a RRC message. In detail, the BS may configure a plurality of RLC entities connected to one MAC entity, and may configure the plurality of RLC entities to be connected to one PDCP entity and to perform packet duplication.

As another method, the BS may configure a plurality of RLC entities, which are connected to one MCG MAC entity, to be connected to one PDCP entity, may configure a plurality of RLC entities, which are connected to one SCG MAC entity, to be connected to one PDCP entity, or may configure a plurality of RLC entities connected to different MAC entities to be connected to one PDCP entity, and by doing so, packet duplication may be performed.

Also, the BS may indicate which RLC entity from among a plurality of RLC entities is a primary RLC entity or a secondary RLC entity, by using a logical channel identifier and a bearer identifier in an RRC message. For example, cell group configuration information may indicate configuration information of each RLC entity, and may indicate a bearer identifier and a logical channel identifier corresponding to each RLC entity. Also, bearer configuration information may indicate configuration information of each PDCP entity, and may indicate a bearer identifier corresponding to each PDCP entity, and in a case where a plurality of RLC entities are configured with respect to a PDCP entity or the bearer identifier, the BS may indicate a primary RLC entity by indicating a logical channel identifier corresponding to the primary RLC entity. Therefore, when the UE receives an RRC message, the UE may configure a PDCP entity according to a bearer identifier, may configure a plurality of RLC entities to be connected to the PDCP entity, the plurality of RLC entities corresponding to the bearer identifier, and may designate the primary RLC entity and a plurality of secondary RLC entities.

As another method, when the BS configures, by using an RRC message, a plurality of RLC entities connected to one PDCP entity, the BS may indicate, by using a logical channel identifier (or a SCell identifier) and a bearer identifier, which RLC entity from among the plurality of RLC entities is a primary RLC entity or a secondary RLC entity. For example, cell group configuration information may indicate configuration information of each RLC entity, and may indicate a bearer identifier and logical channel identifier (or a SCell identifier) corresponding to each RLC entity. Also, bearer configuration information may indicate configuration information of each PDCP entity, and may indicate a bearer identifier corresponding to each PDCP entity, and in a case where a plurality of RLC entities are configured with respect to a PDCP entity or the bearer identifier, the BS may indicate a primary RLC entity by indicating a logical channel identifier (or a SCell identifier) corresponding to the primary RLC entity. Therefore, when the UE receives an RRC message, the UE may configure a PDCP entity according to a bearer identifier, may configure a plurality of RLC entities to be connected to the PDCP entity, the plurality of RLC entities corresponding to the bearer identifier, and may designate the primary RLC entity and a plurality of secondary RLC entities by using the logical channel identifier or the SCell identifier.

As another method, when the BS configures, by using an RRC message, a plurality of RLC entities connected to one PDCP entity, the BS may indicate which RLC entity from among the plurality of RLC entities is a primary RLC entity or secondary RLC entities, by using a new identifier (e.g., an identifier such as 0, 1, 2, or 3, which indicates each RLC entity) and a bearer identifier or a logical channel identifier. For example, cell group configuration information may indicate configuration information of each RLC entity, and may indicate a bearer identifier and a logical channel identifier or a new identifier corresponding to each RLC entity. Also, bearer configuration information may indicate configuration information of each PDCP entity, and may indicate a bearer identifier corresponding to each PDCP entity, and in a case where a plurality of RLC entities are configured with respect to a PDCP entity or the bearer identifier, the BS may indicate a primary RLC entity by indicating a logical channel identifier or a new identifier corresponding to the primary RLC entity. A specific value (e.g., an identifier having a lowest value, i.e., 0) of the new identifier may be defined to indicate the primary RLC entity, and RLC entities having different values may be regarded as secondary RLC entities. Therefore, when the UE receives an RRC message, the UE may configure a PDCP entity according to a bearer identifier, may configure a plurality of RLC entities to be connected to the PDCP entity, the plurality of RLC entities corresponding to the bearer identifier, and may designate the primary RLC entity and the plurality of secondary RLC entities by using the logical channel identifier or the new identifier.

As another method, a primary RLC entity is determined from among a plurality of RLC entities connected to one PDCP entity for the packet duplication technology. In this regard, a RLC entity having a lowest identifier value or a highest identifier value (a smallest identifier value or a greatest identifier value) may be configured as the primary RLC entity, and remaining RLC entities may be configured as secondary RLC entities. The lowest identifier value or the highest identifier value (the smallest identifier value or the greatest identifier value) may be determined by using one of the methods described above. The PDCP entity does not apply packet duplication on a PDCP control PDU and may always transmit the PDCP control PDU to the primary RLC entity. In a case where packet duplication is configured for a PDCP data PDU, the PDCP entity may duplicately transmit data to secondary RLC entities different from the primary RLC entity. Methods below of determining a primary RLC entity may be applied to both the UE and the BS.

The UE that set up the RRC connection transmits an RRCSetupComplete message or an RRCResumeComplete message (when the UE is in the RRC INACTIVE mode) to the BS (1e-40). The RRCSetupComplete message or the RRCResumeComplete message (when the UE is in the RRC INACTIVE mode) may include a control message of SERVICE REQUEST requesting, by the UE, an Access and Mobility Function (AMF) or an MME for a bearer configuration for a certain service. The BS may transmit a SERVICE REQUEST message included in an RRCConnetionSetupComplete message or an RRCResumeComplete message (when the UE is in the RRC INACTIVE mode) to the AMF or the MME, and the AMF or the MME may determine whether to provide the service requested by the UE.

As a result of the determination, when the AMF or the MME determines to provide the service requested by the UE, the AMF or the MME transmits an INITIAL CONTEXT SETUP REQUEST message to the BS. The INITIAL CONTEXT SETUP REQUEST message may include Quality of Service (QoS) information to be applied to a configuration of a DRB, security information (e.g., a security key, a security algorithm, or the like) to be applied to the DRB, or the like.

The BS transmits and receives a SecurityModeCommand message and a SecurityModeComplete message to and from the UE so as to configure security, and when the configuration of the security is completed, the BS transmits an RRCConnectionReconfiguration message to the UE (1e-45).

The RRCConnectionReconfiguration message may allocate a bearer identifier (e.g., an SRB identifier or a DRB identifier) to each bearer, and may indicate configurations of a PDCP entity, an RLC entity, a MAC entity, and a PHY entity for each bearer.

Also, the RRCConnectionReconfiguration message may configure an additional SCell to configure the CA technology for the UE, or may provide and configure additional SCG configuration information to configure the DC technology.

The RCConnectionReconfiguration message may include configuration information about a DRB to process user data, and the UE may configure the DRB by using the configuration information about the DRB and may transmit an RRCConnectionReconfigurationComplete message to the BS (1e-45). After the BS completes the configuration of the DRB with the UE, the BS may transmit an INITIAL CONTEXT SETUP COMPLETE message to the AMF or the MME and may complete connection (1e-50).

Also, the RRCConnectionReconfiguration message may configure the packet duplication transmission technology. In the disclosure, the BS may configure the packet duplication technology for the UE by applying the DC technology or the CA technology via a RRC message.

In detail, the BS may configure a plurality of RLC entities connected to one MAC entity, and may configure the plurality of RLC entities to be connected to one PDCP entity and to perform packet duplication.

As another method, the BS may configure a plurality of RLC entities, which are connected to one MCG MAC entity, to be connected to one PDCP entity, may configure a plurality of RLC entities, which are connected to one SCG MAC entity, to be connected to one PDCP entity, or may configure a plurality of RLC entities connected to different MAC entities to be connected to one PDCP entity, and by doing so, packet duplication may be performed.

Also, the BS may indicate which RLC entity from among a plurality of RLC entities is a primary RLC entity or a secondary RLC entity, by using a logical channel identifier and a bearer identifier in an RRC message. For example, cell group configuration information may indicate configuration information of each RLC entity, and may indicate a bearer identifier and a logical channel identifier corresponding to each RLC entity. Also, bearer configuration information may indicate configuration information of each PDCP entity, and may indicate a bearer identifier corresponding to each PDCP entity, and in a case where a plurality of RLC entities are configured with respect to a PDCP entity or the bearer identifier, the BS may indicate a primary RLC entity by indicating a logical channel identifier corresponding to the primary RLC entity. Therefore, when the UE receives an RRC message, the UE may configure a PDCP entity according to a bearer identifier, may configure a plurality of RLC entities to be connected to the PDCP entity, the plurality of RLC entities corresponding to the bearer identifier, and may designate the primary RLC entity and a plurality of secondary RLC entities.

As another method, when the BS configures, by using an RRC message, a plurality of RLC entities connected to one PDCP entity, the BS may indicate, by using a logical channel identifier (or a SCell identifier) and a bearer identifier, which RLC entity from among the plurality of RLC entities is a primary RLC entity or a secondary RLC entity. For example, cell group configuration information may indicate configuration information of each RLC entity, and may indicate a bearer identifier and logical channel identifier (or a SCell identifier) corresponding to each RLC entity. Also, bearer configuration information may indicate configuration information of each PDCP entity, and may indicate a bearer identifier corresponding to each PDCP entity, and in a case where a plurality of RLC entities are configured with respect to a PDCP entity or the bearer identifier, the BS may indicate a primary RLC entity by indicating a logical channel identifier (or a SCell identifier) corresponding to the primary RLC entity. Therefore, when the UE receives an RRC message, the UE may configure a PDCP entity according to a bearer identifier, may configure a plurality of RLC entities to be connected to the PDCP entity, the plurality of RLC entities corresponding to the bearer identifier, and may designate the primary RLC entity and a plurality of secondary RLC entities by using the logical channel identifier or the SCell identifier.

As another method, when the BS configures, by using an RRC message, a plurality of RLC entities connected to one PDCP entity, the BS may indicate which RLC entity from among the plurality of RLC entities is a primary RLC entity or secondary RLC entities, by using a new identifier (e.g., an identifier such as 0, 1, 2, or 3, which indicates each RLC entity) and a bearer identifier or a logical channel identifier. For example, cell group configuration information may indicate configuration information of each RLC entity, and may indicate a bearer identifier and a logical channel identifier or a new identifier corresponding to each RLC entity.

Also, bearer configuration information may indicate configuration information of each PDCP entity, and may indicate a bearer identifier corresponding to each PDCP entity, and in a case where a plurality of RLC entities are configured with respect to a PDCP entity or the bearer identifier, the BS may indicate a primary RLC entity by indicating a logical channel identifier or a new identifier corresponding to the primary RLC entity. A specific value (e.g., an identifier having a lowest value, i.e., 0) of the new identifier may be defined to indicate the primary RLC entity, and RLC entities having different values may be regarded as secondary RLC entities. Therefore, when the UE receives an RRC message, the UE may configure a PDCP entity according to a bearer identifier, may configure a plurality of RLC entities to be connected to the PDCP entity, the plurality of RLC entities corresponding to the bearer identifier, and may designate the primary RLC entity and the plurality of secondary RLC entities by using the logical channel identifier or the new identifier.

As another method, a primary RLC entity is determined from among a plurality of RLC entities connected to one PDCP entity for the packet duplication technology. In this regard, a RLC entity having a lowest identifier value or a highest identifier value (a smallest identifier value or a greatest identifier value) may be regarded and thus configured as the primary RLC entity, and remaining RLC entities may be regarded and thus configured as secondary RLC entities. The lowest identifier value or the highest identifier value (the smallest identifier value or the greatest identifier value) may be determined by using one of the methods described above. The PDCP entity does not apply packet duplication on a PDCP control PDU and may always transmit the PDCP control PDU to the primary RLC entity. In a case where packet duplication is configured for a PDCP data PDU, the PDCP entity may duplicately transmit data to secondary RLC entities different from the primary RLC entity. Methods below of determining a primary RLC entity may be applied to both the UE and the BS.

When the aforementioned procedure is completed, the UE transmits or receives data to or from the BS via a core network (1*e*-55 and 1*e*-60). According to an embodiment, a data transmission procedure may be broadly composed of three operations that are RRC connection setup, security configuration, and DRB configuration. Also, the BS may transmit an RRC Connection Reconfiguration message to newly perform or add configuration for the UE due to certain reasons (1*e*-65). For example, the BS may perform a configuration of adding, releasing, or changing a SCell in the CA technology, and may change, release, or add an SCG configuration in the DC technology.

A procedure in which the BS configures the CA technology or the DC technology for the UE may be summarized as below. After the BS sets up connection with the BS, the BS configures frequency measurement configuration information for the UE in the RRC connected mode and then the UE performs frequency measurement based on the frequency measurement configuration information and reports a result of the measurement to the BS. Afterward, the BS may configure, via an RRC message, configuration information about an additional SCell so as to configure the CA technology for the UE, based on the result of the frequency measurement by the UE, and may activate, inactivate or deactivate SCells by transmitting a MAC CE. Also, the BS may configure configuration information about an additional secondary cell group so as to configure the DC technology for the UE, based on the result of the frequency measurement by the UE. In the above, the packet duplication transmission technology may also be configured.

Figure 1F:
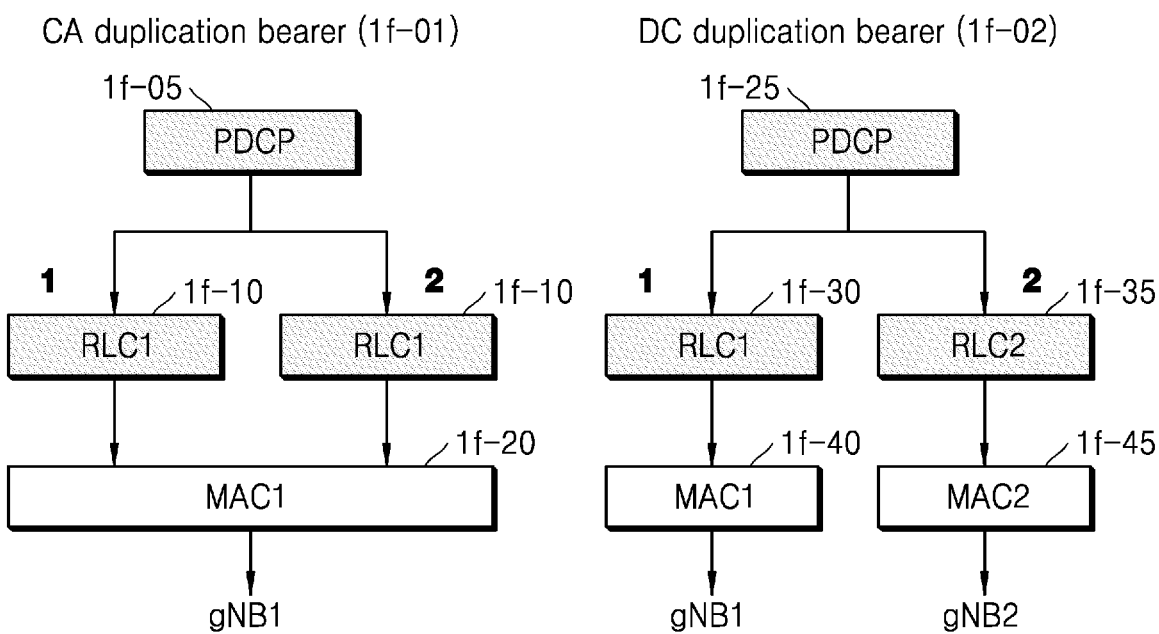
FIG. 1F illustrates a protocol entity for which the packet duplication technology is configured, according to an embodiment of the disclosure.

FIG. 1F illustrates a protocol entity for which the packet duplication technology is configured, according to an embodiment of the disclosure.

In FIG. 1F, the BS may configure the packet duplication technology for the UE by applying the CA technology via an RRC message (1*f*-01). In detail, the BS may configure a plurality of RLC entities 1*f*-10 and 1*f*-15 connected to one MAC entity 1*f*-20, and may configure the plurality of RLC entities to be connected to one PDCP entity 1*f*-05 and to perform packet duplication.

In FIG. 1F, the BS may configure the packet duplication technology for the UE by applying the DC technology via an RRC message. In detail, the BS may configure a plurality of RLC entities 1*f*-30 and 1*f*-35, which are connected to different MAC entities 1*f*-40 and 1*f*-45, to be connected to one PDCP entity 1*f*-25 and to perform packet duplication.

Figure 1H:
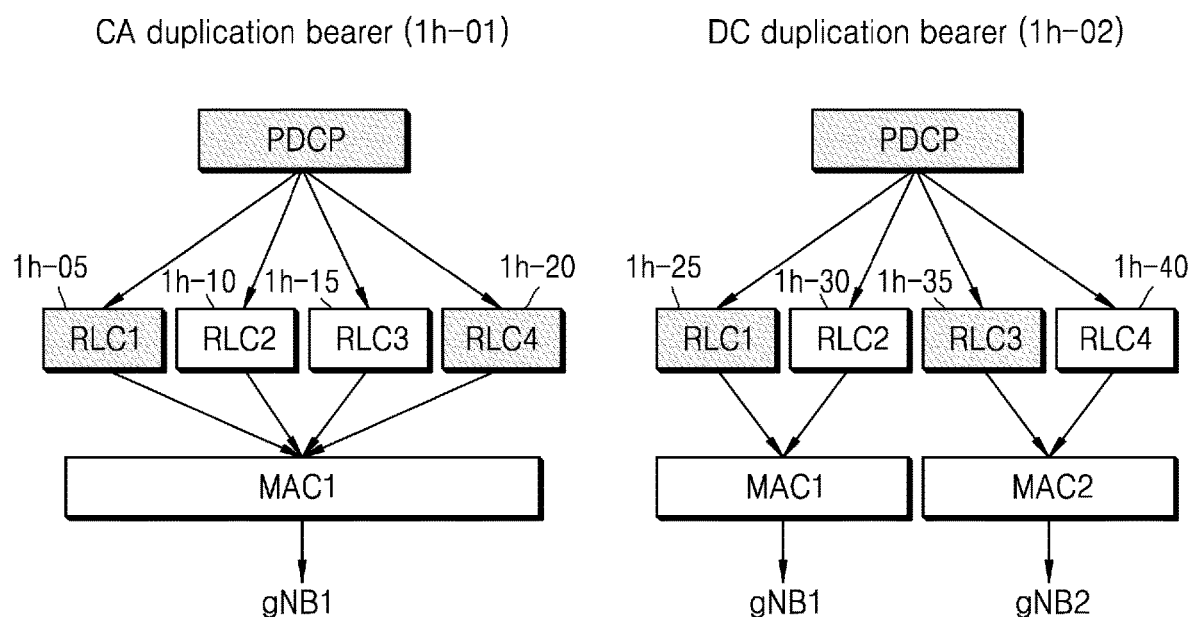
FIG. 1H illustrates a protocol entity for which the packet duplication technology is configured, according to an embodiment of the disclosure.

FIGS. 1G and 1H illustrate protocol entities for which another packet duplication technology is configured, according to an embodiment of the disclosure.

In the disclosure, as in FIGS. 1G and 1H, an embodiment in which one primary RLC entity is configured and maximal three secondary RLC entities are configured is considered. However, the embodiments of the disclosure may be extensively applied to embodiments in which one or more primary RLC entities or one or more secondary RLC entities are configured.

In the disclosure, as in FIG. 1H, when a plurality of RLC entities (or logical channel identifiers) are configured for the UE for which the packet duplication transmission technology is configured, provided are methods of dynamically activating (or indicating to perform duplicate transmission) some RLC entities 1*h*-05, 1*h*-20, 1*h*-25, and 1*h*-35 from among the plurality of configured RLC entities or deactivating (or indicating to stop duplicate transmission) some RLC entities 1*h*-10, 1*h*-15, 1*h*-30, and 1*h*-40. According to an embodiment of the disclosure, a primary RLC entity may not be deactivated. In the disclosure, when a plurality of RLC entities (or logical channel identifiers) are configured for the UE for which the packet duplication transmission technology is configured, provided is Embodiment 1 of dynamically activating (or indicating to perform duplicate transmission) some RLC entities from among the plurality of configured RLC entities or deactivating (or indicating to stop duplicate transmission) some RLC entities. Embodiment 1 is characterized in that, when the DC technology is configured, a MCG BS configures activation and deactivation of RLC entities that are connected to a MCG MAC entity of the UE and for which the packet duplication transmission technology is configured, and a SCG BS configures activation and deactivation of RLC entities that are connected to a SCG MAC entity of the UE and for which the packet duplication transmission technology is configured.

FIG. 1I illustrates Embodiment 1 of, when a plurality of RLC entities (or logical channel identifiers) are configured for the UE for which the packet duplication transmission technology is configured, dynamically activating (or indicating to perform duplicate transmission) some RLC entities from among the plurality of configured RLC entities or deactivating (or indicating to stop duplicate transmission) some RLC entities, according to an embodiment of the disclosure.

Embodiment 1-1 1*i*-01 of the disclosure proposes a method of defining a new MAC CE, and dynamically activating (or indicating to perform duplicate transmission) some RLC entities from among a plurality of RLC entities or deactivating (or indicating to stop duplicate transmission) some RLC entities, based on the MAC CE.

In Embodiment 1-1 1*i*-01, a separate logical channel identifier for the proposed MAC CE may be allocated, and an L field may not exist in an MAC header for the MAC CE. However, the disclosure is not limited thereto. Also, the MAC header and the MAC CE may have a fixed size. However, the disclosure is not limited thereto. In Embodiment 1-1 1*i*-01, a bitmap is introduced (e.g., D0 to D7) to the MAC CE, and bits of the bitmap may be respectively mapped to bearer identifier values of bearers in an ascending order (or a descending order), wherein the packet duplication technology is configured for the bearers. That is, each bit of the bitmap may indicate one bearer for which the packet duplication technology is configured. Also, four bits corresponding to each bit of the bitmap may be configured (or allocated) for the MAC CE (e.g., L00, L01, L02, and L03 bits that correspond to D0) and thus may indicate a plurality of RLC entities connected to a bearer for which the packet duplication technology is configured. The four bits corresponding to each bit of the bitmap may be mapped respectively to logical channel identifier values (or new identifier values), which are configured for respective RLC entities, in an ascending order (or a descending order). As another method, the four bits corresponding to each bit of the bitmap may be mapped to respectively SCell identifier values, which are mapped to logical channel identifiers of respective RLC entities, in an ascending order (or a descending order).

A bearer identifier may be configured as a natural number from among 0 to 31 or 1 to 32 or a binary numeral corresponding thereto, and a logical channel identifier may be configured as a natural number from among 0 to 63 or a binary numeral corresponding thereto. In a case where D1 is configured as 1 or D0 is configured as 0, L00, L01, L02, and L03 fields corresponding to D0 may be padded to zero. On the contrary, in a case where D1 is configured as 0 or D0 is configured as 1, L10, L11, L12, and L13 fields corresponding to D1 may be padded to zero, and the same may be applied to other fields. In the above descriptions, when an L field is 0 (or 1), this may indicate that a secondary RLC entity corresponding thereto is to be deactivated, and when the L field is 1 (or 0), this may indicate that a secondary RLC entity corresponding thereto is to be activated.

As another method, in Embodiment 1-1, a bitmap may not be used, a MAC CE of FIG. 1I may have only L fields, and Method 1, Method 2, Method 3, Method 4, Method 5, Method 6, Method 7 or Method 8 proposed in the disclosure may be used such that positions of L fields or sub-indexes of the L fields in a MAC CE structure may be mapped respectively to RLC entities or bearer identifier values of bearers in an ascending order (or a descending order), wherein the packet duplication technology is configured for the bearers. That is, a position of the L field or a sub-index of the L field may indicate one bearer for which the packet duplication technology is configured. Also, four bits corresponding to a bearer may be configured to indicate a plurality of RLC entities connected to the bearer for which the packet duplication technology is configured. The four bits may be mapped to respective RLC entities by using Method 1, Method 2, Method 3, Method 4, Method 5, Method 6, Method 7 or Method 8 proposed in the disclosure.

For example, when an L field has "a" and "b" as sub-indexes (e.g., L_(a,b), 1*i*-01), the sub-index "a" may indicate an $a^{th}$ bearer in an ascending order of bearer identifiers, and the sub-index "b" may indicate each of three bits and may indicate a $b^{th}$ RLC entity (e.g., a secondary RLC entity) by using Method 4, Method 5, Method 6, Method 7, or Method 8 proposed in the disclosure. Accordingly, when a bearer having 5 as a bearer identifier and a bearer having 8 as a bearer identifier for which the packet duplication technology is configured are configured for a UE, a primary RLC entity and secondary RLC entities which correspond to the bearer having 5 as the bearer identifier may be mapped to L_(0,0), L_(0,1), L_(0,2), and L_(0,3) and thus may have a value of 0 or 1, a primary RLC entity and secondary RLC entities which correspond to the bearer having 8 as the bearer identifier may be mapped to L_(1,0), L_(1,1), L_(1,2), and L_(1,3) and thus may have a value of 0 or 1, and all remaining L field values are not used and are padded to have a value of 0. Maximal eight bearers for which the packet duplication is configured may be configured.

A bearer identifier (e.g., 5 bits) may be configured as a natural number from among 0 to 31 or 1 to 32 or a binary numeral corresponding thereto, a logical channel identifier (e.g., 6 bits) may be configured as a natural number from among 0 to 63 or a binary numeral corresponding thereto, and a cell group identifier (e.g., 2 bits) may be configured as a natural number from among 0 to 3 or 1 to 4 or a binary numeral corresponding thereto.

Embodiment 1-2 1i-02 proposed in the disclosure may have the same characteristics as those of Embodiment 1-1 1i-01, and may allocate a separate logical channel identifier for a MAC CE. Also, according to an embodiment of the disclosure, an L field may not exist in an MAC header for the MAC CE. However, the disclosure is not limited thereto. Also, the MAC header may have a fixed size but the MAC CE may have a flexible size. However, the disclosure is not limited thereto. Compared with Embodiment 1-1 1i-01, in Embodiment 1-2 1i-02, four bits corresponding to a bearer identifier that is not configured as 1 but is configured as 0 in a bitmap field may be skipped. In detail, when D1 and D0 of the bitmap are configured as 0, 1 bit for L00, L01, L02, L03, L10, L11, L12, and L13 fields in L fields positioned immediately next to the bitmap may be skipped. That is, when D2 and D3, D4 and D5, or D6 and D7 are each configured as 0, 1 bit may be skipped, and the L fields positioned immediately next to the bitmap may indicate four bits that correspond to lowest D fields for which 1 is configured. Also, when D1 is configured as 1 or D0 is configured as 0, L00, L01, L02, and L03 fields corresponding to D0 may be padded to zero. On the contrary, in a case where D1 is configured as 0 or D0 is configured as 1, L10, L11, L12, and L13 fields corresponding to D1 may be padded to zero, and the same may be applied to other fields.

FIG. 1J illustrates Embodiment 2 of, when a plurality of RLC entities (or logical channel identifiers) are configured for the UE for which the packet duplication transmission technology is configured, dynamically activating (or indicating to perform duplicate transmission) some RLC entities from among the plurality of configured RLC entities or deactivating (or indicating to stop duplicate transmission) some RLC entities, according to an embodiment of the disclosure.

In the disclosure, when a plurality of RLC entities (or logical channel identifiers) are configured for the UE for which the packet duplication transmission technology is configured, provided is Embodiment 2 of dynamically activating (or indicating to perform duplicate transmission) some RLC entities from among the plurality of configured RLC entities or deactivating (or indicating to stop duplicate transmission) some RLC entities. In Embodiment 2, when the DC technology is configured, a MCG BS may configure activation and deactivation of RLC entities that are connected to a MCG MAC entity of the UE and for which the packet duplication transmission technology is configured, and a SCG BS may configure activation and deactivation of RLC entities that are connected to a SCG MAC entity of the UE and for which the packet duplication transmission technology is configured.

Embodiment 2-1 1j-01 of the disclosure proposes a method of defining a new MAC CE, and dynamically activating (or indicating to perform duplicate transmission) some RLC entities from among a plurality of RLC entities or deactivating (or indicating to stop duplicate transmission) some RLC entities, based on the MAC CE.

In Embodiment 2-1 1j-01, a separate logical channel identifier (or a new identifier) for the proposed MAC CE may be allocated, and an L field may not exist in an MAC header for the MAC CE. However, the disclosure is not limited thereto. Also, the MAC header and the MAC CE may have a fixed size. However, the disclosure is not limited thereto. In Embodiment 2-1 1j-01, a bitmap is introduced (e.g., D0 to D7) to the MAC CE, and bits of the bitmap may be respectively mapped to bearer identifier values of bearers in an ascending order (or a descending order), wherein the packet duplication technology is configured for the bearers. That is, each bit of the bitmap may indicate one bearer for which the packet duplication technology is configured. Also, three bits corresponding to each bit of the bitmap may be configured (or allocated) for the MAC CE (e.g., L00, L01, and L02 that correspond to D0) and thus may indicate a plurality of secondary RLC entities connected to a bearer for which the packet duplication technology is configured. Because primary RLC entities may not be deactivated, the MAC CE may indicate activation or deactivation of only secondary RLC entities. Three bits of the MAC CE may be mapped respectively to logical channel identifier values (or new identifier values), which are configured for respective secondary RLC entities, in an ascending order (or a descending order). As another method, three bits may be mapped respectively to SCell identifier values, which are mapped to logical channel identifiers of respective secondary RLC entities, in an ascending order (or a descending order).

A bearer identifier may be configured as a natural number from among 0 to 31 or 1 to 32 or a binary numeral corresponding thereto, and a logical channel identifier may be configured as a natural number from among 0 to 63 or a binary numeral corresponding thereto. In a case where D1 is configured as 1 or D0 is configured as 0, L00, L01, and L02 fields corresponding to D0 may be padded to zero. On the contrary, in a case where D1 is configured as 0 or D0 is configured as 1, L10, L11, and L12 fields corresponding to D1 may be padded to zero, and the same may be applied to other fields. Also, R fields may not be used as a reservation field. In the above descriptions, when an L field is 0 (or 1), this may indicate that a secondary RLC entity corresponding thereto is to be deactivated, and when the L field is 1 (or 0), this may indicate that a secondary RLC entity corresponding thereto is to be activated.

As another method, in Embodiment 2-1, a bitmap may not be used, only L fields may be included in 1j-01, and Method 1, Method 2, Method 3, Method 4, Method 5, Method 6, Method 7 or Method 8 proposed in the disclosure may be used such that positions of L fields or sub-indexes of the L fields in a MAC CE structure may be mapped respectively to RLC entities or bearer identifier values of bearers in an ascending order (or a descending order), wherein the packet duplication technology is configured for the bearers. That is, a position of the L field or a sub-index of the L field may indicate one bearer for which the packet duplication technology is configured. Also, three bits corresponding to a bearer may be configured to indicate a plurality of secondary RLC entities connected to the bearer for which the packet duplication technology is configured. The three bits may be mapped to respective RLC entities by using Method 4, Method 5, Method 6, Method 7 or Method 8 proposed in the disclosure. According to an embodiment of the disclosure, the three bits may indicate the plurality of secondary RLC entities connected to the bearer for which the packet duplication technology is configured. Because the primary RLC entities may not be deactivated, a BS may indicate activation or deactivation of only the secondary RLC entities.

For example, when an L field has "a" and "b" as sub-indexes (e.g., L_(a,b), 1j-01), the sub-index "a" may indicate an $a^{th}$ bearer in an ascending order of bearer identifiers, and the sub-index "b" may indicate each of three bits and may indicate a $b^{th}$ RLC entity (e.g., a secondary RLC entity) by using Method 4, Method 5, Method 6, Method 7, or Method 8 proposed in the disclosure. Accordingly, when a bearer having 5 as a bearer identifier and a bearer having 8 as a bearer identifier for which the packet duplication technology is configured are configured for a UE, a primary RLC entity and secondary RLC entities which correspond to the bearer having 5 as the bearer identifier may be mapped to L_(0,0), L_(0,1), and L_(0,2) and thus may have a value of 0 or 1, a primary RLC entity and secondary RLC entities which correspond to the bearer having 8 as the bearer identifier may be mapped to L_(1,0), L_(1,1), and L_(1,2) and thus may have a value of 0 or 1, and all remaining L field values are not used and are padded to have a value of 0. Maximal eight bearers for which the packet duplication is configured may be configured.

A bearer identifier (e.g., 5 bits) may be configured as a natural number from among 0 to 31 or 1 to 32 or a binary numeral corresponding thereto, a logical channel identifier (e.g., 6 bits) may be configured as a natural number from among 0 to 63 or a binary numeral corresponding thereto, and a cell group identifier (e.g., 2 bits) may be configured as a natural number from among 0 to 3 or 1 to 4 or a binary numeral corresponding thereto.

Embodiment 2-2 1j-02 proposed in the disclosure may have the same characteristics as those of Embodiment 2-1 1j-01, and may allocate a separate logical channel identifier (or a new identifier) for a MAC CE. Also, according to an embodiment of the disclosure, an L field may not exist in an MAC header for the MAC CE. However, the disclosure is not limited thereto. Also, the MAC header may have a fixed size but the MAC CE may have a variable size. However, the disclosure is not limited thereto. Compared with Embodiment 2-1 1j-01, in Embodiment 2-2 1j-02, four bits including a reservation bit corresponding to a bearer identifier that is not configured as 1 but is configured as 0 in a bitmap field may be skipped. In detail, when D1 and D0 of the bitmap are configured as 0, 1 bit for L00, L01, L02, R, L10, L11, L12, and R fields in L fields positioned immediately next to the bitmap may be skipped. That is, when D2 and D3, D4 and D5, or D6 and D7 are each configured as 0, 1 bit may be skipped, and the R fields or the L fields positioned immediately next to the bitmap may indicate four bits that correspond to lowest D fields for which 1 is configured. Also, when D1 is configured as 1 or D0 is configured as 0, L00, L01, and L02 fields corresponding to D0 may be padded to zero. On the contrary, in a case where D1 is configured as 0 or D0 is configured as 1, L10, L11, and L12 fields corresponding to D1 may be padded to zero, and the same may be applied to other fields. Also, the R fields may not be used as a reservation field.

FIG. 1K illustrates Embodiment 3 of, when a plurality of RLC entities (or logical channel identifiers) (or new identifiers) are configured for the UE for which the packet duplication transmission technology is configured, dynamically activating (or indicating to perform duplicate transmission) some RLC entities from among the plurality of configured RLC entities or deactivating (or indicating to stop duplicate transmission) some RLC entities, according to an embodiment of the disclosure.

In the disclosure, when a plurality of RLC entities (or logical channel identifiers) are configured for the UE for which the packet duplication transmission technology is configured, provided is Embodiment 3 of dynamically activating (or indicating to perform duplicate transmission) some RLC entities from among the plurality of configured RLC entities or deactivating (or indicating to stop duplicate transmission) some RLC entities. In Embodiment 3, when the DC technology is configured, a MCG BS or a SCG BS may configure activation and deactivation of RLC entities that are connected to a MCG MAC entity of the UE and for which the packet duplication transmission technology is configured, and the MCG BS or the SCG BS may configure activation and deactivation of RLC entities that are connected to a SCG MAC entity of the UE and for which the packet duplication transmission technology is configured.

Embodiment 3-1 1k-01 of the disclosure proposes a method of defining a new MAC CE, and dynamically activating (or indicating to perform duplicate transmission) some RLC entities from among a plurality of RLC entities or deactivating (or indicating to stop duplicate transmission) some RLC entities, based on the MAC CE.

In Embodiment 3-1 1k-01, a separate logical channel identifier for the proposed MAC CE may be allocated, and an L field may not exist in an MAC header for the MAC CE. However, the disclosure is not limited thereto. Also, the MAC header and the MAC CE may have a fixed size. However, the disclosure is not limited thereto. In Embodiment 3-1 1k-01, a bitmap is introduced (e.g., D0 to D7) to the MAC CE, and bits of the bitmap may be respectively mapped to bearer identifier values of bearers in an ascending order (or a descending order), wherein the packet duplication technology is configured for the bearers. That is, each bit of the bitmap may indicate one bearer for which the packet duplication technology is configured. Also, three bits corresponding to each bit of the bitmap may be configured (or allocated) for the MAC CE (e.g., L00, L01, and L02 that correspond to D0) and thus may indicate a plurality of secondary RLC entities connected to a bearer for which the packet duplication technology is configured. Because primary RLC entities may not be deactivated, the MAC CE may indicate activation or deactivation of only secondary RLC entities. Three bits of the MAC CE may be mapped respectively to logical channel identifier values (or new identifier values), which are configured for respective secondary RLC entities, in an ascending order (or a descending order). As another method, three bits may be mapped respectively to SCell identifier values, which are mapped to logical channel identifiers of respective secondary RLC entities, in an ascending order (or a descending order).

A bearer identifier may be configured as a natural number from among 0 to 31 or 1 to 32 or a binary numeral corresponding thereto, and a logical channel identifier (or a new identifier value) may be configured as a natural number from among 0 to 63 or a binary numeral corresponding thereto. In a case where D1 is configured as 1 or D0 is configured as 0, L00, L01, and L02 fields corresponding to D0 may be padded to zero. On the contrary, in a case where D1 is configured as 0 or D0 is configured as 1, L10, L11, and L12 fields corresponding to D1 may be padded to zero, and the same may be applied to other fields.

Also, G fields may indicate a cell group to which a logical channel identifier (or a new identifier value) is connected. For example, when G fields are connected to a MCG, the G fields may have a value of 0 (or 1), and when the G fields are connected to a SCG, the G fields may have a value of 1 (or 0). Therefore, both the MCG BS and the SCG BS may activate and deactivate not only RLC entities connected to a MCG MAC entity of the UE but also activate and deactivate RLC entities connected to SCG MAC entities. In the above descriptions, when an L field is 0 (or 1), this may indicate that a secondary RLC entity corresponding thereto is to be deactivated, and when the L field is 1 (or 0), this may indicate that a secondary RLC entity corresponding thereto is to be activated.

As another method, in Embodiment 3-1, a bitmap may not be used, only L fields may be included in 1k-01, and Method 1, Method 2, Method 3, Method 4, Method 5, Method 6, Method 7 or Method 8 proposed in the disclosure may be used such that positions of L fields or sub-indexes of the L fields in a MAC CE structure may be mapped respectively to RLC entities or bearer identifier values of bearers in an ascending order (or a descending order), wherein the packet duplication technology is configured for the bearers. That is, a position of the L field or a sub-index of the L field may indicate one bearer for which the packet duplication technology is configured. Also, three bits corresponding to a bearer may be configured to indicate a plurality of secondary RLC entities connected to the bearer for which the packet duplication technology is configured. The three bits may be mapped to respective RLC entities by using Method 4, Method 5, Method 6, Method 7 or Method 8 proposed in the disclosure. According to an embodiment of the disclosure, the three bits may indicate the plurality of secondary RLC entities connected to the bearer for which the packet duplication technology is configured. Because the primary RLC entities may not be deactivated, a BS may indicate activation or deactivation of only the secondary RLC entities.

For example, when an L field has "a" and "b" as sub-indexes (e.g., L_(a,b), 1k-01), the sub-index "a" may indicate an $a^{th}$ bearer in an ascending order of bearer identifiers, and the sub-index "b" may indicate each of three bits and may indicate a $b^{th}$ RLC entity (e.g., a secondary RLC entity) by using Method 4, Method 5, Method 6, Method 7, or Method 8 proposed in the disclosure. Accordingly, when a bearer having 5 as a bearer identifier and a bearer having 8 as a bearer identifier for which the packet duplication technology is configured are configured for a UE, a primary RLC entity and secondary RLC entities which correspond to the bearer having 5 as the bearer identifier may be mapped to L_(0,0), L_(0,1), and L_(0,2) and thus may have a value of 0 or 1, a primary RLC entity and secondary RLC entities which correspond to the bearer having 8 as the bearer identifier may be mapped to L_(1,0), L_(1,1), and L_(1,2) and thus may have a value of 0 or 1, and all remaining L field values are not used and are padded to have a value of 0. Maximal eight bearers for which the packet duplication is configured may be configured.

A bearer identifier (e.g., 5 bits) may be configured as a natural number from among 0 to 31 or 1 to 32 or a binary numeral corresponding thereto, a logical channel identifier (e.g., 6 bits) may be configured as a natural number from among 0 to 63 or a binary numeral corresponding thereto, and a cell group identifier (e.g., 2 bits) may be configured as a natural number from among 0 to 3 or 1 to 4 or a binary numeral corresponding thereto.

Embodiment 3-2 1k-02 proposed in the disclosure may have the same characteristics as those of Embodiment 3-1 1k-01, and may allocate a separate logical channel identifier for a MAC CE. Also, according to an embodiment of the disclosure, an L field may not exist in an MAC header for the MAC CE. However, the disclosure is not limited thereto. Also, the MAC header may have a fixed size but the MAC CE may have a variable size. Compared with Embodiment 3-1 1k-01, in Embodiment 3-2 1k-02, four bits including a G field corresponding to a bearer identifier that is not configured as 1 but is configured as 0 in a bitmap field may be skipped. In detail, when D1 and D0 of the bitmap are configured as 0, 1 bit for L00, L01, L02, R, L10, L11, L12, and R fields in L fields positioned immediately next to the bitmap may be skipped. That is, when D2 and D3, D4 and D5, or D6 and D7 are each configured as 0, 1 bit may be skipped, and the G fields or the L fields positioned immediately next to the bitmap may indicate four bits that correspond to lowest D fields for which 1 is configured. Also, when D1 is configured as 1 or D0 is configured as 0, L00, L01, and L02 fields corresponding to D0 may be padded to zero. On the contrary, in a case where D1 is configured as 0 or D0 is configured as 1, L10, L11, and L12 fields corresponding to D1 may be padded to zero, and the same may be applied to other fields.

Figure 1L:
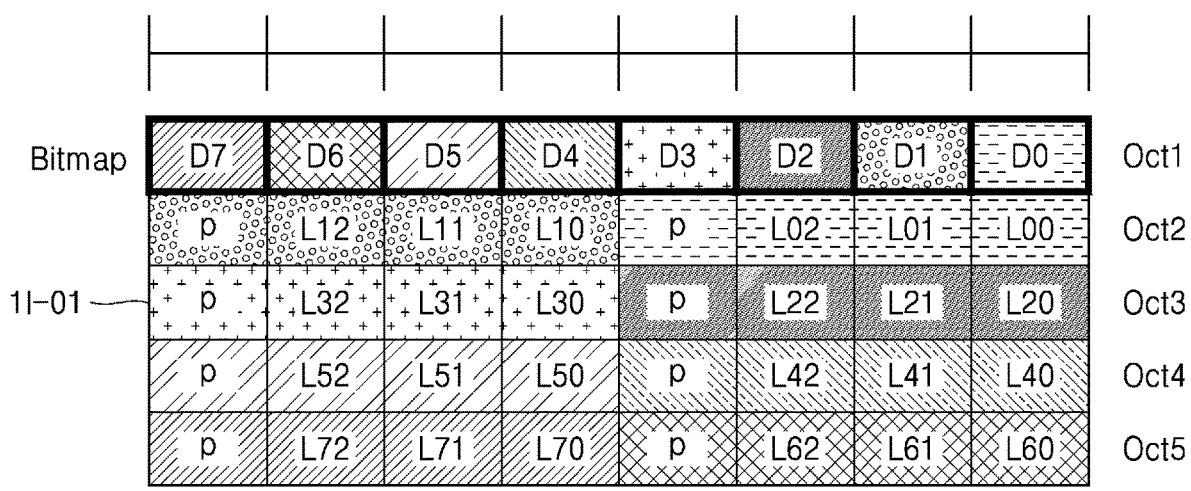
FIG. 1L illustrates Embodiment 4 of, when a plurality of RLC entities are configured for the UE for which the packet duplication transmission technology is configured, dynamically activating or deactivating some RLC entities from among the plurality of configured RLC entities, according to an embodiment of the disclosure.

FIG. 1L illustrates Embodiment 4 of, when a plurality of RLC entities (or logical channel identifiers) (or new identifiers) are configured for the UE for which the packet duplication transmission technology is configured, dynamically activating (or indicating to perform duplicate transmission) some RLC entities from among the plurality of configured RLC entities or deactivating (or indicating to stop duplicate transmission) some RLC entities, according to an embodiment of the disclosure.

In the disclosure, when a plurality of RLC entities (or logical channel identifiers) are configured for the UE for which the packet duplication transmission technology is configured, provided is Embodiment 4 of dynamically activating (or indicating to perform duplicate transmission) some RLC entities from among the plurality of configured RLC entities or deactivating (or indicating to stop duplicate transmission) some RLC entities. In Embodiment 4, when the DC technology is configured, a MCG BS may configure activation and deactivation of RLC entities that are connected to a MCG MAC entity of the UE and for which the packet duplication transmission technology is configured, and a SCG BS may configure activation and deactivation of RLC entities that are connected to a SCG MAC entity of the UE and for which the packet duplication transmission technology is configured.

Embodiment 4-1 1l-01 of the disclosure proposes a method of defining a new MAC CE, and dynamically activating (or indicating to perform duplicate transmission) some RLC entities from among a plurality of RLC entities or deactivating (or indicating to stop duplicate transmission) some RLC entities, based on the MAC CE.

In Embodiment 4-1 1l-01, a separate logical channel identifier for the proposed MAC CE may be allocated, and an L field may not exist in an MAC header for the MAC CE. However, the disclosure is not limited thereto. Also, the MAC header and the MAC CE may have a fixed size. However, the disclosure is not limited thereto. In Embodiment 4-1 1l-01, a bitmap is introduced (e.g., D0 to D7) to the MAC CE, and bits of the bitmap may be respectively mapped to bearer identifier values of bearers in an ascending order (or a descending order), wherein the packet duplication technology is configured for the bearers. That is, each bit of the bitmap may indicate one bearer for which the packet duplication technology is configured. Also, three bits corresponding to each bit of the bitmap may be configured (or allocated) (e.g., L00, L01, and L01 that correspond to D0) and thus may indicate a plurality of secondary RLC entities connected to a bearer for which the packet duplication technology is configured. Because primary RLC entities may not be deactivated, the MAC CE may indicate activation or deactivation of only secondary RLC entities. Three bits may be mapped respectively to logical channel identifier values (or new identifier values), which are configured for respective secondary RLC entities, in an ascending order (or a descending order). As another method, three bits may be mapped respectively to SCell identifier values, which are mapped to logical channel identifiers of respective secondary RLC entities, in an ascending order (or a descending order).

A bearer identifier may be configured as a natural number from among 0 to 31 or 1 to 32 or a binary numeral corresponding thereto, and a logical channel identifier (or a new identifier value) may be configured as a natural number from among 0 to 63 or a binary numeral corresponding thereto. In a case where D1 is configured as 1 or D0 is configured as 0, L00, L01, and L02 fields corresponding to D0 may be padded to zero. On the contrary, in a case where D1 is configured as 0 or D0 is configured as 1, L10, L11, and L12 fields corresponding to D1 may be padded to zero, and the same may be applied to other fields.

Also, P fields are fields for dynamically indicating to change an existing primary RLC entity to a secondary RLC entity, the existing primary RLC entity being connected to a bearer for which the packet duplication transmission technology is configured and which corresponds to a D field, and to change another secondary RLC entity to a new primary RLC entity. For example, when a P field is configured as 1, the MAC CE may not indicate activation and deactivation of the RLC entities connected to the bearer for which the packet duplication transmission technology is configured and which corresponds to the D field but may indicate to configure or change a new primary RLC entity for the bearer. That is, in a case where the P field is configured as 1 and an L field from among three L fields corresponding to the D field is configured as 1, the case may mean that a secondary RLC entity corresponding to the L field configured as 1 is to be configured as a new primary RLC entity, and an existing primary RLC entity is to be changed to a secondary RLC entity.

Also, L fields corresponding to a D field may be mapped again in an ascending order (or a descending order), in consideration of a logical channel identifier (or a new identifier value) of the secondary RLC entity that is newly changed due to the P field. When the P field is configured as 0, the MAC CE may indicate activation and deactivation of the RLC entities connected to the bearer for which the packet duplication transmission technology is configured and which corresponds to the D field. Also, the MAC CE may indicate that, when an L field is 0 (or 1), a secondary RLC entity corresponding thereto is to be deactivated, and when the L field is 1 (or 0), the secondary RLC entity corresponding thereto is to be activated.

As another method, in Embodiment 4-1, a bitmap may not be used, only L fields may be included in 1*l*-01, and Method 1, Method 2, Method 3, Method 4, Method 5, Method 6, Method 7 or Method 8 proposed in the disclosure may be used such that positions of L fields or sub-indexes of the L fields in a MAC CE structure may be mapped respectively to RLC entities or bearer identifier values of bearers in an ascending order (or a descending order), wherein the packet duplication technology is configured for the bearers. That is, a position of the L field or a sub-index of the L field may indicate one bearer for which the packet duplication technology is configured. Also, three bits corresponding to a bearer may be configured to indicate a plurality of secondary RLC entities connected to the bearer for which the packet duplication technology is configured. The three bits may be mapped to respective RLC entities by using Method 4, Method 5, Method 6, Method 7 or Method 8 proposed in the disclosure. According to an embodiment of the disclosure, the three bits may indicate the plurality of secondary RLC entities connected to the bearer for which the packet duplication technology is configured. Because the primary RLC entities may not be deactivated, a BS may indicate activation or deactivation of only the secondary RLC entities.

For example, when an L field has "a" and "b" as sub-indexes (e.g., $L_{-}(a,b)$, 1*l*-01), the sub-index "a" may indicate an $a^{th}$ bearer in an ascending order of bearer identifiers, and the sub-index "b" may indicate each of three bits and may indicate a $b^{th}$ RLC entity (e.g., a secondary RLC entity) by using Method 4, Method 5, Method 6, Method 7, or Method 8 proposed in the disclosure. Accordingly, when a bearer having 5 as a bearer identifier and a bearer having 8 as a bearer identifier for which the packet duplication technology is configured are configured for a UE, a primary RLC entity and secondary RLC entities which correspond to the bearer having 5 as the bearer identifier may be mapped to $L_{-}(0,0)$, $L_{-}(0,1)$, and $L_{-}(0,2)$ and thus may have a value of 0 or 1, a primary RLC entity and secondary RLC entities which correspond to the bearer having 8 as the bearer identifier may be mapped to $L_{-}(1,0)$, $L_{-}(1,1)$, and $L_{-}(1,2)$ and thus may have a value of 0 or 1, and all remaining L field values are not used and are padded to have a value of 0. Maximal eight bearers for which the packet duplication is configured may be configured.

A bearer identifier (e.g., 5 bits) may be configured as a natural number from among 0 to 31 or 1 to 32 or a binary numeral corresponding thereto, a logical channel identifier (e.g., 6 bits) may be configured as a natural number from among 0 to 63 or a binary numeral corresponding thereto, and a cell group identifier (e.g., 2 bits) may be configured as a natural number from among 0 to 3 or 1 to 4 or a binary numeral corresponding thereto.

Embodiment 4-2 1*l*-02 proposed in the disclosure may have the same characteristics as those of Embodiment 4-1 1*l*-01, and may allocate a separate logical channel identifier for a MAC CE. Also, according to an embodiment of the disclosure, an L field may not exist in an MAC header for the MAC CE. However, the disclosure is not limited thereto. Also, the MAC header may have a fixed size but the MAC CE may have a variable size. Compared with Embodiment 4-1 1*l*-01, in Embodiment 4-2 1*l*-02, four bits including a reservation bit corresponding to a bearer identifier that is not configured as 1 but is configured as 0 in a bitmap field may be skipped. In detail, when D1 and D0 of the bitmap are configured as 0, 1 bit for L00, L01, L02, P, L10, L11, L12, and P fields in L fields positioned immediately next to the bitmap may be skipped. That is, when D2 and D3, D4 and D5, or D6 and D7 are each configured as 0, 1 bit may be skipped, and the G fields or the L fields positioned immediately next to the bitmap may indicate four bits that correspond to lowest D fields for which 1 is configured. Also, when D1 is configured as 1 or D0 is configured as 0, L00, L01, and L02 fields corresponding to D0 may be padded to zero. On the contrary, in a case where D1 is configured as 0 or D0 is configured as 1, L10, L11, and L12 fields corresponding to D1 may be padded to zero, and the same may be applied to other fields. In the above descriptions, when an L field is 0 (or 1), this may indicate that a secondary RLC entity corresponding thereto is to be deactivated, and when the L field is 1 (or 0), this may indicate that a secondary RLC entity corresponding thereto is to be activated.

Figure 1M:
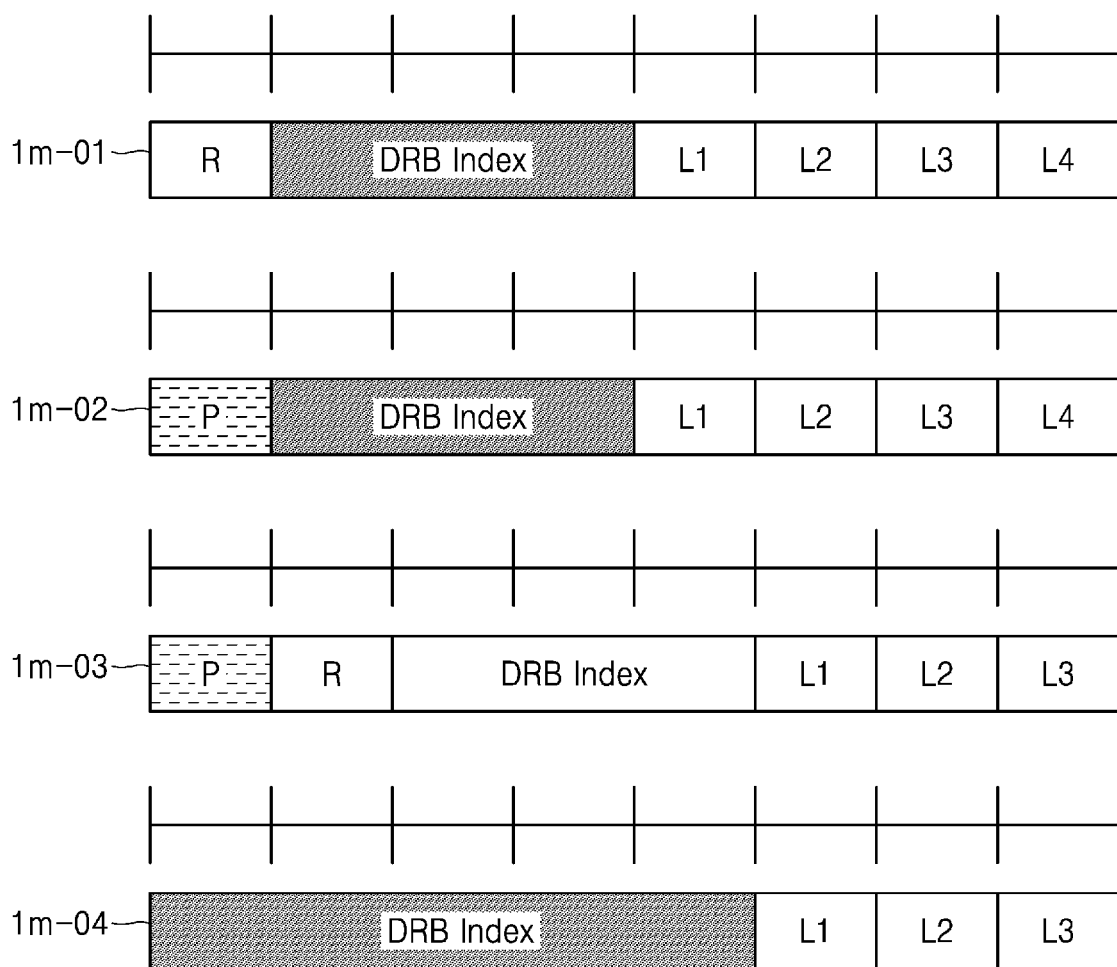
FIG. 1M illustrates Embodiment 5 of, when a plurality of RLC entities are configured for the UE for which the packet duplication transmission technology is configured, dynamically activating or deactivating some RLC entities from among the plurality of configured RLC entities, according to an embodiment of the disclosure.

FIG. 1M illustrates Embodiment 5 of, when a plurality of RLC entities (or logical channel identifiers) (or new identifier values) are configured for the UE for which the packet duplication transmission technology is configured, dynamically activating (or indicating to perform duplicate transmission) some RLC entities from among the plurality of configured RLC entities or deactivating (or indicating to stop duplicate transmission) some RLC entities, according to an embodiment of the disclosure.

In the disclosure, when a plurality of RLC entities (or logical channel identifiers) (or new identifier values) are configured for the UE for which the packet duplication transmission technology is configured, provided is Embodiment 5 of dynamically activating (or indicating to perform duplicate transmission) some RLC entities from among the plurality of configured RLC entities or deactivating (or indicating to stop duplicate transmission) some RLC entities. In Embodiment 5, when the DC technology is configured, a MCG BS may configure activation and deactivation of RLC entities that are connected to a MCG MAC entity of the UE and for which the packet duplication transmission technology is configured, and a SCG BS may configure activation and deactivation of RLC entities that are connected to a SCG MAC entity of the UE and for which the packet duplication transmission technology is configured. Alternatively, a BS may not indicate activation and deactivation of a plurality of RLC entities connected to a plurality of bearers for which the packet duplication transmission technology is configured but may indicate, according to each of the bearers, activation and deactivation of the plurality of RLC entities connected to the bearers for which the packet duplication transmission technology is configured.

Embodiment 5-1 1m-01 of the disclosure proposes a method of defining a new MAC CE, and dynamically activating (or indicating to perform duplicate transmission) some RLC entities from among a plurality of RLC entities or deactivating (or indicating to stop duplicate transmission) some RLC entities, based on the MAC CE.

In Embodiment 5-1 1m-01, a separate logical channel identifier for the proposed MAC CE may be allocated, and an L field may not exist in an MAC header for the MAC CE. However, the disclosure is not limited thereto. Also, the MAC header and the MAC CE may have a fixed size. However, the disclosure is not limited thereto. In Embodiment 5-1 1m-01, the maximum number by which the packet duplication technology is configurable is limited to, for example, 8, and bearer identifier values of bearers for which the packet duplication transmission technology is configured may be mapped respectively to 0 to 7 in an ascending order (or a descending order). Also, a 3-bit bearer index field (DRB Index) is defined and indicates values of 0 to 7, thereby indicating the bearers for which the packet duplication transmission technology is configured. Also, four bits (e.g., L1, L2, L3, and L4) corresponding to the bearer index field may be configured to indicate a plurality of RLC entities connected to a bearer for which the packet duplication technology is configured. The four bits may be mapped respectively to logical channel identifier values (or new identifier values), which are configured for respective RLC entities, in an ascending order (or a descending order). As another method, the four bits may be mapped to respectively SCell identifier values, which are mapped to logical channel identifiers of respective RLC entities, in an ascending order (or a descending order). In the above descriptions, when the L field is 0 (or 1), this may indicate that a secondary RLC entity corresponding thereto is to be deactivated, and when the L field is 1 (or 0), this may indicate that a secondary RLC entity corresponding thereto is to be activated.

Embodiment 5-2 1m-02 of the disclosure proposes a method of defining a new MAC CE, and dynamically activating (or indicating to perform duplicate transmission) some RLC entities from among a plurality of RLC entities or deactivating (or indicating to stop duplicate transmission) some RLC entities, based on the MAC CE.

In Embodiment 5-2 1m-02, a separate logical channel identifier for the proposed MAC CE may be allocated, and an L field may not exist in an MAC header for the MAC CE. However, the disclosure is not limited thereto. Also, the MAC header and the MAC CE may have a fixed size. However, the disclosure is not limited thereto. In Embodiment 5-2 1m-02, the maximum number by which the packet duplication technology is configurable is limited to 8, and bearer identifier values of bearers for which the packet duplication transmission technology is configured may be mapped respectively to 0 to 7 in an ascending order (or a descending order). Also, a 3-bit bearer index field (DRB Index) is defined and indicates values of 0 to 7, thereby indicating the bearers for which the packet duplication transmission technology is configured. Also, four bits (e.g., L1, L2, L3, and L4) corresponding to the bearer index field may be configured to indicate a plurality of RLC entities connected to a bearer for which the packet duplication technology is configured. The four bits may be mapped respectively to logical channel identifier values (or new identifier values), which are configured for respective RLC entities, in an ascending order (or a descending order). As another method, the four bits may be mapped to respectively SCell identifier values, which are mapped to logical channel identifiers of respective RLC entities, in an ascending order (or a descending order).

Also, P fields may be defined and used as in Embodiment 4-1 1l-01. A P field is a field for dynamically indicating to change an existing primary RLC entity to a secondary RLC entity, the existing primary RLC entity being connected to a bearer for which the packet duplication transmission technology is configured and which corresponds to a bearer index field, and to change another secondary RLC entity to a new primary RLC entity. For example, when the P field is configured as 1, the MAC CE may not indicate activation and deactivation of the RLC entities connected to the bearer for which the packet duplication transmission technology is configured and which corresponds to the bearer index field but may indicate to configure or change a new primary RLC entity for the bearer. That is, in a case where the P field is configured as 1 and an L field from among four L fields corresponding to the bearer index field is configured as 1, the case may mean that a secondary RLC entity corresponding to the L field configured as 1 is to be configured as a new primary RLC entity, and an existing primary RLC entity is to be changed to a secondary RLC entity. Also, L fields corresponding to the bearer index field may be mapped again in an ascending order (or a descending order), in consideration of a logical channel identifier (or a new identifier value) of the secondary RLC entity that is newly changed due to the P field. When the P field is configured as 0, the MAC CE may indicate activation and deactivation of the RLC entities connected to the bearer for which the packet duplication transmission technology is configured and which corresponds to the bearer index field. When the L field is 0 (or 1), this may indicate that a secondary RLC entity corresponding thereto is to be deactivated, and when the L field is 1 (or 0), this may indicate that a secondary RLC entity corresponding thereto is to be activated.

Embodiment 5-3 1m-03 of the disclosure proposes a method of defining a new MAC CE, and dynamically activating (or indicating to perform duplicate transmission) some RLC entities from among a plurality of RLC entities or deactivating (or indicating to stop duplicate transmission) some RLC entities, based on the MAC CE.

In Embodiment 5-3 1m-03, a separate logical channel identifier for the proposed MAC CE may be allocated, and an L field may not exist in an MAC header for the MAC CE. However, the disclosure is not limited thereto. Also, the MAC header and the MAC CE may have a fixed size. However, the disclosure is not limited thereto. In Embodiment 5-3 1m-03, the maximum number by which the packet duplication technology is configurable is limited to 8, and bearer identifier values of bearers for which the packet duplication transmission technology is configured may be mapped respectively to 0 to 7 in an ascending order (or a descending order). Also, a 3-bit bearer index field (DRB Index) is defined and indicates values of 0 to 7, thereby indicating the bearers for which the packet duplication transmission technology is configured. Also, three bits (e.g., L1, L2, and L3) corresponding to the bearer index field may be configured to indicate a plurality of secondary RLC entities connected to a bearer for which the packet duplication technology is configured. Because primary RLC entities may not be deactivated, the MAC CE may indicate activation or deactivation of only secondary RLC entities. Three bits may be mapped respectively to logical channel identifier values (or new identifier values), which are configured for respective secondary RLC entities, in an ascending order (or a descending order). As another method, three bits may be mapped respectively to SCell identifier values, which are mapped to logical channel identifiers of respective secondary RLC entities, in an ascending order (or a descending order).

Also, P fields may be defined and used as in Embodiment 4-1 1l-01. A P field is a field for dynamically indicating to change an existing primary RLC entity to a secondary RLC entity, the existing primary RLC entity being connected to a bearer for which the packet duplication transmission technology is configured and which corresponds to a bearer index field, and to change another secondary RLC entity to a new primary RLC entity. For example, when the P field is configured as 1, the MAC CE may not indicate activation and deactivation of the RLC entities connected to the bearer for which the packet duplication transmission technology is configured and which corresponds to the bearer index field but may indicate to configure or change a new primary RLC entity for the bearer. That is, in a case where the P field is configured as 1 and an L field from among four L fields corresponding to the bearer index field is configured as 1, the case may mean that a secondary RLC entity corresponding to the L field configured as 1 is to be configured as a new primary RLC entity, and an existing primary RLC entity is to be changed to a secondary RLC entity. Also, L fields corresponding to the bearer index field may be mapped again in an ascending order (or a descending order), in consideration of a logical channel identifier (or a new identifier value) of the secondary RLC entity that is newly changed due to the P field. When the P field is configured as 0, the MAC CE may indicate activation and deactivation of the RLC entities connected to the bearer for which the packet duplication transmission technology is configured and which corresponds to the bearer index field. When the L field is 0 (or 1), this may indicate that a secondary RLC entity corresponding thereto is to be deactivated, and when the L field is 1 (or 0), this may indicate that a secondary RLC entity corresponding thereto is to be activated.

Embodiment 5-4 1m-04 of the disclosure proposes a method of defining a new MAC CE, and dynamically activating (or indicating to perform duplicate transmission) some RLC entities from among a plurality of RLC entities or deactivating (or indicating to stop duplicate transmission) some RLC entities, based on the MAC CE.

In Embodiment 5-4 1m-04, a separate logical channel identifier for the proposed MAC CE may be allocated, and an L field may not exist in an MAC header for the MAC CE. However, the disclosure is not limited thereto. Also, the MAC header and the MAC CE may have a fixed size. However, the disclosure is not limited thereto. In Embodiment 5-4 1m-04, a bearer identifier (DRB ID) field for which the packet duplication transmission technology is configured may be defined to directly indicate a bearer for which the packet duplication transmission technology is configured. Also, three bits (e.g., L1, L2, and L3) corresponding to the bearer identifier field may be configured to indicate a plurality of secondary RLC entities connected to a bearer for which the packet duplication technology is configured. Because primary RLC entities may not be deactivated, the MAC CE may indicate activation or deactivation of only secondary RLC entities. Three bits may be mapped respectively to logical channel identifier values (or new identifier values), which are configured for respective secondary RLC entities, in an ascending order (or a descending order). As another method, three bits may be mapped respectively to SCell identifier values, which are mapped to logical channel identifiers of respective secondary RLC entities, in an ascending order (or a descending order). When the L field is 0 (or 1), this may indicate that a secondary RLC entity corresponding thereto is to be deactivated, and when the L field is 1 (or 0), this may indicate that a secondary RLC entity corresponding thereto is to be activated.

A BS or a UE in Embodiment 5-1, Embodiment 5-2, Embodiment 5-3, or Embodiment 5-4, which is of an efficient MAC CE proposed in the disclosure, may map each bit to a primary RLC entity or a secondary RLC entity. Also, the BS or the UE may map respective RLC entities to bits by using Method 1, Method 2, Method 3, Method 4, Method 5, Method 6, or Method 6 proposed in the disclosure until each of the RLC entities is activated or deactivated.

According to Embodiment 5-1, Embodiment 5-2, Embodiment 5-3, or Embodiment 5-4, which is of an efficient MAC CE proposed in the disclosure, the MAC CE may consist of one MAC header and a plurality of bits, each bit indicating bearer indication information and an L field, and may collectively indicate activation or deactivation of RLC entities of a plurality of bearers at one time.

Figure 1N:
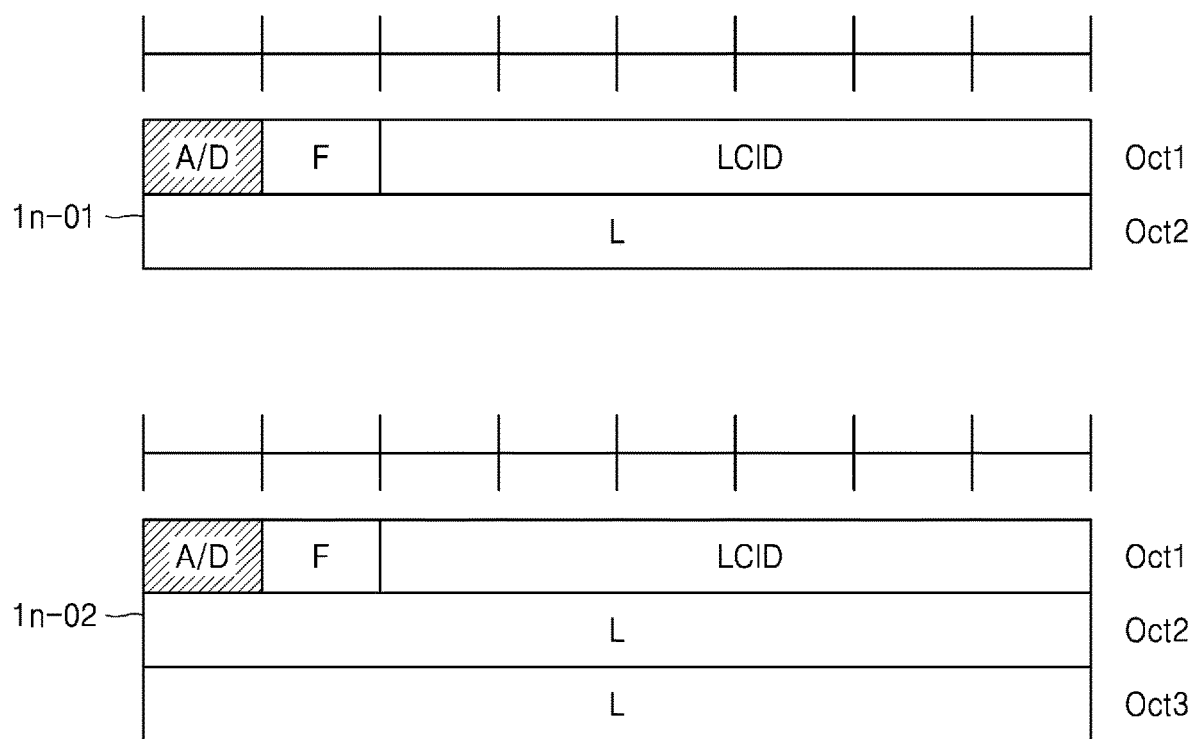
FIG. 1N illustrates Embodiment 6 of, when a plurality of RLC entities (or logical channel identifiers) are configured for the UE for which the packet duplication transmission technology is configured, dynamically activating or deactivating some RLC entities from among the plurality of configured RLC entities, according to an embodiment of the disclosure.

FIG. 1N illustrates Embodiment 6 of, when a plurality of RLC entities (or logical channel identifiers) (or new identifier values) are configured for the UE for which the packet duplication transmission technology is configured, dynamically activating (or indicating to perform duplicate transmission) some RLC entities from among the plurality of configured RLC entities or deactivating (or indicating to stop duplicate transmission) some RLC entities, according to an embodiment of the disclosure.

Embodiment 6 (1*n*-01 and 1*n*-02) of the disclosure proposes a method of defining a new field in a MAC header and dynamically activating (or indicating to perform duplicate transmission) some RLC entities from among the plurality of configured RLC entities or deactivating (or indicating to stop duplicate transmission) some RLC entities, based on a MAC CE.

In Embodiment 6 (1*n*-01 and 1*n*-02), when the DC technology is configured, a MCG BS may configure activation and deactivation of RLC entities that are connected to a MCG MAC entity of the UE and for which the packet duplication transmission technology is configured, and a SCG BS may configure activation and deactivation of RLC entities that are connected to a SCG MAC entity of the UE and for which the packet duplication transmission technology is configured. Also, a BS may not indicate activation and deactivation of a plurality of RLC entities connected to a plurality of bearers for which the packet duplication transmission technology is configured but may indicate, according to each logical channel (or each new identifier), activation and deactivation of the plurality of RLC entities connected to the bearers for which the packet duplication transmission technology is configured.

Principles of Embodiment 1 (1*i*-01 and 1*i*-02), Embodiment 2 (1*j*-01 and 1*j*-02), Embodiment 3 (1*k*-01 and 1*k*-02), Embodiment 4 (1*l*-01 and 1*l*-02), or Embodiment 5 (1*m*-01, 1*m*-02, 1*m*-03, and 1*m*-04) may be applied to Embodiment 6 of the disclosure, and a P field or a G field proposed in the aforementioned embodiments may be indicated in the MAC header. Also, because the MAC header includes a logical channel identifier, a 1-bit indicator (A/D) may be defined in the MAC header to indicate whether to activate and deactivate a RLC entity corresponding to a logical channel.

FIG. 1O illustrates Embodiment 7 of, when a plurality of RLC entities (or logical channel identifiers) (or new identifier values) are configured for the UE for which the packet duplication transmission technology is configured, dynamically activating (or indicating to perform duplicate transmission) some RLC entities from among the plurality of configured RLC entities or deactivating (or indicating to stop duplicate transmission) some RLC entities, according to the disclosure.

Embodiment 7 (1*o*-01, 1*o*-02, and 1*o*-03) of, when a plurality of RLC entities (or logical channel identifiers) are configured for the UE for which the packet duplication transmission technology is configured, dynamically activating (or indicating to perform duplicate transmission) some RLC entities from among the plurality of configured RLC entities or deactivating (or indicating to stop duplicate transmission) some RLC entities, according to the disclosure, is provided below. In Embodiment 7 (1*o*-01, 1*o*-02, and 1*o*-03), when the DC technology is configured, a MCG BS may configure activation and deactivation of RLC entities that are connected to a MCG MAC entity of the UE and for which the packet duplication transmission technology is configured, and a SCG BS may configure activation and deactivation of RLC entities that are connected to a SCG MAC entity of the UE and for which the packet duplication transmission technology is configured. Alternatively, the MCG BS or the SCG BS may indicate the MCG MAC entity or the SCG MAC entity by defining a G field. Also, activation and deactivation with respect to a plurality of RLC entities connected to a plurality of bearers for which the packet duplication transmission technology is configured may be performed at one time with respect to RLC entities for which the packet duplication transmission technology is configured and which are connected to a MAC entity.

Embodiment 7-1 of the disclosure proposes a method of defining a new MAC CE, and dynamically activating (or indicating to perform duplicate transmission) some RLC entities from among a plurality of RLC entities or deactivating (or indicating to stop duplicate transmission) some RLC entities, based on the MAC CE.

In Embodiment 7-1, a separate logical channel identifier for the proposed MAC CE may be allocated, and an L field may not exist in an MAC header for the MAC CE. However, the disclosure is not limited thereto. Also, the MAC header and the MAC CE may have a fixed size. However, the disclosure is not limited thereto. In Embodiment 7-1, a bearer for which the packet duplication technology is configured may not be indicated. That is, a plurality of L bits (e.g., 16) may be defined, and a plurality of L fields may indicate a plurality of RLC entities that are connected to one MAC entity (a MCG MAC entity or a SCG MAC entity) of a UE and thus are connected to all bearers for which the packet duplication technology is configured. The respective L fields may be mapped in an ascending order (or a descending order) to logical channel identifier values (or new identifier values) configured for all RLC entities that are connected to one MAC entity (the MCG MAC entity or the SCG MAC entity) and thus are connected to all bearers for which the packet duplication technology is configured. As another method, the respective L fields may be mapped in an ascending order (or a descending order) to SCell identifier values (Scell index) mapped to logical channel identifiers configured for all RLC entities that are connected to one MAC entity (the MCG MAC entity or the SCG MAC entity) and thus are connected to all bearers for which the packet duplication technology is configured.

Also, P fields may be defined and used as in Embodiment 4-1 1*l*-01. A P field is a field for dynamically indicating to change an existing primary RLC entity to a secondary RLC entity, the existing primary RLC entity being connected to a bearer for which the packet duplication transmission technology is configured and which corresponds to one MAC entity, and to change another secondary RLC entity to a new primary RLC entity. For example, when the P field is configured as 1, the MAC CE may not indicate activation and deactivation of RLC entities connected to bearers for which the packet duplication transmission technology is configured and which correspond to one MAC entity but may indicate to configure or change a new primary RLC entity for the bearers. That is, in a case where the P field is configured as 1 and an L field from among L fields is configured as 1, the case may mean that a secondary RLC entity corresponding to the L field configured as 1 is to be configured as a new primary RLC entity, and an existing primary RLC entity is to be changed to a secondary RLC entity. Also, L fields corresponding to a bearer index field may be mapped again in an ascending order (or a descending order), in consideration of a logical channel identifier (or a new identifier value) of the secondary RLC entity that is newly changed due to the P field. When the P field is configured as 0, the MAC CE may indicate activation and deactivation of the RLC entities connected to the bearer for which the packet duplication transmission technology is configured. In the above descriptions, when an L field is 0 (or 1), this may indicate that a secondary RLC entity corresponding thereto is to be deactivated, and when the L field is 1 (or 0), this may indicate that a secondary RLC entity corresponding thereto is to be activated. Also, a cell group (a MCG or a SCG) may be indicated by defining a G field.

Embodiment 7-2 of the disclosure proposes a method of defining a new MAC CE, and dynamically activating (or indicating to perform duplicate transmission) some RLC entities from among a plurality of RLC entities or deactivating (or indicating to stop duplicate transmission) some RLC entities, based on the MAC CE.

In Embodiment 7-2, a separate logical channel identifier for the proposed MAC CE may be allocated, and an L field may not exist in an MAC header for the MAC CE. However, the disclosure is not limited thereto. Also, the MAC header and the MAC CE may have a fixed size. However, the disclosure is not limited thereto. In Embodiment 7-2, a bearer for which the packet duplication technology is configured may not be indicated. That is, a plurality of L bits (e.g., 16) may be defined, and a plurality of L fields may indicate a plurality of RLC entities that are connected to one MAC entity (a MCG MAC entity or a SCG MAC entity) of a UE and thus are connected to all bearers for which the packet duplication technology is configured. The respective L fields may be mapped in an ascending order (or a descending order) to logical channel identifier values (or new identifier values) configured for all secondary RLC entities that are connected to one MAC entity (the MCG MAC entity or the SCG MAC entity) and thus are connected to all bearers for which the packet duplication technology is configured. As another method, the respective L fields may be mapped in an ascending order (or a descending order) to SCell identifier values (Scell index) mapped to logical channel identifiers configured for all secondary RLC entities that are connected to one MAC entity (the MCG MAC entity or the SCG MAC entity) and thus are connected to all bearers for which the packet duplication technology is configured. Because primary RLC entities may not be deactivated, the L fields may indicate only secondary RLC entities. That is, unlike Embodiment 7-1, in Embodiment 7-2, the L fields may indicate only secondary RLC entities.

Also, P fields may be defined and used as in Embodiment 4-1 1*l*-01. A P field is a field for dynamically indicating to change an existing primary RLC entity to a secondary RLC entity, the existing primary RLC entity being connected to a bearer for which the packet duplication transmission technology is configured and which corresponds to one MAC entity, and to change another secondary RLC entity to a new primary RLC entity. For example, when the P field is configured as 1, the MAC CE may not indicate activation and deactivation of RLC entities connected to bearers for which the packet duplication transmission technology is configured and which correspond to one MAC entity but may indicate to configure or change a new primary RLC entity for the bearers. That is, in a case where the P field is configured as 1 and an L field from among the L fields is configured as 1, the case may mean that a secondary RLC entity corresponding to the L field configured as 1 is to be configured as a new primary RLC entity, and an existing primary RLC entity is to be changed to a secondary RLC entity. Also, L fields corresponding to a bearer index field may be mapped again in an ascending order (or a descending order), in consideration of a logical channel identifier (or a new identifier value) of the secondary RLC entity that is newly changed due to the P field. When the P field is configured as 0, the MAC CE may indicate activation and deactivation of the RLC entities connected to the bearer for which the packet duplication transmission technology is configured. In the above descriptions, when an L field is 0 (or 1), this may indicate that a secondary RLC entity corresponding thereto is to be deactivated, and when the L field is 1 (or 0), this may indicate that a secondary RLC entity corresponding thereto is to be activated. Also, a cell group (a MCG or a SCG) may be indicated by defining a G field.

Figure 1P:
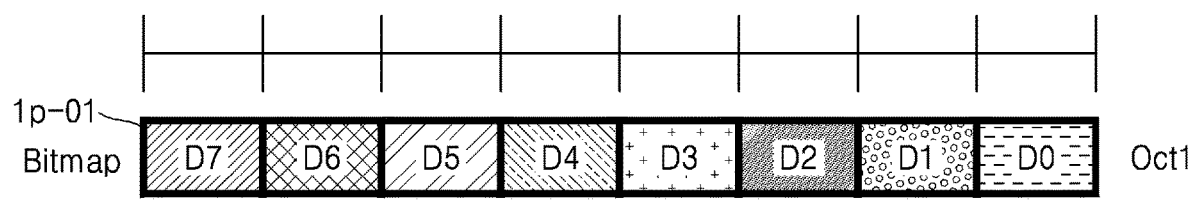
FIG. 1P illustrates Embodiment 8 of, when a plurality of RLC entities are configured for the UE for which the packet duplication transmission technology is configured, dynamically activating or deactivating all of the plurality of configured RLC entities, according to an embodiment of the disclosure.

FIG. 1P illustrates Embodiment 8 of, when a plurality of RLC entities (or logical channel identifiers) are configured for the UE for which the packet duplication transmission technology is configured, dynamically activating (or indicating to perform duplicate transmission) or deactivating (or indicating to stop duplicate transmission) all of the configured RLC entities, according to an embodiment of the disclosure.

Embodiment 8 of, when a plurality of RLC entities (or logical channel identifiers) are configured for the UE for which the packet duplication transmission technology is configured, dynamically activating (or indicating to perform duplicate transmission) or deactivating (or indicating to stop duplicate transmission) all of the configured RLC entities, according to the disclosure, is provided below. In Embodiment 8, when the DC technology is configured, a MCG BS may configure activation and deactivation of RLC entities that are connected to a MCG MAC entity of the UE and for which the packet duplication transmission technology is configured, and a SCG BS may configure activation and deactivation of RLC entities that are connected to a SCG MAC entity of the UE and for which the packet duplication transmission technology is configured.

Embodiment 8 1*p*-01 of the disclosure proposes a method of defining a new MAC CE, and dynamically activating (or indicating to perform duplicate transmission) or deactivating (or indicating to stop duplicate transmission) all of a plurality of secondary RLC entities, based on the MAC CE. In Embodiment 8, a separate logical channel identifier for the proposed MAC CE may be allocated, and an L field may not exist in an MAC header for the MAC CE. However, the disclosure is not limited thereto. Also, the MAC header and the MAC CE may have a fixed size. However, the disclosure is not limited thereto. In Embodiment 8, only a bearer for which the packet duplication technology is configured may be indicated, and a logical channel identifier or a SCell identifier may not be indicated.

In detail, in Embodiment 8, the maximum number by which the packet duplication technology is configurable for one MCG MAC entity (a SCG MAC or a MCG MAC) is limited to 8, and bearer identifier values of bearers for which the packet duplication transmission technology is configured may be mapped in an ascending order (or a descending order) to respective bits of a 1-byte bitmap having a length of 8 bits.

When each bit of the bitmap indicates 0 (or 1), secondary RLC entities that are connected to the bearer for which the packet duplication technology is configured and that correspond to the bits of the bitmap may be all deactivated, and when each bit indicates 1 (or 0), the secondary RLC entities that are connected to the bearer for which the packet duplication technology is configured and that correspond to the bits of the bitmap may be all activated.

That is, the number of packet duplications to be performed on the bearer for which the packet duplication technology is configured, or the number of secondary RLC entities to be configured may be determined due to configuration via an RRC message as shown in FIG. 1E, and the MAC CE may indicate to activate or deactivate all of the secondary RLC entities connected to a bearer for which packet duplication is configured. By doing so, the MAC CE may have a simple structure, and a case in which only some of the plurality of secondary RLC entities are activated or deactivated may be prevented, such that complexity of implantation of the UE and the BS may be reduced.

For example, the BS may configure one RLC entity and three secondary RLC entities for a first bearer by using an RRC message, and may configure one RLC entity and two secondary RLC entities for a second bearer by using the RRC message. The UE may receive the RRC message, and may configure one RLC entity and three secondary RLC entities for the first bearer and may configure one RLC entity and two secondary RLC entities for the second bearer, according to configuration of the RRC message. In a case where the UE receives the MAC CE, when the MAC CE indicates 0 (or 1) with respect to the first bearer, the UE may deactivate all of three secondary RLC entities connected to the first bearer, and when the MAC CE indicates 1 (or 0), the UE may activate all of three secondary RLC entities connected to the first bearer. When the MAC CE indicates 0 (or 1) with respect to the second bearer, the UE may deactivate all of two secondary RLC entities connected to the second bearer, and when the MAC CE indicates 1 (or 0), the UE may activate all of two secondary RLC entities connected to the second bearer.

Figure 1Q:
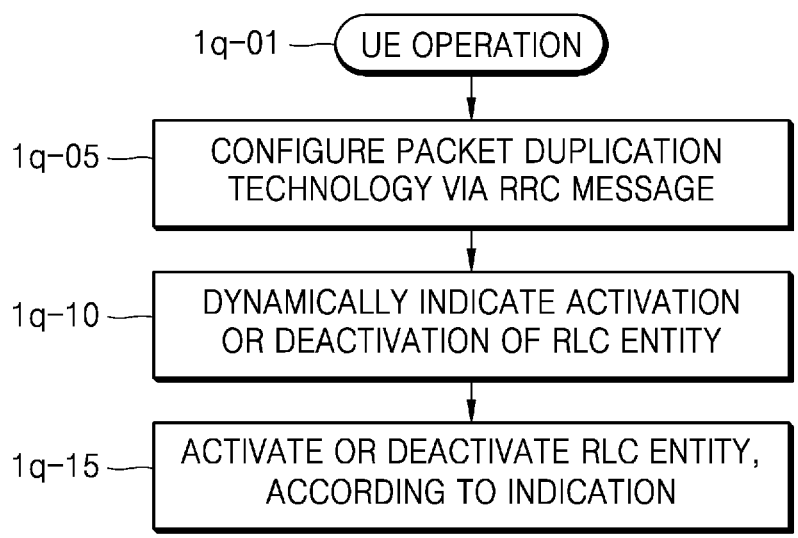
FIG. 1Q illustrates UE operations proposed in an embodiment of the disclosure.
Figure 1R:
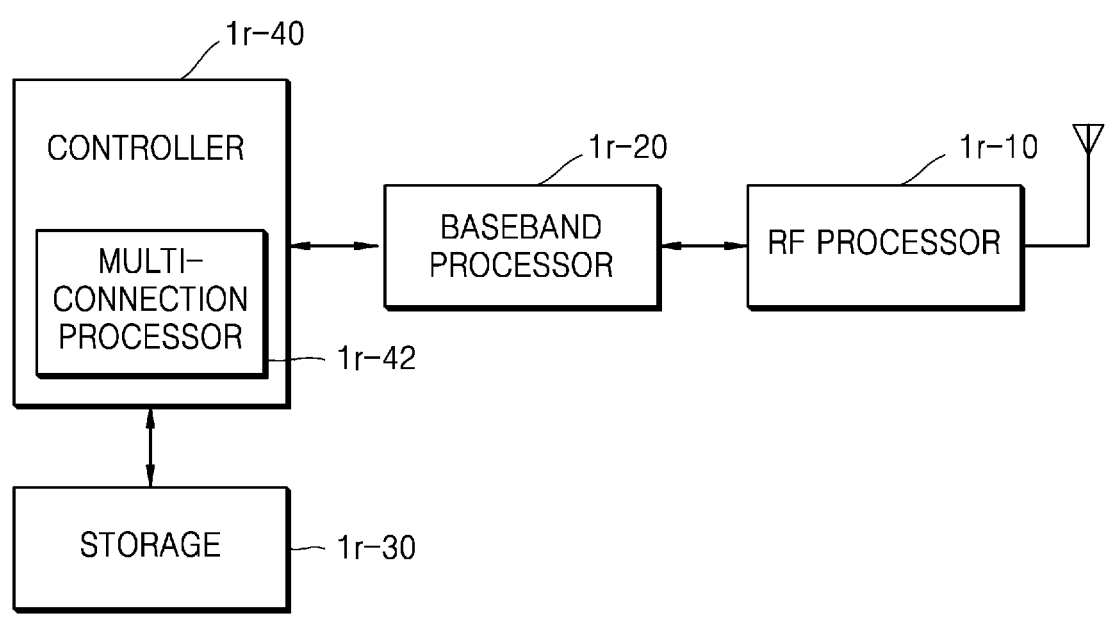
FIG. 1R is a block diagram of a configuration of a UE, according to an embodiment of the disclosure.
Figure 1S:
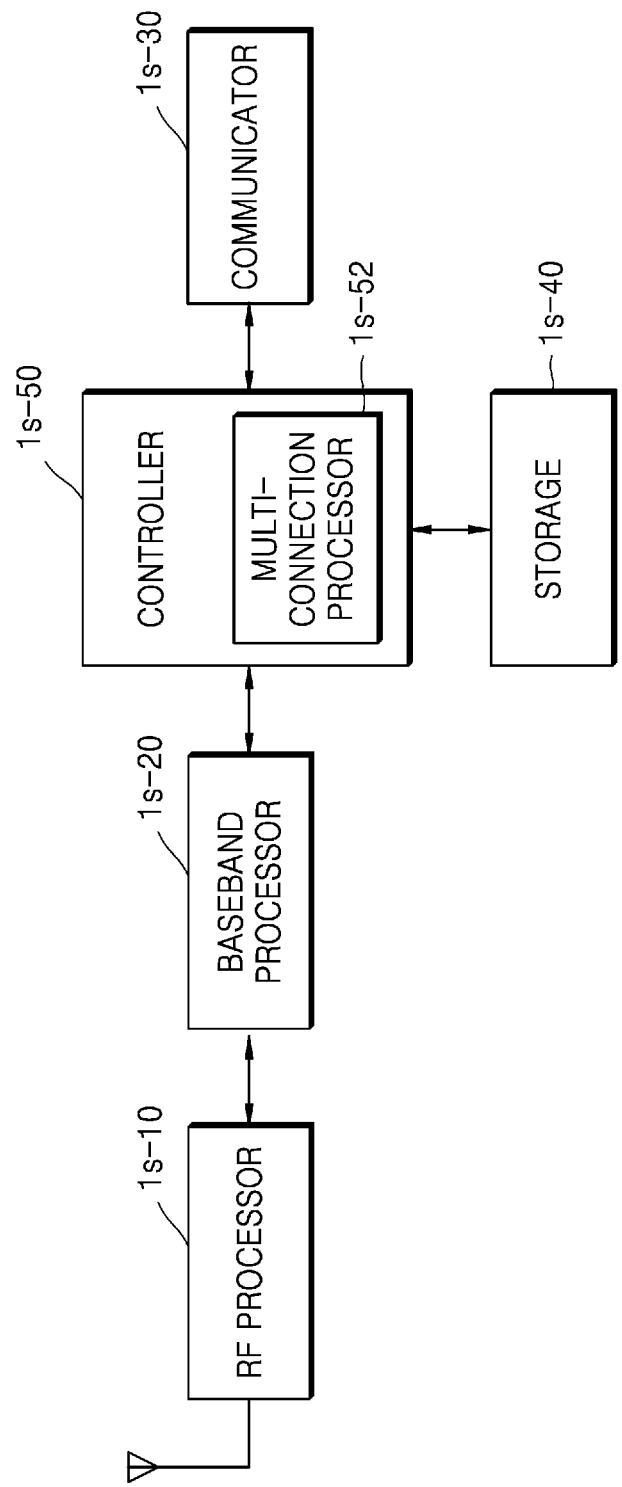
FIG. 1S is a block diagram of a transmission/reception point (TRP) device in a wireless communication system, according to an embodiment of the disclosure.
Figure 1T:
FIG. 1T illustrates Embodiment 9 of, when a plurality of RLC entities (or logical channel identifiers) are configured for the UE for which the packet duplication transmission technology is configured, dynamically activating or deactivating some RLC entities from among the plurality of configured RLC entities, according to an embodiment of the disclosure.

FIG. 1T illustrates Embodiment 9 of, when a plurality of RLC entities (or logical channel identifiers) are configured for the UE for which the packet duplication transmission technology is configured, dynamically activating (or indicating to perform duplicate transmission) or deactivating (or indicating to stop duplicate transmission) all of the configured RLC entities, according to the disclosure.

Embodiment 9 of, when a plurality of RLC entities (or logical channel identifiers) are configured for the UE for which the packet duplication transmission technology is configured, dynamically activating (or indicating to perform duplicate transmission) or deactivating (or indicating to stop duplicate transmission) all of the configured RLC entities, according to the disclosure, is provided below. According to Embodiment 9, when the DC technology is configured, a MCG BS may configure activation and deactivation of RLC entities that are connected to a MCG MAC entity of the UE and for which the packet duplication transmission technology is configured, and a SCG BS may configure activation and deactivation of RLC entities that are connected to a SCG MAC entity of the UE and for which the packet duplication transmission technology is configured.

Embodiment 9 1t-01 of the disclosure proposes a method of defining a new MAC CE, and dynamically activating (or indicating to perform duplicate transmission) or deactivating (or indicating to stop duplicate transmission) some RLC entities from among the plurality of RLC entities, based on the MAC CE. In Embodiment 9, a separate logical channel identifier (or a new identifier) for the new MAC CE may be allocated, an L field may not exist in an MAC header for the MAC CE, and the MAC header and the MAC CE may have a fixed size.

The MAC CE 1t-01 in Embodiment 9 may have only L fields in a structure as shown in FIG. 1T, and may map, by using Method 1, Method 2, Method 3, Method 4, Method 5, Method 6, Method 7 or Method 8 proposed in the disclosure, positions of the L fields or sub-indexes of the L fields in the MAC CE structure, respectively, to the RLC entities or bearer identifier values of bearers in an ascending order (or a descending order), wherein the packet duplication technology is configured for the bearers. That is, a position of the L field or a sub-index of the L field may indicate one bearer for which the packet duplication technology is configured. Also, three bits corresponding to a bearer may be configured to indicate a plurality of secondary RLC entities connected to the bearer for which the packet duplication technology is configured. The three bits may be mapped to respective RLC entities by using Method 4, Method 5, Method 6, Method 7 or Method 8 proposed in the disclosure. The three bits may indicate the plurality of secondary RLC entities connected to the bearer for which the packet duplication technology is configured. Because primary RLC entities may not be deactivated, a BS may indicate activation or deactivation of only secondary RLC entities.

For example, when an L field has "a" and "b" as sub-indexes (e.g., $L\_(a,b)$, 1t-01), the sub-index "a" may indicate an $a^{th}$ bearer in an ascending order of bearer identifiers, and the sub-index "b" may indicate each of three bits and may indicate a $b^{th}$ RLC entity (e.g., a secondary RLC entity) by using Method 4, Method 5, Method 6, Method 7, or Method 8 proposed in the disclosure. Accordingly, when a bearer having 5 as a bearer identifier and a bearer having 8 as a bearer identifier for which the packet duplication technology is configured are configured for a UE, a primary RLC entity and secondary RLC entities which correspond to the bearer having 5 as the bearer identifier may be mapped to $L\_(0,0)$, $L\_(0,1)$, and $L\_(0,2)$ and thus may have a value of 0 or 1, a primary RLC entity and secondary RLC entities which correspond to the bearer having 8 as the bearer identifier may be mapped to $L\_(1,0)$, $L\_(1,1)$, and $L\_(1,2)$ and thus may have a value of 0 or 1, and all remaining L field values are not used and are padded to have a value of 0. Maximal eight bearers for which the packet duplication is configured may be configured.

A bearer identifier (e.g., 5 bits) may be configured as a natural number from among 0 to 31 or 1 to 32 or a binary numeral corresponding thereto, a logical channel identifier (e.g., 6 bits) may be configured as a natural number from among 0 to 63 or a binary numeral corresponding thereto, and a cell group identifier (e.g., 2 bits) may be configured as a natural number from among 0 to 3 or 1 to 4 or a binary numeral corresponding thereto.

According to Embodiment 1, Embodiment 2, Embodiment 3, Embodiment 4, Embodiment 5, Embodiment 6, Embodiment 7, Embodiment 8, or Embodiment 9 of an efficient MAC CE proposed in the disclosure, the BS or the UE may map each of bits to a primary RLC entity or a secondary RLC entity. Also, when the BS (or the UE) activates or deactivates each RLC entity, the BS (or the UE) may map respective bits to RLC entities by using Method 1, Method 2, Method 3, Method 4, Method 5, Method 6, or Method 6 proposed in the disclosure.

Also, a P field or a G field proposed in the disclosure may be indicated in a MAC header. Because the MAC header includes a logical channel identifier, the MAC header may indicate activation and deactivation by having a 1-bit indicator defined in the MAC header.

Also, in the aforementioned embodiments, a new field may be defined in a MAC CE, an RRC message, or a MAC header so as to indicate that packet duplication is not to be performed in a bearer for which the packet duplication is configured and data is to be transmitted by distributing a plurality of pieces of different data to a plurality of RLC entities, such that a data rate may be increased. Such method may also be applied to the packet duplication technology configured with the DC technology or the packet duplication technology configured with the CA technology.

In the aforementioned embodiment, in a case where activation and deactivation of a plurality of secondary RLC entities are indicated by the MAC CE or the MAC header, when the secondary RLC entities configured for a bearer to which the packet duplication technology is applied are all deactivated, the UE may stop packet duplication transmission and may operate as a normal bearer.

In the aforementioned embodiment, in a case where activation and deactivation of a plurality of secondary RLC entities are indicated by the MAC CE or the MAC header, when the secondary RLC entities configured for a bearer to which the packet duplication technology is applied are deactivated and thus only one secondary RLC entity is activated (e.g., in a case where two secondary RLC entities from among three activated or configured secondary RLC entities are deactivated, in a case where one secondary RLC entity from among two activated or configured secondary RLC entities are deactivated, or in a case where one activated or configured secondary RLC entity is activated), the UE may receive an indication to deactivate the one secondary RLC entity. That is, the MAC CE may indicate, via an RRC message, to deactivate all of configured secondary RLC entities, or the UE may receive an indication to deactivate packet duplication with respect to the bearer in a manner that the MAC CE may indicate, via an RRC message, to deactivate all of configured secondary RLC entities.

In a case where the UE receives an indication to deactivate the one secondary RLC entity, the MAC CE indicates, via the RRC message, to deactivate all of the configured secondary RLC entities, or the MAC CE indicates, via the RRC message, to deactivate all of the configured secondary RLC entities so as to deactivate the packet duplication with respect to the bearer, when a configuration of a primary RLC entity of the bearer for which the packet duplication transmission is configured and a secondary RLC entity that is most-recently deactivated (or that has a smallest or greatest logical channel identifier value) or a secondary RLC entity pre-configured for a split bearer has a same configuration as a split bearer of the DC technology (i.e., when the primary RLC entity and the secondary RLC entity are connected to different MAC entities (MCG MAC or SCG MAC) or when the secondary RLC entity is connected to a MAC entity (e.g., SCG MAC) different from a MAC entity to which the first RLC entity is connected), the UE may stop packet duplication with respect to the bearer that performs packet duplication transmission, and may perform fallback by which the bearer operates as the split bearer of the DC technology and thus transmits data by distributing a plurality of pieces of different data to different RLC entities (the primary RLC entity and the secondary RLC entity) so as to improve a data rate.

As another method, a preset indicator may be defined, configured, and indicated in an RRC message or the MAC CE, and may indicate to apply, to the proposed packet duplication technology, a secondary RLC entity that is pre-configured to be used as a split bearer. Alternatively, the packet duplication technology may be always applied by using a preset indicator. Alternatively, the packet duplication technology may be always applied, without the preset indicator.

In the aforementioned case, even when the UE receives an indication to perform deactivation on a secondary RLC entity, when the secondary RLC entity operates in an acknowledged mode (AM mode), the UE may continuously retransmit data for which RLC acknowledgement (ACK) about successful transfer is not received, the data being from among transmit data, and may continuously transmit a configured RLC PDU that is not transmitted yet.

Also, in the aforementioned case, even when the UE receives an indication to perform deactivation on a secondary RLC entity, when the secondary RLC entity operates in an unacknowledged mode (UM mode), the UE may continuously transmit a configured RLC PDU that is not transmitted yet. Also, even when the UE receives an indication to perform deactivation on a secondary RLC entity, the UE may continuously receive DL data from the BS via the secondary RLC entity. Also, in a case where the secondary RLC entity that has been deactivated is activated, the UE may not initialize a RLC sequence number that was used, and may configure data to be transmitted, by allocating a RLC sequence number that is not transmitted yet.

With reference to FIG. 1, when the BS configures the packet duplication technology for each bearer of the UE, in order to decrease latency due to activation of second RLC entities connected to a bearer for which the packet duplication technology is configured, the BS may indicate activation of each of the second RLC entities when the BS configures, via an RRC message, the second RLC entities to be connected to the bearer. That is, when the BS defines a preset indicator and configures the second RLC entities via the RRC message, the BS may activate or deactivate each of the second RLC entities. Also, the BS and the UE may operate as they regard that the configured second RLC entities are to be activated.

According to the methods proposed in the disclosure, when the BS configures the packet duplication technology for each bearer of the UE, the BS may configure, via the RRC message, configuration information about a plurality of RLC entities that are connectable and usable with respect to a PDCP entity of each bearer, and may configure which RLC entities from among the plurality of RLC entities are to be activated. Also, provided is the method of designing a new MAC CE for dynamically indicating which RLC entities from among the plurality of configured RLC entities are to be activated or deactivated. The disclosure provides descriptions about an additional embodiment in which, when the BS indicates, for the UE, whether to activate and deactivate each of a plurality of RLC entities of a bearer for which the packet duplication transmission technology is configured, by using the MAC CE, a MAC entity of the UE indicates whether to activate and deactivate the RLC entities for a PDCP entity of the UE and thus the PDCP entity can continuously apply or stop applying of packet duplication to a RLC entity. That is, when the PDCP entity obtains (or receives) an indication from the MAC entity, the indication indicating that a certain RLC entity is deactivated, the PDCP entity does not perform packet duplication on the deactivated RLC entity, does not transmit (or indicate) a duplicate data discard indication to the deactivated RLC entity, the duplicate data discard indication occurring due to successful transfer of duplicate data by another RLC entity, and may indicate the deactivated RLC entity to discard all data and stop packet duplication transmission to the deactivated RLC entity.

However, when a timer for each packet for selective duplication is running or a timer for determining whether to release duplication transmission is running, the PDCP entity may stop the timer for each packet for selective duplication or the timer for determining whether to release duplication transmission. Also, when the PDCP entity receives an indication from the MAC entity, the indication indicating that a certain RLC entity is activated, the PDCP entity may re-perform packet duplication on the activated RLC entity, and when a timer for selective duplication is set or a timer for determining whether to release duplication transmission is set, the PDCP entity may start the timer.

The timer for selective duplicate data or the timer for determining whether to release duplication transmission may be triggered when duplicate data is first transmitted.

When another RLC entity cannot transmit duplicate data until the timer for selective duplicate data or the timer for determining whether to release duplication transmission expires, duplication transmission may be released with respect to corresponding data, and the timer for selective duplicate data or the timer for determining whether to release duplication transmission may be running with respect to each data. The timer for selective duplicate data or the timer for determining whether to release duplication transmission may stop after successful transfer of the duplicate data is confirmed, and duplication transmission of corresponding data may be stopped. That is, the PDCP entity of the bearer for which the packet duplication transmission technology is configured may perform, in response to an indication by the MAC entity of the UE, each of the activation procedure and the deactivation procedure on each of RLC entities configured for the bearer for which the packet duplication transmission technology is configured.

Also, when the BS configures a plurality of RLC entities for each bearer (or the PDCP entity) for which the packet duplication technology is configured, the BS may configure which cell or frequency is used to transmit duplicate data to be processed and configured by each of the RLC entities, such that respective pieces of duplicate data may be transmitted via different cells and thus the BS and the UE may each have a multiplexing gain. Therefore, in the disclosure, the BS may configure mapping information for the UE via an RRC message so as to transmit data to each particular cell, the data being generated by a plurality of RLC entities connected to the PDCP entity for which the packet duplication technology is configured or the data corresponding to a logical channel identifier of each RLC entity.

Therefore, hereinafter, a method, performed by the UE, of autonomously and dynamically activating or deactivating each of RLC entities, based on signal measurement information or channel measurement information with respect to a cell mapped to each of the RLC entities, when the RLC entities are configured, via an RRC message, for the bearer for which the packet duplication technology is configured or the packet duplication transmission technology is activated for the bearer (or the PDCP entity) for which the RLC entities are configured. In detail, the BS may configure, via an RRC message, cell information together with a preset condition to activate or deactivate each RLC entity, the cell information mapped to each RLC entity or a logical identifier corresponding to each RLC entity.

According to an embodiment of the disclosure, the preset condition may be a condition by which a RLC entity corresponding to a cell is deactivated when channel measurement information or a signal strength (e.g., Signal-to-Noise Ratio (SNR), Signal-to-Interference-Plus-Noise Ratio (SINR), Reference Signal Received Power (RSRP), Reference Signal Received Quality (RSRQ), etc.) of the cell is smaller than a threshold value configured in the RRC message or a RLC entity corresponding to a cell is activated when channel measurement information or a signal strength of the cell is greater than the threshold value.

Also, according to an embodiment of the disclosure, the preset condition may particularly configure a method of measuring a signal strength or a channel measurement method, which corresponds to a cell, may configure activation and deactivation rules, and may be extended to various embodiments. As described above, in a case where the UE autonomously performs activation or deactivation of a RLC entity, based on channel measurement information about each cell, when a channel of a certain cell is very bad, successful reception is difficult even when transmission is attempted, such that the UE may deactivate a RLC entity corresponding to the certain cell and thus may prevent unnecessary waste of transmit resources. When a channel of a certain cell is equal to or greater than a preset signal strength, the UE may activate a RLC entity corresponding to the certain cell and thus may achieve low transmit latency due to duplication transmission and a gain of high reliability.

Also, according to an embodiment of the disclosure, when the UE autonomously activates or deactivates a RLC entity based on measurement information about a channel or a signal of a cell mapped to the RLC entity of the UE, the MAC entity of the UE may indicate whether to activate or deactivate the RLC entity to the PDCP entity of the UE so as to allow the PDCP entity to determine whether to continuously apply or stop packet duplication to the RLC entity. That is, when the PDCP entity receives an indication from the MAC entity, the indication indicating that a certain RLC entity is deactivated, the PDCP entity does not perform packet duplication on the deactivated RLC entity, does not indicate a duplicate data discard indication to the deactivated RLC entity, the duplicate data discard indication occurring due to successful transfer of duplicate data by another RLC entity, and may indicate the deactivated RLC entity to discard all data and stop packet duplication transmission to the deactivated RLC entity. However, when a timer for each packet is running for selective duplication or a timer for determining whether to release duplication transmission is running, the PDCP entity may stop the timer for each packet for selective duplication or the timer for determining whether to release duplication transmission. Also, when the PDCP entity receives an indication from the MAC entity, the indication indicating that a certain RLC entity is activated, the PDCP entity may re-perform packet duplication on the RLC entity, and when a timer for selective duplication is set or a timer for determining whether to release duplication transmission is set, the PDCP entity may start the timer for selective duplication or the timer for determining whether to release duplication transmission.

When duplicate data is first transmitted, the timer for each packet for selective duplication or the timer for determining whether to release duplication transmission may be triggered, and when another RLC entity cannot transmit duplicate data until the timer for each packet for selective duplication or the timer for determining whether to release duplication transmission expires, duplication transmission may be released with respect to corresponding data, and the timer for each packet for selective duplication or the timer for determining whether to release duplication transmission may be running with respect to each data. When successful transfer of duplicate data is confirmed, the timer for each packet for selective duplication or the timer for determining whether to release duplication transmission stops and duplication transmission with respect to data is stopped.

In the above descriptions, a PHY entity may notify channel measurement information or signal strength information about each cell to the MAC entity or may indicate the MAC entity whether to activate or deactivate each cell. When the MAC entity is indicated with or determines activation and deactivation with respect to each of a plurality of RLC entities for which the packet duplication transmission technology is configured, via channel information or signal strength information about each cell, the PDCP entity may indicate whether to activate and deactivate each of the RLC entities.

Also, whether to activate and deactivate the RLC entities is changed, the MAC entity may trigger a buffer status report and thus may report again the amount of data which can be transmitted by the UE to the BS (e.g., the buffer status report may be configured, in re-consideration of the amount of data to be duplicately transmitted). This is because whether the RLC entities are activated may have an effect on the amount of data to be duplicately transmitted. Then, the MAC entity may exclude a logical channel of a deactivated RLC entity from a Logical Channel Prioritization (LCP) procedure so as not to distribute a UL transmit resource to the logical channel.

However, as described above, in a case where the UE autonomously activates or deactivates each RLC entity, based on measurement information about a channel or a signal of a cell mapped to each RLC entity, the BS cannot recognize which RLC entity is activated or deactivated with respect to a bearer for which the packet duplication transmission technology is configured and thus it is difficult to implement scheduling for the BS. Therefore, a new MAC CE, a new RLC control PDU, or a new PDCP control PDU may be defined and thus the UE may indicate, to the BS, which RLC entities are activated or deactivated, by the UE, with respect to the bearer for which the packet duplication transmission technology is configured.

According to an embodiment of the disclosure, for a method of indicating, by using the new MAC CE, whether a plurality of RLC entities connected to each bearer are activated and deactivated, the MAC CE may be designed according to the methods as in FIG. 1I, FIG. 1J, FIG. 1K, FIG. 1L, FIG. 1M, FIG. 1N, FIG. 1O, and FIG. 1P, and the UE may indicate, to the BS, whether a plurality of RLC entities connected to each bearer for which the packet duplication technology is configured are activated and deactivated.

Also, according to an embodiment of the disclosure, in a case where a new RLC control PDU is defined, a RLC control PDU may be configured by receiving, from the MAC entity, an indication whether to activate and deactivate each RLC entity, and an indicator indicating activation or deactivation may be defined in the RLC control PDU so as to indicate, to the BS, activation or deactivation with respect to each RLC entity.

Also, according to an embodiment of the disclosure, in a case where a PDCP control PDU is indicated, a PDCP entity for which the packet duplication transmission technology is configured may be configured by receiving an indication of activation and deactivation from the MAC entity, and the PDCP control PDU may be designed according to the methods as in FIG. 1I, FIG. 1J, FIG. 1K, FIG. 1L, FIG. 1M, FIG. 1N, FIG. 1O, and FIG. 1P, and the UE may indicate, to the BS, whether a plurality of RLC entities connected to each bearer for which the packet duplication technology is configured are activated and deactivated.

Hereinafter, the BS may configure a timer value to the UE via an RRC message, wherein the timer value is for each bearer for which the packet duplication transmission technology is configured or for each RLC entity for which the packet duplication transmission technology is configured, such that the MAC entity or the PDCP entity of the UE operates a timer, and when the timer expires, the UE may deactivate a plurality of RLC entities configured for a bearer or deactivate each of the plurality of RLC entities configured for the bearer.

In a case where the UE operates the timer as described above, the BS may equally operate the timer the UE operates, and thus, even when a RLC entity of a bearer for which the packet duplication transmission technology is configured is deactivated due to expiry of the timer, the BS may also recognize deactivation of the RLC entity without an indication from the UE. A method of determining whether to activate and deactivate RLC entities to which a timer-based packet duplication technology is applied is provided below.

Method 1: The BS may configure, for the UE, a timer for each bearer for which the packet duplication transmission technology is configured. Then, the PDCP entity or the MAC entity of the UE may operate the timer for each bearer, and when it is indicated, via an RRC message or a MAC CE, to activate the packet duplication transmission technology with respect to a bearer, the PDCP entity or the MAC entity of the UE may start the timer. When activation of the packet duplication transmission technology is re-indicated via an RRC message or a MAC CE, the PDCP entity or the MAC entity of the UE may re-start the timer. Also, when it is indicated, via an RRC message or a MAC CE, to deactivate the packet duplication transmission technology with respect to the bearer, the PDCP entity or the MAC entity of the UE may stop the timer. When the timer expires, the PDCP entity or the MAC entity of the UE may deactivate a plurality of RLC entities of a bearer for which the packet duplication transmission technology is configured. Also, when the MAC entity operates the timer, the MAC entity may indicate, to the PDCP entity, activation and deactivation of packet duplication with respect to a bearer for which packet duplication transmission is configured, may trigger a buffer status report, and may configure and transmit a new buffer status report to the BS.

Method 2: The BS may configure, for the UE, a timer for each RLC entity configured for a bearer for which the packet duplication transmission technology is configured. Then, the PDCP entity or the MAC entity of the UE may operate the timer for each RLC entity, and when it is indicated, via an RRC message or a MAC CE, to activate the packet duplication transmission technology with respect to each RLC entity, the PDCP entity or the MAC entity may start the timer. When activation of the packet duplication transmission technology is re-indicated via an RRC message or a MAC CE, the PDCP entity or the MAC entity of the UE may re-start the timer. Also, when it is indicated, via an RRC message or a MAC CE, to deactivate the packet duplication transmission technology with respect to a bearer or each RLC entity, the PDCP entity or the MAC entity of the UE may stop the timer. When the timer expires, the PDCP entity or the MAC entity of the UE may deactivate each RLC entity of a bearer for which the packet duplication transmission technology is configured and which corresponds to the timer. Also, when the MAC entity operates the timer, the MAC entity may indicate, to the PDCP entity, activation and deactivation of packet duplication with respect to a bearer for which packet duplication transmission is configured, may trigger a buffer status report, and may configure and transmit a new buffer status report to the BS.

FIG. 1Q illustrates UE operations proposed in the disclosure.

In the disclosure, when the packet duplication technology is configured for the UE by using an RRC message, the UE may configure the packet duplication technology for an indicated bearer and may configure a plurality of RLC entities (1$q$-05). When a BS indicates, to the UE, activation and deactivation with respect to the plurality of RLC entities, based on the embodiments proposed in the disclosure (1$q$-10), the UE may activate or deactivate corresponding secondary RLC entities, according to the indication (1$q$-15). When a change of a primary RLC entity is indicated, the UE may change a primary RLC entity according to the indication.

FIG. 1R is a block diagram of a configuration of a UE, according to an embodiment of the disclosure.

Referring to FIG. 1R, the UE may include a radio frequency (RF) processor 1r-10, a baseband processor 1r-20, a storage 1r-30, and a controller 1r-40.

The RF processor 1r-10 may perform functions for transmitting and receiving signals through radio channels, e.g., band conversion and amplification of the signals. That is, the RF processor 1r-10 may up-convert a baseband signal provided from the baseband processor 1r-20, into an RF band signal and then may transmit the RF band signal through an antenna, and may down-convert an RF band signal received through the antenna, into a baseband signal. For example, the RF processor 1r-10 may include a transmit filter, a receive filter, an amplifier, a mixer, an oscillator, a digital-to-analog convertor (DAC), an analog-to-digital convertor (ADC), or the like. However, the disclosure is not limited thereto. Although only one antenna is illustrated in FIG. 1R, the UE may include a plurality of antennas. The RF processor 1r-10 may include a plurality of RF chains. The RF processor 1r-10 may perform beamforming. For beamforming, the RF processor 1r-10 may adjust phases and intensities of signals to be transmitted or received through a plurality of antennas or antenna elements. The RF processor 1r-10 may perform a MIMO operation and may receive a plurality of layers in the MIMO operation. The RF processor 1r-10 may perform received beam sweeping by appropriately configuring a plurality of antennas or antenna elements, or may adjust a direction and a beam width of a received beam to coordinate with a transmit beam, by the control of the controller 1r-40.

The baseband processor 1r-20 may convert between a baseband signal and a bitstream based on physical entity specifications of a system. For example, for data transmission, the baseband processor 1r-20 may generate complex symbols by encoding and modulating a transmit bitstream. For data reception, the baseband processor 1r-20 may reconstruct a received bitstream by demodulating and decoding a baseband signal provided from the RF processor 1r-10. For example, according to an OFDM scheme, for data transmission, the baseband processor 1r-20 may generate complex symbols by encoding and modulating a transmit bitstream, may map the complex symbols to subcarriers, and then may configure OFDM symbols by performing inverse fast Fourier transform (IFFT) and cyclic prefix (CP) insertion. For data reception, the baseband processor 1r-20 may segment a baseband signal provided from the RF processor 1r-10, into OFDM symbol units, may reconstruct signals mapped to subcarriers by performing fast Fourier transform (FFT), and then may reconstruct a received bitstream by demodulating and decoding the signals.

The baseband processor 1r-20 and the RF processor 1r-10 transmit and receive signals as described above. Accordingly, the baseband processor 1r-20 and the RF processor 1r-10 may also be called a transmitter, a receiver, a transceiver, or a communicator. At least one of the baseband processor 1r-20 and the RF processor 1r-10 may include a plurality of communication modules to support a plurality of different radio access technologies. At least one of the baseband processor 1r-20 and the RF processor 1r-10 may include different communication modules to process signals of different frequency bands. For example, the different radio access technologies may include an LTE network, an NR network, or the like. The different frequency bands may include a super-high frequency (SHF) (e.g., 2.5 GHz, 5 GHz) band and a millimeter wave (mmWave) (e.g., 60 GHz) band. The UE may transmit and receive signals to and from the BS by using the baseband processor 1r-20 and the RF processor 1r-10. In this regard, the signals may include control information and data.

The storage 1r-30 may store basic programs, application programs, and data, e.g., configuration information, for operations of the UE. The storage 1r-30 may provide the stored data upon request by the controller 1r-40. The storage 1r-30 may include any or a combination of storage media such as read-only memory (ROM), random access memory (RAM), a hard disk, a compact disc (CD)-ROM, and a digital versatile disc (DVD). The storage 1r-30 may include a plurality of memories.

The controller 1r-40 may control overall operations of the UE. For example, the controller 1r-40 may transmit and receive signals through the baseband processor 1r-20 and the RF processor 1r-10. The controller 1r-40 may record and read data on or from the storage 1r-30. To this end, the controller 1r-40 may include at least one processor. For example, the controller 1r-40 may include a communication processor (CP) for controlling communications and an application processor (AP) for controlling an upper layer such as an application program. According to an embodiment of the disclosure, the controller 1r-40 may include a multi-connection processor 1r-42 configured to process processes of a multi-connection mode. The controller 1r-40 may activate or deactivate a plurality of RLC entities according to the aforementioned embodiments, and may control each of elements in the UE to change a primary RLC entity.

FIG. 1S is a block diagram of a transmission/reception point (TRP) device in a wireless communication system, according to an embodiment of the disclosure.

According to an embodiment of the disclosure, the TRP may be a BS. However, the disclosure is not limited thereto, and the TRP may be an entity in a network, the entity being enabled for transmission and reception. Referring to FIG. 1S, the BS may include a RF processor 1s-10, a baseband processor 1s-20, a communicator 1s-30, a storage 1s-40, and a controller 1s-50.

The RF processor 1s-10 may perform functions for transmitting and receiving signals through radio channels, e.g., band conversion and amplification of the signals. The RF processor 1s-10 may up-convert a baseband signal provided from the baseband processor 1s-20, into an RF band signal and then may transmit the RF band signal through an antenna, and may down-convert an RF band signal received through an antenna, into a baseband signal. For example, the RF processor 1s-10 may include a transmit filter, a receive filter, an amplifier, a mixer, an oscillator, a DAC, an ADC, or the like. However, the disclosure is not limited thereto. Although only one antenna is illustrated in FIG. 1S, the BS may include a plurality of antennas. The RF processor 1s-10 may include a plurality of RF chains. In addition, the RF processor 1s-10 may perform beamforming. For beamforming, the RF processor 1s-10 may adjust phases and intensities of signals to be transmitted or received through a plurality of antennas or antenna elements. The RF processor 1s-10 may perform a DL MIMO operation by transmitting one or more layers.

The baseband processor 1s-20 may convert between a baseband signal and a bitstream based on physical entity specifications of a radio access technology. For example, for data transmission, the baseband processor 1s-20 may generate complex symbols by encoding and modulating a transmit bitstream. For data reception, the baseband processor 1s-20 may reconstruct a received bitstream by demodulating and decoding a baseband signal provided from the RF processor 1s-10. For example, according to an OFDM scheme, for data transmission, the baseband processor 1s-20 may generate complex symbols by encoding and modulating a transmit bitstream, may map the complex symbols to subcarriers, and then may configure OFDM symbols by performing IFFT and CP insertion. For data reception, the baseband processor 1s-20 may segment a baseband signal provided from the RF processor 1s-10, into OFDM symbol units, may reconstruct signals mapped to subcarriers by performing FFT, and then may reconstruct a received bitstream by demodulating and decoding the signals. The baseband processor 1s-20 and the RF processor 1s-10 may transmit and receive signals as described above. As such, the baseband processor 1s-20 and the RF processor 1s-10 may also be called a transmitter, a receiver, a transceiver, a communicator, or a wireless communicator.

The communicator 1s-30 may provide an interface for communicating with other nodes in a network. The BS may transmit and receive signals to and from the UE by using the baseband processor 1s-20 and the RF processor 1s-10. In this regard, the signals may include control information and data. According to an embodiment of the disclosure, the communicator 1s-30 may be a backhaul communicator.

The storage 1s-40 may store basic programs, application programs, and data, e.g., configuration information, for operations of the BS. In particular, the storage 1s-40 may store, for example, information about bearers assigned for a connected UE and measurement results reported from the connected UE. The storage 1s-40 may store criteria information used to determine whether to provide or release dual connectivity to or from the UE. The storage 1s-40 may provide the stored data upon request by the controller 1s-50. The storage 1s-40 may include any or a combination of storage media such as ROM, RAM, a hard disk, a CD-ROM, and a DVD. The storage 1s-40 may include a plurality of memories.

The controller 1s-50 may control overall operations of the BS. For example, the controller 1s-50 may transmit and receive signals through the baseband processor 1s-20 and the RF processor 1s-10, or the communicator 1s-30. The controller 1s-50 may record and read data on or from the storage 1s-40. To this end, the controller 1s-50 may include at least one processor. According to an embodiment of the disclosure, the controller 1s-50 may include a multi-connection processor 1s-52 configured to process processes of a multi-connection mode.

The methods according to the embodiments of the disclosure as described herein or in the following claims may be implemented as hardware, software, or a combination of hardware and software.

When implemented as software, a computer-readable storage medium storing one or more programs (e.g., software modules) may be provided. The one or more programs stored in the computer-readable storage medium are configured for execution by one or more processors in an electronic device. The one or more programs include instructions directing the electronic device to execute the methods according to the embodiments of the disclosure as described herein or in the following claims.

The programs (e.g., software modules or software) may be stored in non-volatile memory including RAM or flash memory, ROM, electrically erasable programmable read only memory (EEPROM), a magnetic disc storage device, a CD-ROM, a digital versatile disc (DVD), another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as the Internet, an intranet, a local area network (LAN), a wide LAN (WLAN), and a storage area network (SAN). Such a storage device may access the electronic device via an external port. Furthermore, an additional storage device on the communication network may access the electronic device.

In the afore-described embodiments of the disclosure, an element or elements included in the disclosure are expressed in a singular or plural form depending on the described embodiments of the disclosure. However, the singular or plural form is selected appropriately for a situation assumed for convenience of description, the disclosure is not limited to the singular or plural form, and an element expressed in a singular form may include a plurality of elements and elements expressed in a plural form may include a single element.

It should be understood that the embodiments of the disclosure in the specification and drawings should be considered in a descriptive sense only and not for purposes of limitation. That is, it will be understood by one of ordinary skill in the art that various changes in form and details may be made based on the technical concept of the disclosure. Also, the embodiments of the disclosure may be combined to be implemented, when required. For example, the BS and the UE may be operated in a manner that portions of an embodiment of the disclosure are combined with portions of another embodiment of the disclosure. Also, modifications based on the technical scope of the embodiments may be applied to various systems such as a Frequency Division Duplex (FDD) LTE system, a Time Division Duplex (TDD) LTE system, a 5G or NR system, or the like.

What is claimed is:

1. A method performed by a user equipment (UE), the method comprising:
   receiving, from a base station (BS), a Radio Resource Control (RRC) message configuring a Packet Data Convergence Protocol (PDCP) duplication for a Data Radio Bearer (DRB);
   configuring a primary Radio Link Control (RLC) entity and one or more secondary RLC entities for the PDCP duplication;
   receiving, from the BS, a Medium Access Control (MAC) Control Element (CE) related to an activation or a deactivation of the PDCP duplication for each of the one or more secondary RLC entities; and
   discarding one or more duplicated PDCP Protocol Data Units (PDUs) in at least one secondary RLC entity that is deactivated for the PDCP duplication.

2. The method of claim 1, further comprising:
   in case that all of the one or more secondary RLC entities are deactivated for the PDCP duplication, deactivating the PDCP duplication for the DRB.

3. The method of claim 1, wherein the MAC CE includes a DRB identifier field indicating an identifier of the DRB and one or more RLC fields, and
   wherein the one or more RLC fields are mapped to the one or more secondary RLC entities, respectively.

4. The method of claim 2, further comprising:
   identifying whether a split secondary RLC entity is configured among the one or more secondary RLC entities; and
   in case that the split secondary RLC entity is configured, transmitting a PDCP PDU based on either the primary RLC entity or the split secondary RLC entity.

5. The method of claim 1, wherein a PDCP control PDU is not duplicated and transmitted based on the primary RLC entity.

6. A user equipment (UE) in a wireless communication system, the UE comprising:
- a transceiver; and
- a controller configured to:
  - receive, from a base station (BS) via the transceiver, a Radio Resource Control (RRC) message configuring a Packet Data Convergence Protocol (PDCP) duplication for a Data Radio Bearer (DRB),
  - configure a primary Radio Link Control (RLC) entity and one or more secondary RLC entities for the PDCP duplication,
  - receive, from the BS via the transceiver, a Medium Access Control (MAC) Control Element (CE) related to an activation or a deactivation of the PDCP duplication for each of the one or more secondary RLC entities, and
  - discard one or more duplicated PDCP Protocol Data Units (PDUs) in at least one secondary RLC entity that is deactivated for the PDCP duplication.

7. The UE of claim 6, wherein the controller is further configured to:
- in case that all of the one or more secondary RLC entities are deactivated for the PDCP duplication, deactivate the PDCP duplication for the DRB.

8. The UE of claim 6, wherein the MAC CE includes a DRB identifier field indicating an identifier of the DRB and one or more RLC fields, and
wherein the one or more RLC fields are mapped to the one or more secondary RLC entities, respectively.

9. The UE of claim 6, wherein the controller is further configured to:
- identify whether a split secondary RLC entity is configured among the one or more secondary RLC entities; and
- in case that the split secondary RLC entity is configured, transmit a PDCP PDU based on either the primary RLC entity or the split secondary RLC entity.

10. The UE of claim 6, wherein a PDCP control PDU is not duplicated and transmitted based on the primary RLC entity.

* * * * *